(12) United States Patent
Horiuchi et al.

(10) Patent No.: US 6,485,658 B1
(45) Date of Patent: Nov. 26, 2002

(54) PHTHALOCYANINE, PROCESS FOR PRODUCING THE SAME AND ELECTROPHOTOGRAPHIC PHOTORECEPTOR USING THE SAME

(75) Inventors: Tamotsu Horiuchi; Hideki Nagamura; Makoto Okaji, all of Tokyo (JP)

(73) Assignee: Mitsubishi Paper Mills, Limited, Tokyo (JP)

( * ) Notice: Subject to any disclaimer, the term of this patent is extended or adjusted under 35 U.S.C. 154(b) by 0 days.

(21) Appl. No.: 09/557,648

(22) Filed: Apr. 26, 2000

(30) Foreign Application Priority Data

| Apr. 28, 1999 | (JP) | 11-122309 |
| Sep. 14, 1999 | (JP) | 11-260989 |
| Nov. 9, 1999 | (JP) | 11-317658 |

(51) Int. Cl.[7] .............. H01B 1/12; C09B 47/08
(52) U.S. Cl. ............ 252/501.1; 430/76; 430/78; 540/139
(58) Field of Search .............. 252/501.1; 430/76, 430/78; 540/139

(56) References Cited

U.S. PATENT DOCUMENTS

| 4,971,877 A | 11/1990 | Miyamoto et al. ............ 430/76 |
| 4,981,767 A | 1/1991 | Tokura et al. ............... 430/58 |
| 5,213,929 A | 5/1993 | Takano et al. ............... 430/78 |
| 5,298,353 A | 3/1994 | Ohmori ....................... 430/78 |
| 5,595,846 A | 1/1997 | Shigematsu et al. .......... 430/58 |
| 5,938,980 A * | 8/1999 | Morishita et al. |
| 6,284,420 B1 * | 9/2001 | Liu et al. ................. 430/59.5 |

* cited by examiner

Primary Examiner—Mark Kopec
(74) Attorney, Agent, or Firm—Paul E. White, Jr.; Manelli Denison & Selter PLLC

(57) ABSTRACT

Disclosed are a phthalocyanine composition having main diffraction peaks at 7.0°, 9.0°, 14.1°, 18.0°, 23.7° and 27.3° of Bragg angles (2θ±0.2°) in an X-ray diffraction spectrum with Cu Kα, a process for producing the same and an electrophotographic photoreceptor using the same.

5 Claims, 50 Drawing Sheets

PHTHALOCYANINE, PROCESS FOR PRODUCING THE SAME AND ELECTROPHOTOGRAPHIC PHOTORECEPTOR USING THE SAME

BACKGROUND OF THE INVENTION

1. Field of the Invention

The present invention relates to a phthalocyanine composition having diffraction peaks at 7.0°, 9.0°, 14.1°, 18.0°, 23.7° and 27.3° of Bragg angles (2θ±0.2°) in an X-ray diffraction spectrum with a 1.541 Å X-ray of Cu Kα, a phthalocyanine composition having diffraction peaks at 7.0°, 9.3°, 10.5°, 13.1°, 20.6°, 23.7°, 26.2° and 27.2° of Bragg angles, and an oxytitanium phthalocyanine having diffraction peaks at 7.5°, 10.2°, 16.3°, 22.5°, 24.2°, 25.4°, 27.2° and 28.7° of Bragg angles, wherein the intensity of peak at 7.5° of a Bragg angle is the strongest among the above peaks. It also relates to a process for producing the same and to an electrophotographic photoreceptor using the same.

2. Prior Art

In recent years, the utilization of an electrophotography has not been limited to the field of a copying machine, but has spread in fields of a conventional photography, for example, the field of a printing plate material, a slide film or a microfilm. In addition, the application thereof has been also studied in the field of a high-speed printer using a laser, LED or CRT as a light source. Further, the application thereof has been lately directed to the use of a photoconductive material other than an electrophotographic photoreceptor, for example, the use of an electrostatic recording element, a sensor material or an EL element. Therefore, demands for a photoconductive material and an electrophotographic photoreceptor using the same have been increasing and become high level.

As the conventional photoreceptor of an electrophotography, an inorganic photoconductive substance, such as selenium, cadmium sulfide, zinc oxide or silicon, has been known, widely studied and already used practically. An inorganic substance has various problems although it has a number of advantages. For example, selenium has problems in that it is difficult to optimize production conditions thereof and it is easily crystallized due to heat and mechanical impact. Cadmium sulfide and zinc oxide have poor resistance to humidity and durability. It is pointed out that silicon has a poor electrostatic chargeability and is difficult to be produced. Further, selenium and cadmium sulfide also have problems on toxicity.

On the other hand, an organic photoconductive substance is advantageous in that it has an excellent film-formability and flexibility as well as in that it is lightweight and has an excellent transparency. Further, it also has advantages in that a photoreceptor to be used in a wide range of wavelength is easily designed therefrom by using an appropriate sensitization method. Therefore, attention is now drawn to the practical use of an organic photoconductive substance.

By the way, the photoreceptor used in the electrophotography is necessary to meet, as general basic properties, the following requirements: (1) that the electrostatic chargeability for the corona discharge in darkness be high; (2) that the leakage in darkness (dark decay) of the obtained electric charge be small; (3) that the dissipation (light decay) of the electric charge by light irradiation be rapid; and (4) that the residual electric charge after light irradiation be small.

A number of studies have been made on photoconductive polymers as organic photoconductive substances, including polyvinyl carobazole as of today. However, they do not necessarily have satisfactory film-formability, flexibility and adhesion property. Further, they do not have the above-mentioned basic properties required for a photoreceptor satisfactorily.

On the other hand, an organic photoconductive compound having a low molecular weight is advantageous in that a photoreceptor having an excellent film-formability, an excellent adhesion property and a high mechanical strength, such as flexibility, can be obtained by appropriately selecting a binder used in the photoreceptor formation. However, it is difficult to find an appropriate compound suitable to maintain high sensitivity.

For improving such properties, an organic photoreceptor having higher sensitivity has been developed in which different substances individually have a charge generation function and a charge transportation function. The characteristic feature of such a photoreceptor, which is called "function separation type", resides in that it is possible to select materials suitable for the respective functions from wide varieties. Therefor, a photoreceptor having desired performance can be easily prepared, which have led to a number of researches on the photoreceptor.

As substances responsible for the charge generation function, various substances, such as a phthalocyanine pigment, a squarilium dye, an azo-pigment and a perylene pigment, have been studied. Among them, an azo-pigment is advantageous not only in that it is possible to prepare those having various molecular structures, but also in that a high charge generation efficiency is expected. Therefore, various azo-pigments has been widely researched and put into practical use. However, a relationship between the molecular structure and the charge generation efficiency in the azo-pigment has not yet been elucidated. Currently, although an enormous number of researches have been made on the synthesis of the azo-pigment having an optimum molecular structure, the satisfactory photoreceptor meeting the requirements of the above-mentioned basic properties and high durability has not yet been obtained.

Further, in recent years, according to the progress of information technology, laser beam printers using a laser as a light source instead of the conventional white light have been rapidly and widely expanded since they have advantages of high speed, high image quality and non-impact. In accordance with the expansion, it is desired to develop materials for such printers, which meet the demands for high performance of the printers. Among lasers, especially in a semiconductor laser, the use thereof in a compact disk or an optical disk is recently increased, and thus, the technical advance has been remarkably progressed. Therefore, the semiconductor laser has been vigorously used also in a printer field as a light source material being compact and high reliability. In such a case, the wave-length of the light source is about 780 to 830 nm, and therefore, it is strongly desired to develop a photoreceptor having high sensitivity in a near infrared range. Especially, a photoreceptor using a phthalocyanine with an optical absorption in a near infrared range is energetically developed.

It has been known that phthalocyanines have the different absorption spectrum and photoconductivity depending on the type of the central metal, and, in addition, among phthalocyanines having the same central metal, the properties of such phthalocyanines are different from each other according to the crystal structure thereof. Therefor, a phthalocyanine having a specific crystal structure is selected as an electrophotographic photoreceptor.

Taking as an example an oxytitanium phthalocyanine (hereinafter, referred to as "TiOPc"), an α-TiOPc, which has main diffraction peaks at 7.6°, 10.2°, 22.3°, 25.3° and 28.6° of Bragg angles (2θ±0.2°) in an X-ray diffraction spectrum, has been described in Japanese Unexamined Patent Publication No. 217050/1986. A β-TiOPc, which has main diffraction peaks at 9.3°, 10.6°, 13.2°, 15.1°, 15.7°, 16.1°, 20.8°, 23.3°, 26.3° and 27.1° of Bragg angles, has also been described in Japanese Unexamined Patent Publication No. 67094/1987. However, both of them do not satisfy the required high properties satisfactorily.

Among the TiOPc's having a peak at 27.2° of a Bragg angle, a II-TiOPc described in the above publication has a poor electrostatic chargeability and a low sensitivity. In Japanese Unexamined Patent Publication No. 17066/1989, a Y-TiOPc having a relatively high sensitivity with main diffraction peaks at 9.5°, 9.7°, 11.7°, 15.0°, 23.5°, 24.1° and 27.3° of Bragg angles is described. However, this TiOPc has problems in that the crystal structure thereof transforms easily to another crystal structure during dispersion, and the dispersion thereof has a poor stability with time.

In addition, it has been described that a mixed crystal comprising two or more different phthalocyanines or a mixture obtained simply by mixing together two or more different phthalocyanines is used as a charge generating material in an electrophotographic photoreceptor. For example, an α-TiOPc composition comprising an α-TiOPc and a metal-free phthalocyanine (hereinafter, referred to as "$H_2Pc$"), described in Japanese Unexamined Patent Publications No. 142659/1989 and No. 221461/1989, has a poor maintaining ratio for electric charge and does not have a satisfactory sensitivity. The mixed crystal comprising two or more phthalocyanines having different central metals, described in Japanese Unexamined Patent Publication No. 170166/1990, exhibits a totally different X-ray diffraction spectrum from that of the present invention, resulting in unsatisfactory electrophotographic characteristics. The phthalocyanine crystal described in Japanese Unexamined Patent Publication No. 9962/1991 has different peaks in an infrared (IR) spectrum from those of the present invention, resulting in an unsatisfactory sensitivity. As described in Japanese Unexamined Patent Publication No. 255456/1991, the mixture obtained simply by mixing together a TiOPc, which has diffraction peaks at 9.0°, 14.2°, 23.9° and 27.1° of Bragg angles, or a TiOPc, which has diffraction peaks at 7.4°, 9.2°, 10.4°, 11.6°, 13.0°, 14.3°, 15.0°, 23.4°, 24.1°, 26.2° and 27.2° of Bragg angles, and a $H_2Pc$ has a poor electrostatic chargeability, resulting in an unsatisfactory sensitivity. Further, when a dispersion of this mixture is allowed to stand, precipitation of a crystal is observed. In Japanese Unexamined Patent Publication No. 110649/1996, a mixed crystal of a TiOPc, which has main diffraction peaks at 6.8°, 7.4°, 15.0°, 24.7°, 26.2° and 27.2° of Bragg angles, and a $H_2Pc$ is described. The mixed crystal exhibits a different X-ray diffraction spectrum from that of the present invention and does not have the properties required.

As mentioned above, with respect to the preparation of an electrophotographic photoreceptor, various improvements have been made; however, those which satisfy the requirements including the above-mentioned basic properties required for the photoreceptor, a high durability and the like have not yet been obtained.

SUMMARY OF THE INVENTION

An object of the present invention is to provide an electrophotographic photoreceptor having high charge potential and high sensitivity as well as excellent performance without changing in properties thereof even when it is used repeatedly. It is also to provide a phthalocyanine composition used in the electrophotographic photoreceptor.

The present inventors have made extensive and intensive studies with a view toward attaining the above object. As a result, it has been found that by conducting a crystal transformation using water and an aromatic compound or by conducting a treatment in the presence of a β-TiOPc, a phthalocyanine with excellent electrophotographic characteristics can be obtained.

A phthalocyanine composition of the present invention comprises an oxytitanium phthalocyanine and a metal-free phthalocyanine, wherein said composition has diffraction peaks at 7.0°, 9.0°, 14.1°, 18.0°, 23.7° and 27.3° of Bragg angles (2θ±0.2°) in an X-ray diffraction spectrum with a 1.541 Å X-ray of Cu Kα.

A process for producing a phthalocyanine composition of the present invention comprises subjecting an amorphous phthalocyanine composition comprising an oxytitanium phthalocyanine and a metal-free phthalocyanine to a treatment in a solvent containing water and an aromatic compound, to thereby effect the transformation to a crystal structure, which has diffraction peaks at 7.0°, 9.0°, 14.1°, 18.0°, 23.7° and 27.3° of Bragg angles (2θ±0.2°) in an X-ray diffraction spectrum with a 1.541 Å X-ray of Cu Kα.

A phthalocyanine composition of the present invention comprises an oxytitanium phthalocyanine and a metal-free phthalocyanine, which has diffraction peaks at 7.0°, 9.3°, 10.5°, 13.1°, 20.6°, 23.7°, 26.2° and 27.2° of Bragg angles (2θ±0.2°) in an X-ray diffraction spectrum with a 1.541 Å X-ray of Cu Kα.

An oxytitanium phthalocyanine of the present invention is obtained by allowing an amorphous oxytitanium phthalocyanine to transform to a crystal structure, which has diffraction peaks at 7.5°, 10.2°, 16.3°, 22.5°, 24.2°, 25.4°, 27.2° and 28.7° of Bragg angles (2θ±0.2°) in an X-ray diffraction spectrum with a 1.541 Å X-ray of Cu Kα, wherein the intensity of peak at 7.5° of a Bragg angle (2θ±0.2°) is strongest among the above peaks.

DESCRIPTION OF THE PREFERRED EMBODIMENT

Figure 1:
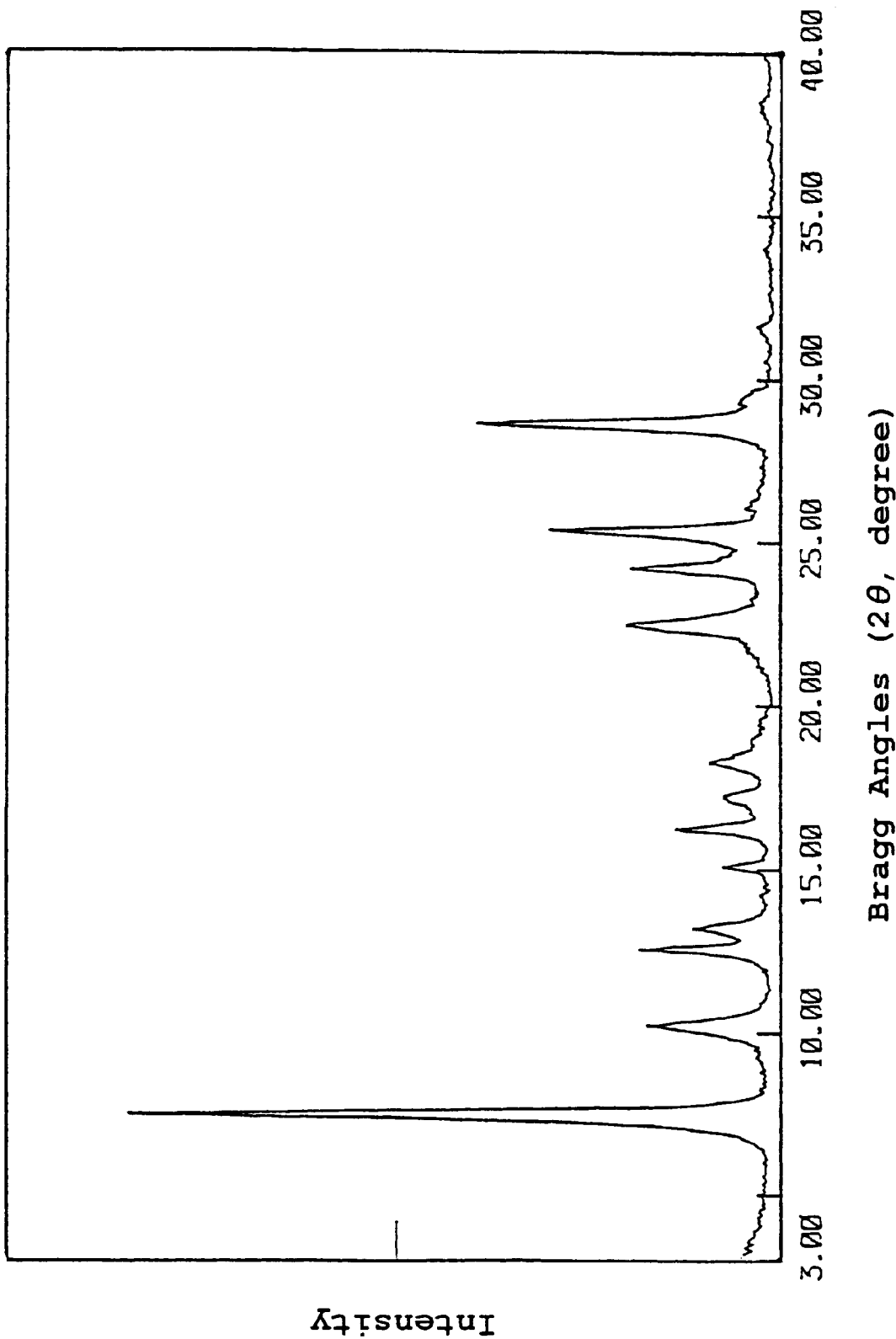
FIG. 1 is an X-ray diffraction spectrum of a crystal obtained in Preparation example 1.

Phthalocyanines used in the present invention may be produced by a conventionally known production process. As such a production process, there may be mentioned one which is described in "Phthalocyanine Compounds" (F. H. Moser and A. L. Thomas, 1963), and, in accordance with this process, phthalocyanines may be easily obtained. Taking as an example a TiOPc, as the production process therefor, there may be mentioned a production process using a polycondensation reaction between phthalodinitrile and titanium tetrachloride, or a production process using a reaction between 1,3-diiminoisoindoline and titanium tetraalkoxide described in PB85172. FIAT. FINAL REPORT 1313. Feb. 1, 1948 and Japanese Unexamined Patent Publications No. 142658/1989 and No. 221461/1989. In addition, as an organic solvent used in the reaction, a high-boiling point solvent which is inert to the reaction, such as α-chlornaphthalene, β-chlronaphthalene, α-methylnaphthalene, methoxynaphthalene, diphenylnaphthalene, ethylene glycol dialkyl ether, quinoline, sulfolane, dichlorobenzene, N-methyl-2-pyrrolidone (hereinafter, referred to as "NMP") or dichlorotoluene, is desired.

High purity phthalocyanines which may be used in an electrophotography application are obtained by purifying the phthalocyanines obtained by the above-mentioned process with an acid, an alkali, acetone, methanol, ethanol, methyl ethyl ketone, tetrahydrofuran, pyridine, quinoline, sulfolane, α-chloronaphthalene, toluene, xylene, dioxane, chloroform, dichloroethane, N,N-dimethylformamide (hereinafter, referred to as "DMF"), NMP or water. As purification methods, there may be a washing method, a recrystallization method, an extraction method using a Soxhlet's extractor, a heat suspension method and a sublimation method. The purification method is not limited to these, and any purification method may be employed as long as an unreacted substance and a by-product can be removed.

The phthalocyanine composition of the present invention, which comprises a TiOPc and a $H_2Pc$, may further contain phthalocyanines other than the TiOPc and the $H_2Pc$. The TiOPc of the present invention may contain phthalocyanines other than TiOPc. Any of a phthalocyanine which itself has been conventionally known and a derivative thereof may be used as phthalocyanines which may be contained in the composition. As such a derivative, there may be mentioned one which has a substituent in an isoindole ring of a phthalocyanine or a ligand at a central metal of a phthalocyanine. Specific examples of phthalocyanines which may be contained in the composition include $H_2Pc$'s, TiOPc's, vanadyl phthalocyanines, copper phthalocyanines, aluminum phthalocyanines, gallium phthalocyanines, indium phthalocyanines, germanium phthalocyanines, lithium phthalocyanines, sodium phthalocyanines, potassium phthalocyanines, zirconium phthalocyanines, hafnium phthalocyanines, magnesium phthalocyanines, tin phthalocyanines, zinc phthalocyanines, cobalt phthalocyanines, nickel phthalocyanines, barium phthalocyanines, beryllium phthalocyanines, cadmium phthalocyanines, iron phthalocyanines, silicon phthalocyanines, lead phthalocyanines, silver phthalocyanines, gold phthalocyanines, platinum phthalocyanines, ruthenium phthalocyanines, palladium phthalocyanines, metal-free naphthalocyanines and titanyl naphthalocyanines. Among these phthalocyanines, oxyvanadium phthalocyanine, chloroaluminum phthalocyanine, chlorogallium phthalocyanine, chloroindium phthalocyanine, dichlorogermanium phthalocyanine, hydroxyaluminum phthalocyanine, hydroxygallium phthalocyanine, hydroxyindium phthalocyanine or dihydroxygermanium phthalocyanine is preferable.

In the phthalocyanine composition having diffraction peaks at 7.0°, 9.0°, 14.1°, 18.0°, 23.7° and 27.3° of Bragg angles of the present invention, the amount of phthalocyanines other than TiOPc is preferably from 0.1 to 50 parts by weight, more preferably from 1 to 40 parts by weight, relative to 100 parts by weight of TiOPc. As phthalocyanines other than TiOPc, either $H_2Pc$ alone or a mixture of the above-mentioned phthalocyanines and $H_2Pc$ may be used. When the mixture is used, the amount of the phthalocyanines is preferably no more than 100 parts by weight, more preferably no more than 50 parts by weight, relative to 100 parts by weight of $H_2Pc$.

As an amorphous-state formation method used for obtaining an amorphous phthalocyanine composition, an amorphous TiOPc and an amorphous $H_2Pc$ used in the present invention, any methods, such as a mechanical attrition method and an acid pasting method, may be employed as long as it is possible to form an amorphous. However, an acid pasting method is most preferable. As a mechanical attrition treatment, there may be mentioned a dry milling method using a ball mill, an automatic mortar and a paint conditioner. As an attrition auxiliary agent, there may be mentioned glass beads, zirconia beads and a salt; however, an attrition auxiliary agent is not limited to these. The acid pasting method is a method in which phthalocyanines are dissolved in a strong acid, such as sulfuric acid, and the resultant solution is poured into a poor solvent, such as water, to thereby effect particle formation. Further, any types of crystal structure of phthalocyanines before amorphous-state formation may be used.

Specific examples of aromatic compounds, necessary for the crystal transformation to the phthalocyanine composition having diffraction peaks at 7.0°, 9.0°, 14.1°, 18.0°, 23.7° and 27.3° of Bragg angles of the present invention, include aromatic hydrocarbon compounds, such as benzene, toluene, naphthalene, m-terphenyl and cumene; halogenated aromatic hydrocarbon compounds, such as chlorobenzene, bromobenzene and o-dichlorobenzene; and aromatic heterocyclic compounds, such as benzothiophene, benzofuran and N-ethylcarbazole. These aromatic compounds may be in a state of either liquid or solid at normal temperature, but it is preferred that they have a melting point of no more than 100° C. They may be used individually or in combination.

Further, the aromatic compound may be used in combination with various organic solvents. Specific examples of organic solvents, which may be used in combination with the aromatic compound, include alcohol solvents, such as methanol, ethanol and isopropyl alcohol; ketone solvents, such as acetone, methyl ethyl ketone and methyl isobutyl ketone; ester solvents, such as ethyl formate, ethyl acetate and n-butyl acetate; ether solvents, such as diethyl ether, dimethoxyethane, tetrahydrofuran, dioxolane and dioxane; amide solvents, such as DMF, N,N-dimethylacetamide (hereinafter, referred to as "DMA") and NMP; halogenated aliphatic hydrocarbon solvents, such as dichloromethane, chloroform, bromoform, methyl iodide, dichloroethane, trichloroethane and trichloroethylene; and aliphatic hydrocarbon solvents, such as n-pentane, n-hexane, n-octane, 1,5-hexadiene, cyclohexane, methylcyclohexane, cyclohexadiene and terpinolene. They may be used individually or in combination.

The amount of water is preferably from 2 to 100 parts by weight relative to 1 part by weight of the phthalocyanines; however, the amount is not limited to this range as long as it is possible to disperse the phthalocyanines. In addition, the amount of an aromatic compound is preferably from 10 to 5,000 parts by weight, more preferably from 50 to 500 parts by weight, relative to 100 parts by weight of the phthalocyanines. Further, when a crystal transformation is conducted using an aromatic compound in combination with an organic solvent, the amount of the organic solvent is preferably no more than 1,000 parts by weight, more preferably no more than 200 parts by weight, relative to 100 parts by weight of the aromatic compound.

A crystal transformation is preferred to be conducted at the temperature of 80° C. or higher, and more preferred while stirring. As a stirring method, there may be mentioned a method using a stirrer, a ball mill, a paint conditioner, a sand mill, an attritor, a disperser or an ultrasonic dispersion; however, the stirring method is not limited to this as long as a stirring treatment can be conducted. The time required for transformation is preferably from 5 seconds to 120 hours, more preferably from 10 seconds to 50 hours, still more preferably from 1 minute to 50 hours.

Further, a surfactant may be optionally added. As the surfactant, any of a cationic surfactant, a nonionic surfactant and an anionic surfactant may be used. The amount of the surfactant added is preferably from 0.001 to 50 parts by weight, more preferably from 0.5 to 5 parts by weight, relative to 100 parts by weight of the phthalocyanine composition.

In the phthalocyanine composition having diffraction peaks at 7.0°, 9.3°, 10.5°, 13.1°, 20.6°, 23.7°, 26.2° and 27.2° of Bragg angles of the present invention, the amount of $H_2PC$ is preferably from 1 to 100 parts by weight, more preferably from 10 to 40 parts by weight, relative to 100 parts by weight of TiOPc. Further, the amount of phthalocyanines other than TiOPc and $H_2Pc$ is preferably from 0.1 to 100 parts by weight, more preferably from 1 to 40 parts by weight, relative to 100 parts by weight of the sum of the TiOPc and $H_2Pc$.

The amount of DMF, DMA, NMP and dimethyl sulfoxide (hereinafter, referred to as "DMSO") used after the acid pasting treatment is preferably from 1 to 10,000 parts by weight, relative to 1 part by weight of the phthalocyanine; however, the amount is not limited to this range as long as it is possible to disperse the phthalocyanine. As a washing method, there may be used a stirring washing method, an ultrasonic washing method, a shaking washing method or an immersion method, using at least one solvent selected form DMF, DMA, NMP and DMSO. The time required for washing is preferably from 1 minute to 1 week.

In the β-TiOPc which is necessary for another production process for the phthalocyanine composition having diffraction peaks at 7.0°, 9.3°, 10.5°, 13.1°, 20.6°, 23.7°, 26.2° and 27.2° of Bragg angles of the present invention and preliminarily added, there is no particular limitation with respect to the types of raw materials thereof, the synthesis method and the method for crystal transformation to α-TiOPc. It is preferred to use one which is obtained by treating an amorphous TiOPc with NMP or 1,3-dimethyl-2-imidazolidinone or subjecting TiOPc to acid pasting treatment to thereby effect amorphous-state formation, and then, washing the resultant TiOPc with at least one solvent selected form DMF, DMA, NMP and DMSO, and subjecting the resultant TiOPc to a treatment in a solvent containing water and an aromatic compound.

As specific examples of the aromatic compound used in the subsequent crystal transformation and various organic solvents which can be used in combination with the aromatic compounds, there may be used those which are mentioned above.

When the $H_2Pc$ obtained by amorphous-state formation using an acid pasting treatment is contained, the amount of the β-TiOPc preliminarily added is preferably from 1 to 100 parts by weight, more preferably from 10 to 90 parts by weight, relative to 100 parts by weight of the whole TiOPc. On the other hand, when the H₂Pc obtained by amorphous-state formation using an acid pasting treatment is not contained, the amount of the β-TiOPc preliminarily added is preferably from 1 to 99 parts by weight, more preferably from 10 to 90 parts by weight, relative to 100 parts by weight of the whole TiOPc.

As specific examples of solvents used in the crystal transformation to the phthalocyanine composition having diffraction peaks at 7.0°, 9.3°, 10.5°, 13.1°, 20.6°, 23.7°, 26.2° and 27.2° of Bragg angles when a β-TiOPc is preliminarily added, there may be mentioned the above-mentioned alcohol solvents, ketone solvents, ester solvents, ether solvents, amide solvents, halogenated hydrocarbon solvents and hydrocarbon solvents. They may be used individually or in combination.

The ratio of an amorphous TiOPc to an α-TiOPc, which has diffraction peaks at 7.5°, 10.2°, 16.3°, 22.5°, 24.2°, 25.4°, 27.2° and 28.7° of Bragg angles, wherein the intensity of peak at 7.50° of a Bragg angle is the strongest among the above peaks, is preferably from 1 to 250 parts by weight, more preferably from 5 to 150 parts by weight, relative to 100 parts by weight of the α-TiOPc.

As specific examples of solvents used in the crystal transformation of an amorphous TiOPc to the α-TiOPc, which has diffraction peaks at 7.5°, 10.2°, 16.3°, 22.5°, 24.2°, 25.4°, 27.2° and 28.7° of Bragg angles, wherein the intensity of peak at 7.5° of a Bragg angle is the strongest among the above peaks, there may be mentioned the above-mentioned halogenated hydrocarbon solvents, ketone solvents, ester solvents, aromatic hydrocarbon solvents, ether solvents, amide solvents, DMSO and pyridine. However, the solvent is not limited to the above solvents as long as it is possible to achieve the crystal transformation to the α-TiOPc.

Though the amount of the above-mentioned solvent is preferably from 2 to 1,000 parts by weight relative to 1 part by weight of an amorphous TiOPc, the amount is not limited to this range as long as it is possible to disperse TiOPc. The temperature at which a crystal transformation is conducted is not particularly limited as long as a solvent is in a liquid state; however, it is preferred that a crystal transformation is conducted at room temperature or higher, more preferably while stirring. As examples of stirring methods, there may be mentioned a method using a stirrer, a ball mill, a paint conditioner, a sand mill, an attritor, a disperser and an ultrasonic dispersion; however, the stirring method is not limited to these as long as a stirring treatment can be conducted. The time required for transformation is preferably from 5 seconds to 120 hours, more preferably from 10 seconds to 50 hours.

When the crystal transformation of an amorphous TiOPc to an α-TiOPc is conducted by treating the amorphous TiOPc with the above-mentioned solvent, it is more preferred that at least water, an aromatic compound and an amorphous TiOPc are added under conditions such that the solvent remains without separation, to thereby effect the crystal transformation to the TiOPc of the present invention.

As specific examples of aromatic compound necessary for the crystal transformation to the TiOPc of the present invention and various organic solvents which can be used in combination with the aromatic compound, there may be mentioned those which are mentioned above. Further, the amounts of water, the aromatic compound and the organic solvent to be used are the same as those mentioned above.

As a film-formable binding resin which is a binder used for forming a photosensitive layer in the present invention, there may be mentioned various resins in accordance with the application fields. For example, in the application of a photoreceptor for copy, there may be mentioned a polystyrene resin, a polyvinyl acetal resin, a polysulfone resin, a polycarbonate resin, a vinyl acetate-crotonic acid copolymer resin, a polyester resin, a polyphenylene oxide resin, a polyarylate resin, an alkyd resin, an acrylic resin, a methacrylic resin, a phenoxy resin and a polyvinyl chloride resin. Among them, a polystyrene resin, a polyvinyl acetal resin, a polycarbonate resin, a polyester resin and a polyarylate resin are superior in the electric potential properties as a photoreceptor. They may be used as individual resin or their copolymers and further used individually or in a mixture of two or more.

The amount of the above resin contained in the photosensitive layer is preferably from 10 to 500% by weight, more preferably from 50 to 150% by weight, based on 100% by weight of the phthalocyanine. When the ratio of the resin to the phthalocyanine is too high, the charge generation efficiency becomes low. On the other hand, when the ratio of the resin to the phthalocyanine is too low, a problem about the film-formability arises.

Among these binders, there are those which have low mechanical strength, such as tensile strength, bending strength and compression strength. For improving such properties, a substance imparting plasticity to the photosensitive layer may be added. Specific examples of such substances include a phthalate (e.g., DOP or DBP), a phosphate (e.g., TCP or TOP), a sebacate, an adipate, a nitrile rubber and a chlorinated hydrocarbon. When these substances are added in a too large amount, they adversely affect the electrophotographic characteristics. Therefore, it is preferred that the amount of the substance added is no more than 20 parts by weight, relative to 100 parts by weight of the binder.

In addition, if desired, as additives, an antioxidant, a curl-preventing agent and a leveling agent for improving the coating property may be added to the photoreceptor.

The phthalocyanine of the present invention may be used in combination with other charge generating materials. As examples of charge generating materials which may be used, there may be mentioned a triphenylmethane dye, a xanthene dye, an acridine dye, a thiazine dye, a pyrylium dye, an azulenium dye, a thiilium dye, a cyanine dye, a squarilium dye, a pyrrolopyrrole dye, a polycyclic quinone pigment, a perylene pigment, a perynone pigment, an anthraquinone pigment, a dioxazine pigment, an azo-pigment or phthalocyanines. They may be used individually or in combination.

The electrophotographic photoreceptor of the present invention may be used in any forms. For example, there may be mentioned electrophotographic photoreceptor which comprises a conductive support having provided thereon a photosensitive layer comprising a charge generating material, a charge transporting material and a film-formable binder resin. In addition, there has been also known a multilayer photoreceptor which comprises a conductive support having provided thereon a charge generating layer comprising a charge generating material and a binder resin, and a charge transporting layer comprising a charge transporting material and a binder resin. Any of the charge generating layer and the charge transporting layer may be an upper layer. Further, if desired, it is possible to provide an under coat between the conductive support and the photosensitive layer, an over coat on the surface of the photoreceptor, or an intermediate layer between the charge generating layer and the charge transporting layer in the case of the multilayer photoreceptor. As a support used for the preparation of a photoreceptor using the compound in the present invention, there can be used a metal drum, a metal plate and a support which is in the form of a sheet, a drum or a belt and made of a paper or plastic film which is processed for conductivity.

As a charge generating material in the electrophotographic photoreceptor of the present invention, used are a phthalocyanine composition having diffraction peaks at 7.0°, 9.0°, 14.1°, 18.0°, 23.7° and 27.3° of Bragg angles (2θ±0.2°) in an X-ray diffraction spectrum with a 1.541 Å X-ray of Cu Kα, a phthalocyanine composition having diffraction peaks at 7.0°, 9.3°, 10.5°, 13.1°, 20.6°, 23.7°, 26.2° and 27.2° of Bragg angles, and a TiOPc having diffraction peaks at 7.5°, 10.2°, 16.3°, 22.5°, 24.2°, 25.4°, 27.2° and 28.7° of Bragg angles, wherein the intensity of peak at 7.5° of a Bragg angle is the strongest among the above peaks.

In a charge transporting material used in the photoreceptor of the present invention, there are a positive hole transporting material and an electron transporting material. As examples of the former, for example, there may be mentioned oxadiazoles described in Japanese Patent Publication No. 5466/1959, triphenylmethanes described in Japanese Patent Publication No. 555/1970, pyrazolines described in Japanese Patent Publication No. 4188/1972, hydrazones described in Japanese Patent Publication No. 42380/1980, oxadiazoles described in Japanese Unexamined Patent Publication No. 123544/1981, tetraarylbenzidines described in Japanese Unexamined Patent Publication No. 58445/1979, stilbenes described in Japanese Unexamined Patent Publications No. 65440/1983 and No. 98437/1985. Among them, as a charge transporting material used in the present invention, hydrazones described in Japanese Unexamined Patent Publications No. 24553/1985, No. 96767/1990, No. 183260/1990 and No. 226160/19909 and stilbenes described in Japanese Unexamined Patent Publications No. 51162/1990 and No. 75660/1991 are most preferable. They may be used as an individually or in a mixture of two or more.

On the other hand, as electron transporting materials, for example, there may be mentioned chloranil, tetracyanoethylene, tetracyanoquinodimethane, 2,4,7-tetranitro-9-fluorenone, 2,4,5,7-trinitro-9-fluorenone, 2,4,5,7-tetranitroxanthone, 2,4,8-trinitrothioxanthone, 1,3,7-trinitrodibenzothiophene or 1,3,7-trinitrodibenzothiophene-5,5-dioxide. They may be used individually or in a mixture of two or more.

In addition, as a sensitizer for further increasing the sensitization effect, a certain electron attractive compound can be added. As such electron attractive compounds, for example, there may be mentioned quinones, such as 2,3-dichloro-1,4-naphthoquinone, 1-nitroanthraquinone, 1-chloro-5-nitroanthraquinone, 2-chloroanthraquinone or phenanthrenequinone; aldehydes, such as 4-nitrobenzaldehyde; ketones, such as 9-benzoylanthracene, indandione, 3,5-dinitrobenzophenone or 3,3',5,5'-tetranitrobenzophenone; acid anhydrides, such as phthalic anhydride or 4-chloronaphthalic anhydride; cyano compounds, such as terephthalalmalononitrile, 9-anthrylmethylidenemalononitrile, 4-nitrobenzalmalononitrile or 4-(p-nitrobenzoyloxy)benzalmalononitrile; phthalides, such as 3-benzalphthalide, 3-(α-cyano-p-nitrobenzal)phthalide or 3-(α-cyano-p-nitrobenzal)-4,5,6,7-tetrachlorophthalide.

The amount of the binder contained in the charge transporting layer is preferably from 0.001 to 20 parts by weight, more preferably from 0.01 to 5 parts by weight, relative to 1 part by weight of the charge transporting material. When the ratio of the binder to the charge transporting material is too high, the sensitivity becomes low. On the other hand, when the ratio of the binder of the charge transporting material is too low, there is a danger such that the repetition resistance property is lowered and a coating defect occurs.

The electrophotographic photoreceptor of the present invention can be produced in accordance with the form thereof, by a method in which the above-mentioned various additives are dissolved or dispersed in a solvent, and the resultant coating liquid is applied onto the above-mentioned conductive support, followed by drying, to thereby obtain a photoreceptor. As a preferred solvent used in the preparation of a dispersion, there may be mentioned water, the above-mentioned alcohol solvents, ketone solvents, ester solvents, ether solvents, amide solvents, halogenated hydrocarbon solvents and hydrocarbon solvents. Specifically among them, ketone solvents, ester solvents, ether solvents or halogenated hydrocarbon solvents are preferred. They may be used individually or in a mixture of two or more solvents.

EXAMPLES

In the following, the present invention is described in more detail with reference to Examples and Comparative examples, which are not to limit the scope of the present invention.

Preparation Example 1

20.0 g of phthalodinitrile was dissolved in 200 ml of α-chloronaphthalene, and to the resultant solution was added dropwise 9.0 g of titanium tetrachloride in an atmosphere of nitrogen gas. After completion of the addition, the resultant mixture was heated at 240° C. for 3 hours while stirring, and then, the reaction was terminated. The resultant precipitated crystal was collected by filtration and washed well with α-chloronaphthalene and methanol, to thereby obtain dichlorotitanyl phthalocyanine. The obtained dichlorotitanyl phthalocyanine was heated under reflux while stirring, together with 150 ml of concentrated aqueous ammonia. After 1 hour, the reaction was terminated, and the resultant crystal was collected by filtration, to thereby obtain 17.4 g of a TiOPc. A crystal structure of the obtained TiOPc was confirmed by measuring an X-ray diffraction spectrum with an X-ray of Cu Kα, using an X-ray diffractometer, Model RAD-C System (trade name, manufactured by Rigaku Denki K. K.). The measurement result is shown in FIG. 1.

| Measurement conditions | |
| --- | --- |
| X-ray tube bulb | Cu |
| Voltage | 40.0 kV |
| Current | 100.0 mA |
| Start angle | 3.0° |
| Stop angle | 40.0° |
| Step angle | 0.02° |

Preparation Example 2

Figure 2:
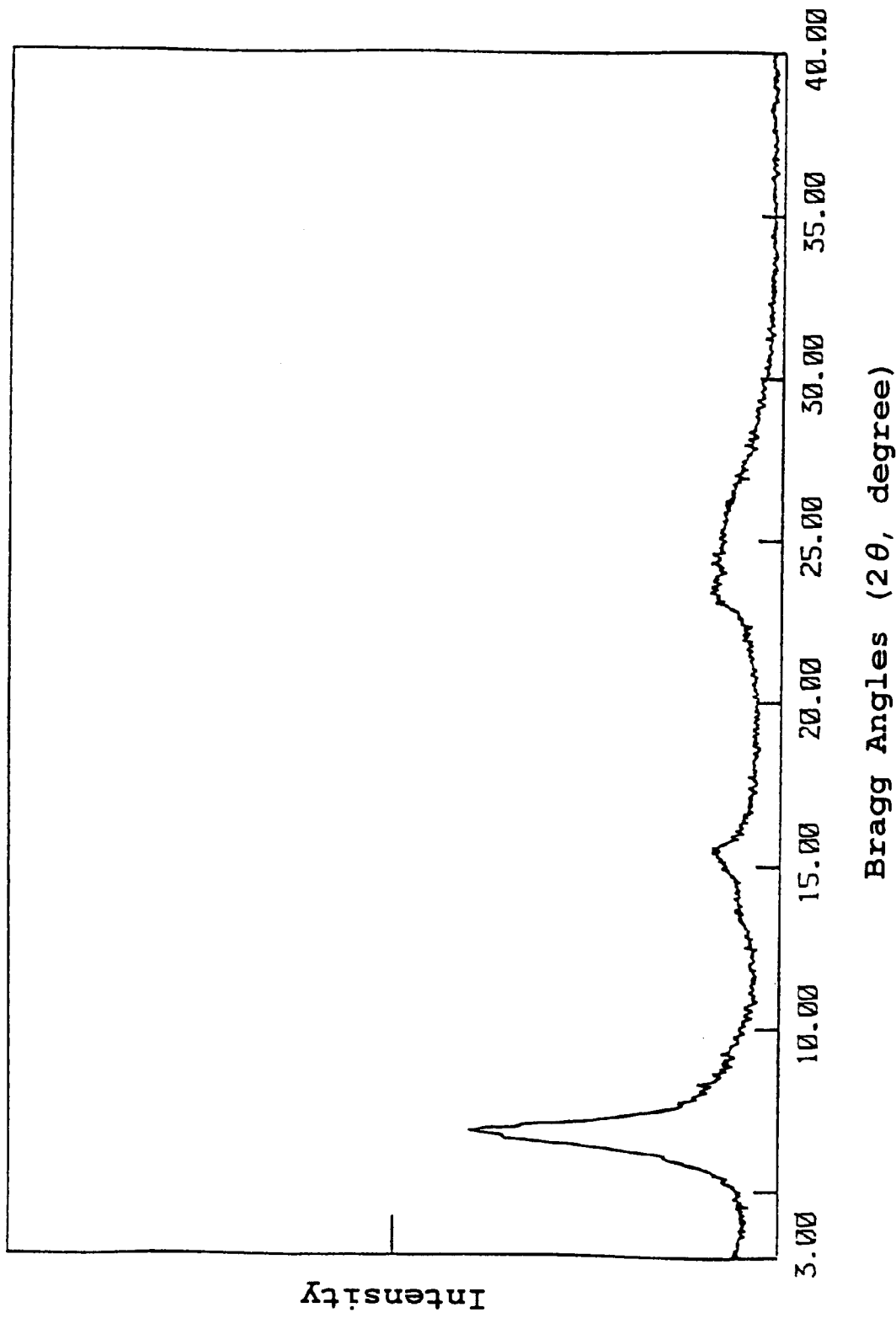
FIG. 2 is an X-ray diffraction spectrum of a crystal obtained in Preparation example 2.

7.0 g of the TiOPc obtained in Preparation example 1 and 3.0 g of a H₂Pc were gradually added to and dissolved in 100 ml of concentrated sulfuric acid which was cooled to about 2° C. The resultant solution was slowly poured into 1,000 ml of ice water, to thereby precipitate a crystal. The precipitated crystal was collected by filtration and washed with water until the washing water became neutral, to thereby obtain 9.4 g of a crystal. An X-ray diffraction spectrum of the obtained crystal is shown in FIG. 2. It is found from FIG. 2 that the crystal is in an amorphous state with disordered crystal structure.

Preparation Example 3

Figure 3:
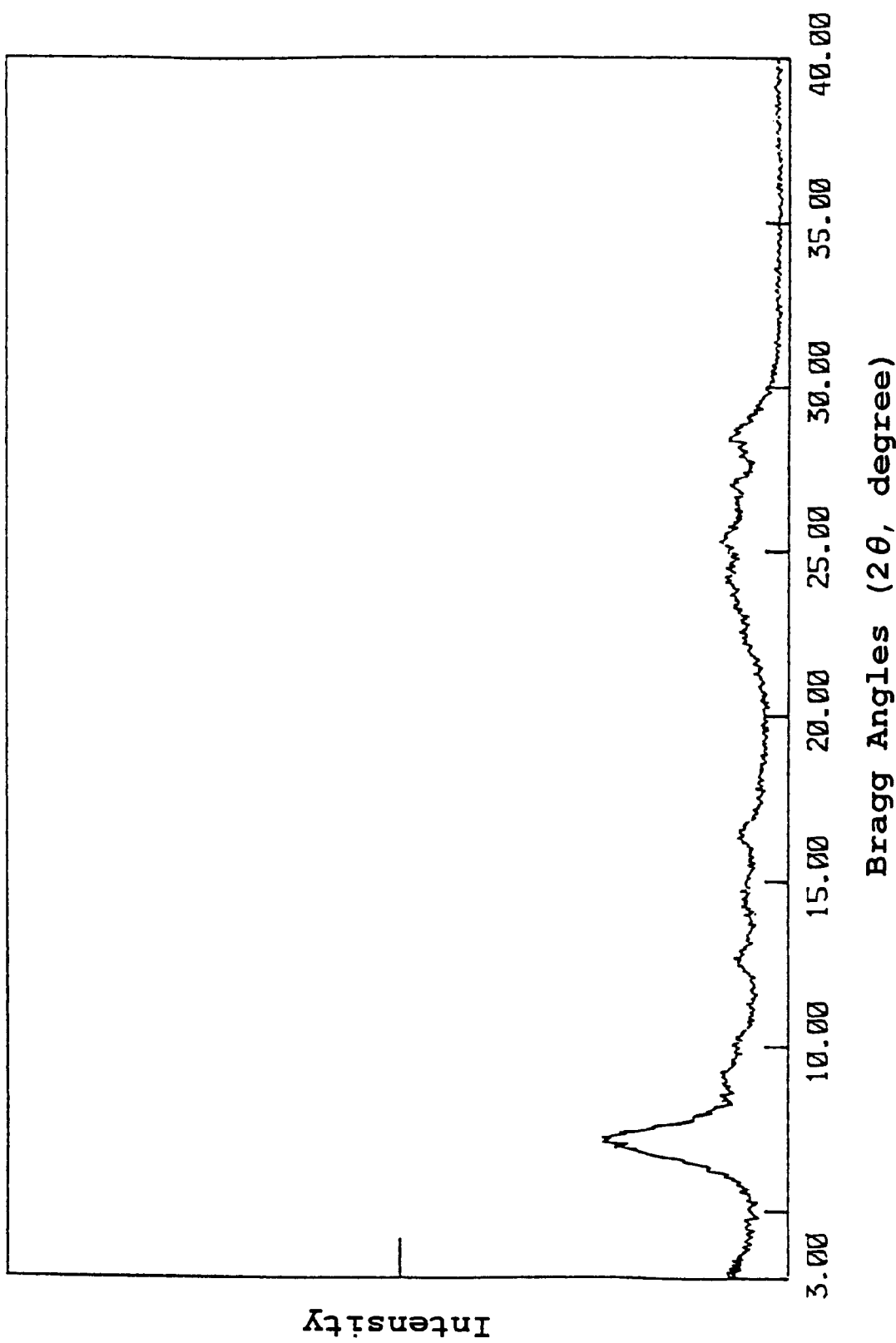
FIG. 3 is an X-ray diffraction spectrum of a crystal obtained in Preparation example 3.

An acid pasting treatment was conducted in the same manner as in Preparation example 2 except for using 10.0 g of the TiOPc obtained in Preparation example 1 only in place of using 7.0 g of the TiOPc obtained in Preparation example 1 and 3.0 g of a $H_2Pc$. As a result, 9.3 g of a crystal was obtained. An X-ray diffraction spectrum of the obtained crystal is shown in FIG. 3. It is found from FIG. 3 that the crystal is in an amorphous state with disordered crystal structure.

Preparation Example 4

Figure 4:
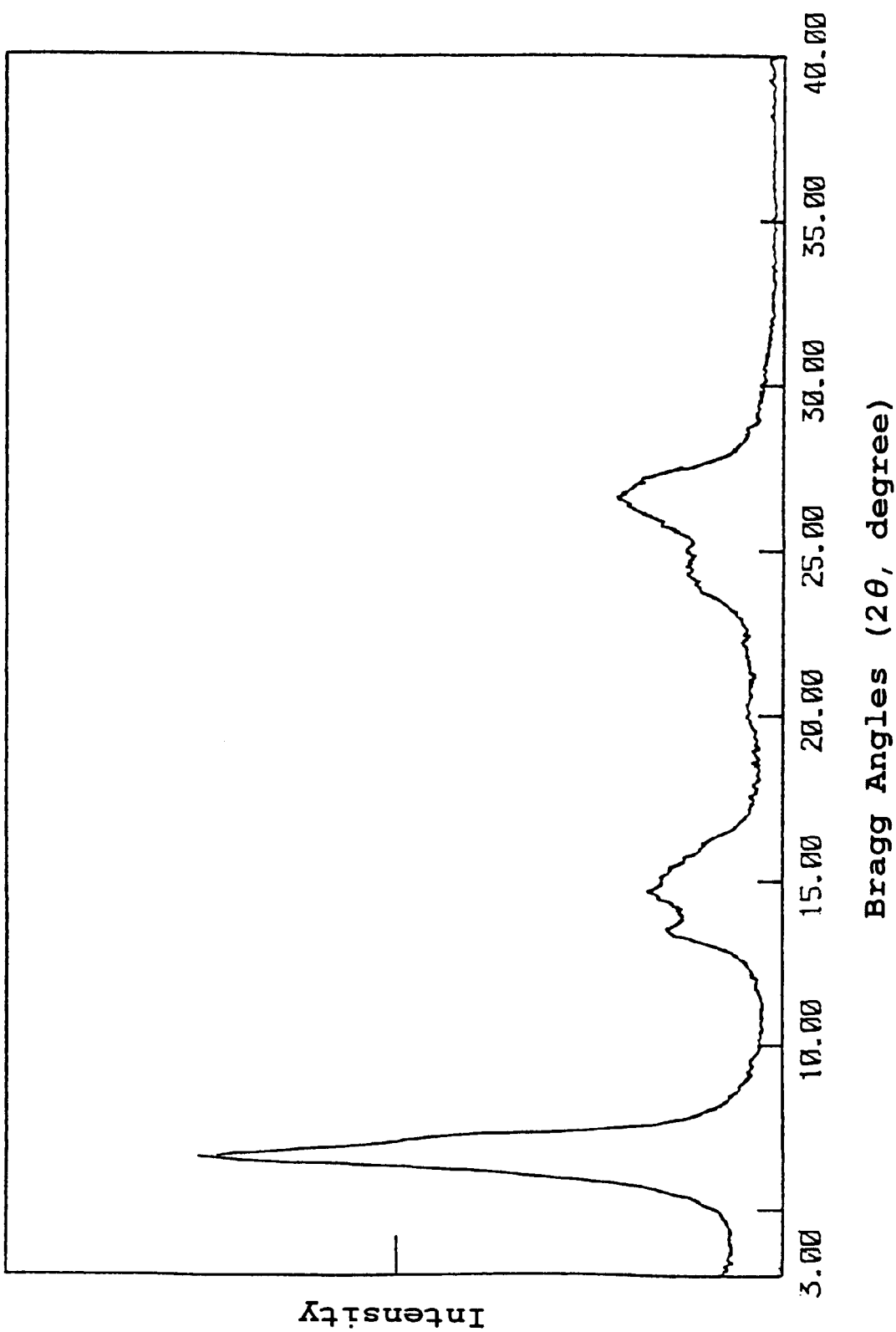
FIG. 4 is an X-ray diffraction spectrum of a crystal obtained in Preparation example 4.

An acid pasting treatment was conducted in the same manner as in Preparation example 2 except for using 10.0 g of a $H_2Pc$ only in place of using 7.0 g of the TiOPc obtained in Preparation example 1 and 3.0 g of a $H_2Pc$. As a result, 9.5 g of a crystal was obtained. An X-ray diffraction spectrum of the obtained crystal is shown in FIG. 4. It is found from FIG. 4 that the crystal is in an amorphous state with disordered crystal structure.

Preparation Example 5

Figure 5:
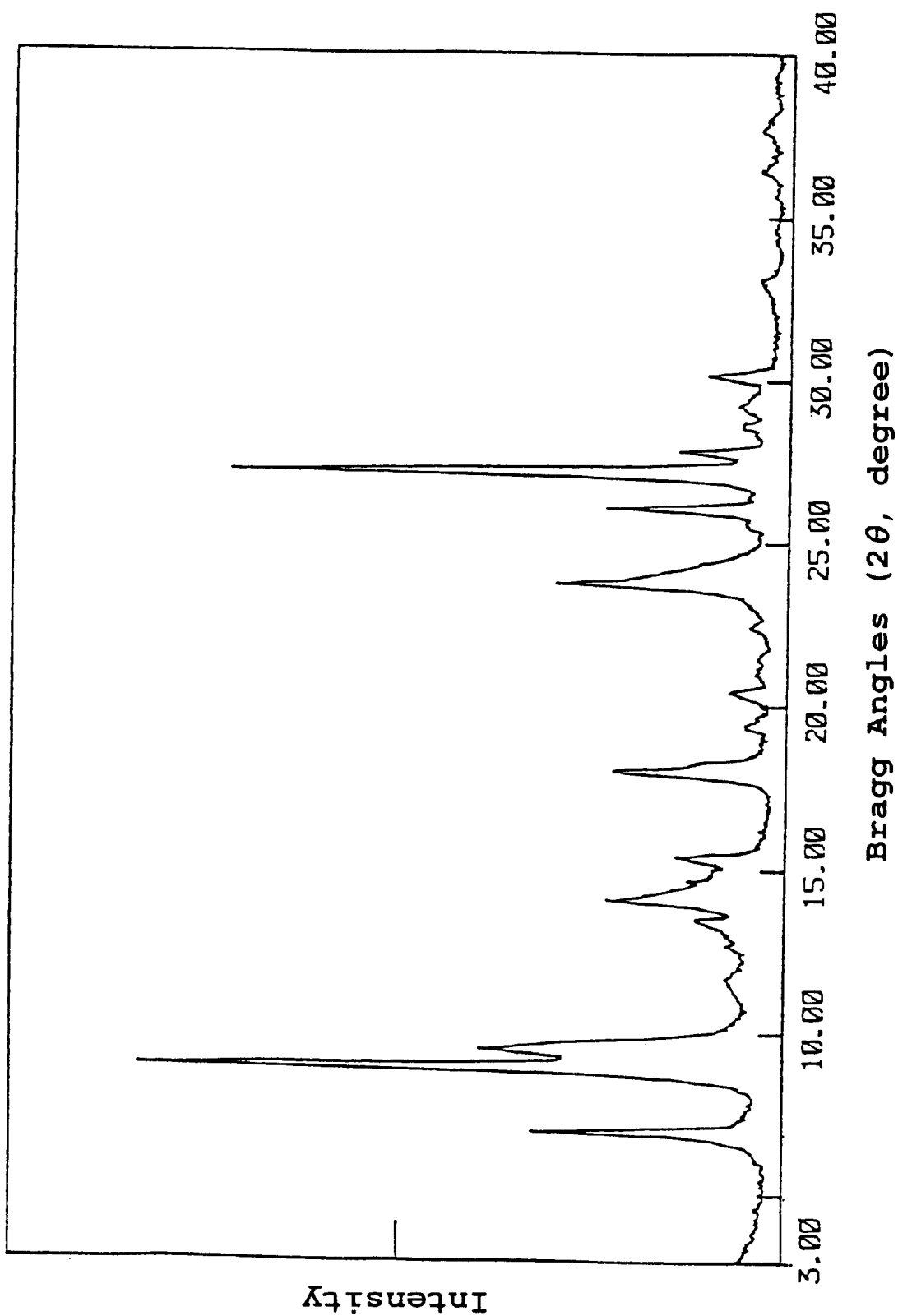
FIGS. 5 and 6 are an X-ray diffraction spectrum and an infrared absorption spectrum, respectively, of a crystal obtained in Preparation example 5.
Figure 6:
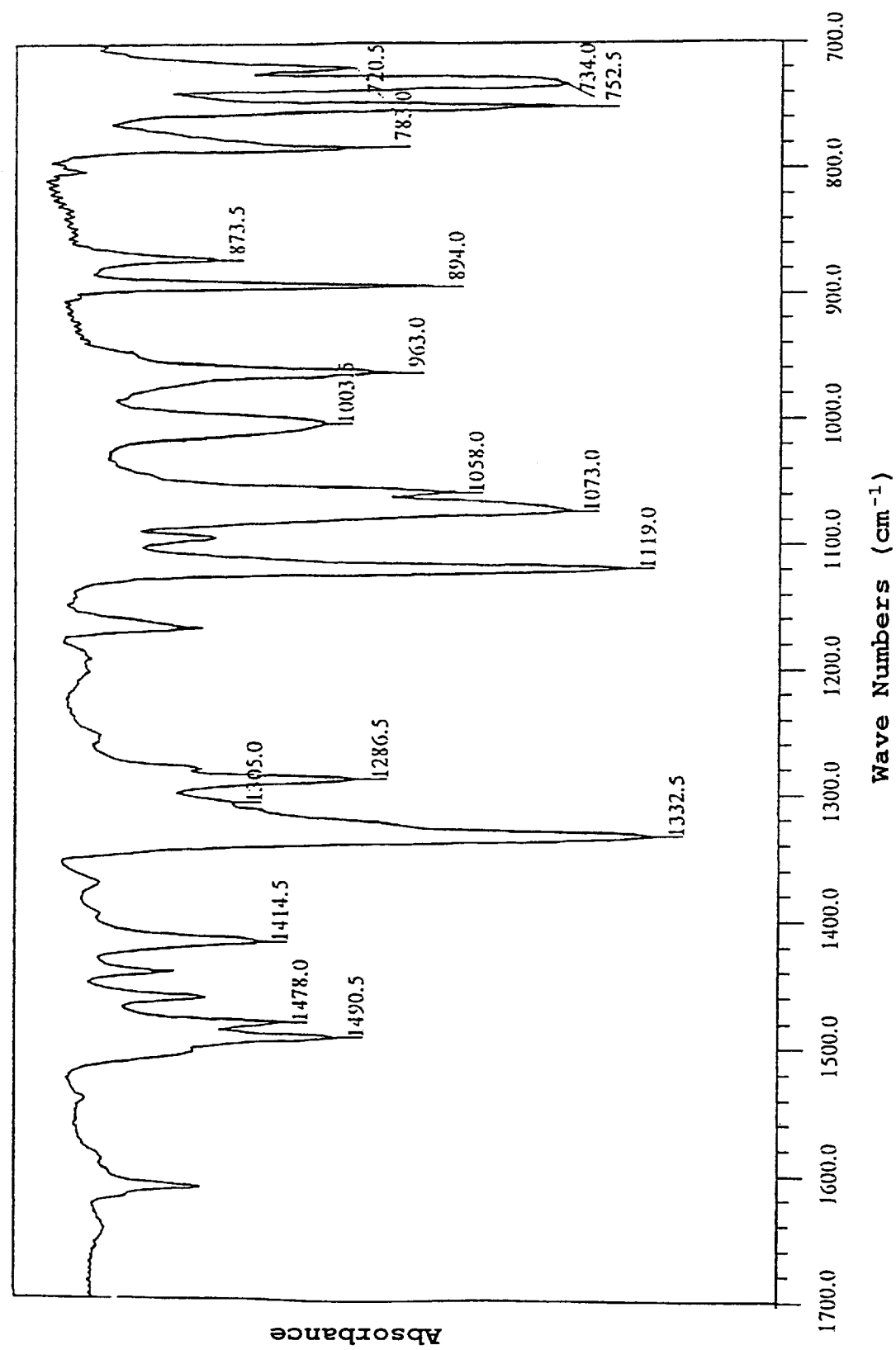

1.0 g of the amorphous phthalocyanine composition obtained in Preparation example 2 and 28.0 g of water were charged in a 100 ml flask and heated at 90° C. while stirring. After 10 minutes, 2.0 g of naphthalene was added to the resultant solution, which was subsequently heated at the same temperature for 1 hour while stirring, and then, the reaction was terminated. The solution was subsequently cooled down to room temperature and the resultant precipitated crystal was collected by filtration and washed with methanol. As a result, 0.9 g of a crystal was obtained. An X-ray diffraction spectrum and an infrared absorption spectrum using an FT-IR spectrometer, Model 1760X (trade name, manufactured by Perkin-Elmer LTD.) of the obtained crystal are shown in FIGS. 5 and 6, respectively. It is found from FIG. 5 that the crystal has diffraction peaks at 7.0°, 9.0°, 14.1°, 18.0°, 23.7° and 27.3° of Bragg angles (2θ±0.2°). It is also found from FIG. 6 that the crystal has strong absorption peaks at 1332.5 $cm^{-1}$, 1119.0 $cm^{-1}$, 1073.0 $cm^{-1}$, 1003.5 $cm^{-1}$, 963.0 $cm^{-1}$, 894.0 $cm^{-1}$, 783.0 $cm^{-1}$, 752.5 $cm^{-1}$ and 734.0 $cm^{-1}$ of wave numbers (±2 $cm^{-1}$).

Preparation Example 6

A crystal transformation was conducted in the same manner as in Preparation example 5 except for using 2.0 g of o-dichlorobenzene in place of 2.0 g of naphthalene. As a result, 0.9 g of a crystal was obtained. An X-ray diffraction spectrum and an infrared absorption spectrum of the obtained crystal were the same as those in FIGS. 5 and 6, respectively.

Preparation Example 7

A crystal transformation was conducted in the same manner as in Preparation example 5 except for using 1.0 g of naphthalene and 1.0 g of ethylcyclohexane in place of 2.0 g of naphthalene. As a result, 0.9 g of a crystal was obtained. An X-ray diffraction spectrum and an infrared absorption spectrum of the obtained crystal were the same as those in FIGS. 5 and 6, respectively.

Preparation Example 8

A crystal transformation was conducted in the same manner as in Preparation example 5 except for using 1.0 g of naphthalene and 1.0 g of cyclohexanone in place of 2.0 g of naphthalene. As a result, 0.9 g of a crystal was obtained. An X-ray diffraction spectrum and an infrared absorption spectrum of the obtained crystal were the same as those in FIGS. 5 and 6, respectively.

Preparation Example 9

A crystal transformation was conducted in the same manner as in Preparation example 5 except for using 1.0 g of naphthalene and 1.0 g of toluene in place of 2.0 g of naphthalene. As a result, 0.9 g of a crystal was obtained. An X-ray diffraction spectrum and an infrared absorption spectrum of the obtained crystal were the same as those in FIGS. 5 and 6, respectively.

Preparation Example 10

A crystal transformation was conducted in the same manner as in Preparation example 5 except for using 1.0 g of naphthalene and 1.0 g of n-octane in place of 2.0 g of naphthalene. As a result, 0.9 g of a crystal was obtained. An X-ray diffraction spectrum and an infrared absorption spectrum of the obtained crystal were the same as those in FIGS. 5 and 6, respectively.

Preparation Example 11

A crystal transformation was conducted in the same manner as in Preparation example 5 except for using a mixture comprising 0.7 g of the amorphous TiOPc obtained in Preparation example 3 and 0.3 g of the amorphous $H_2Pc$ obtained in Preparation example 4 in place of 1.0 g of the amorphous phthalocyanine composition obtained in Preparation example 2. As a result, 0.9 g of a crystal was obtained. An X-ray diffraction spectrum and an infrared absorption spectrum of the obtained crystal were the same as those in FIGS. 5 and 6, respectively.

Comparative Preparation Example 1

Figure 7:
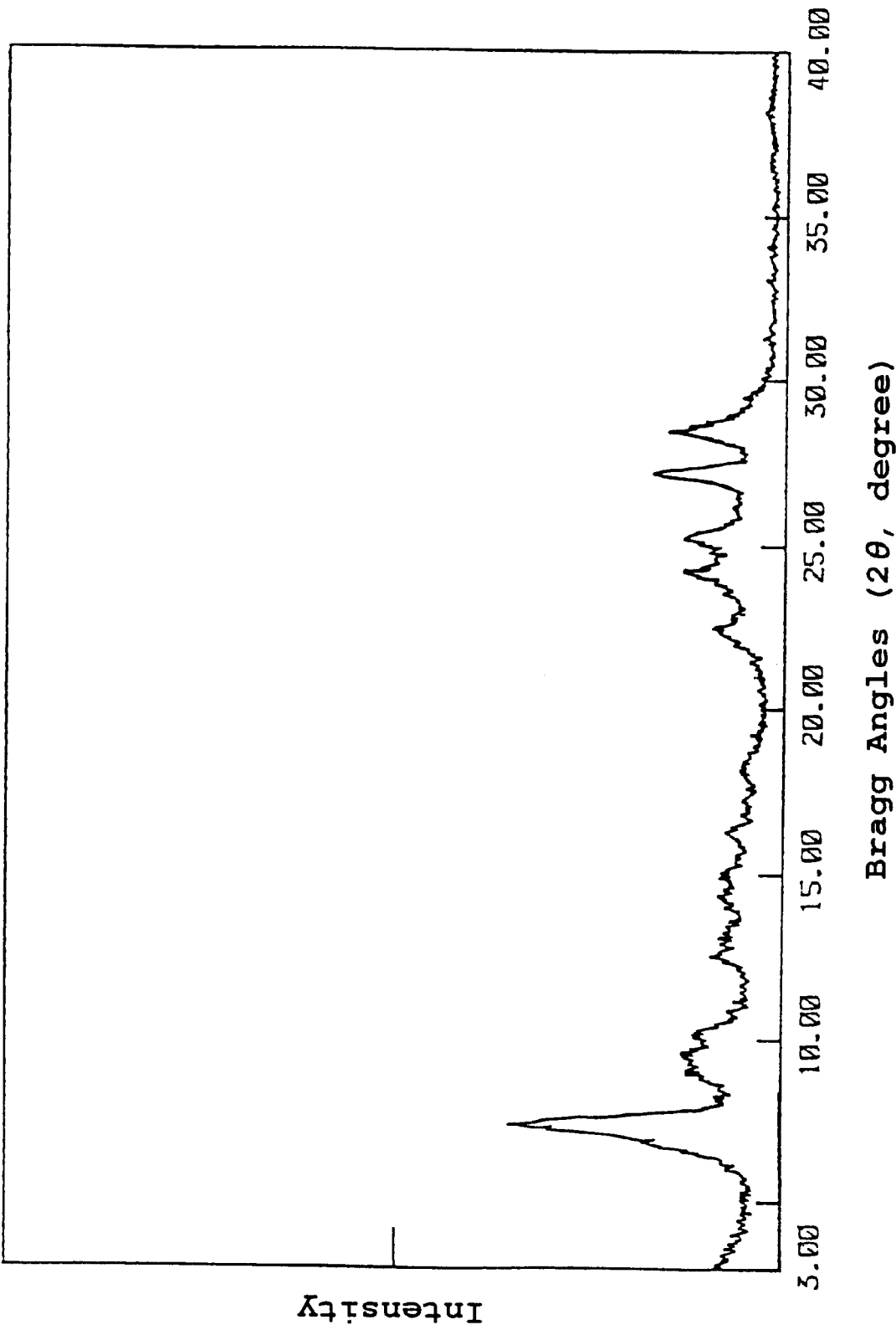
FIGS. 7 and 8 are an X-ray diffraction spectrum and an infrared absorption spectrum, respectively, of a crystal obtained in Comparative preparation example 1.
Figure 8:
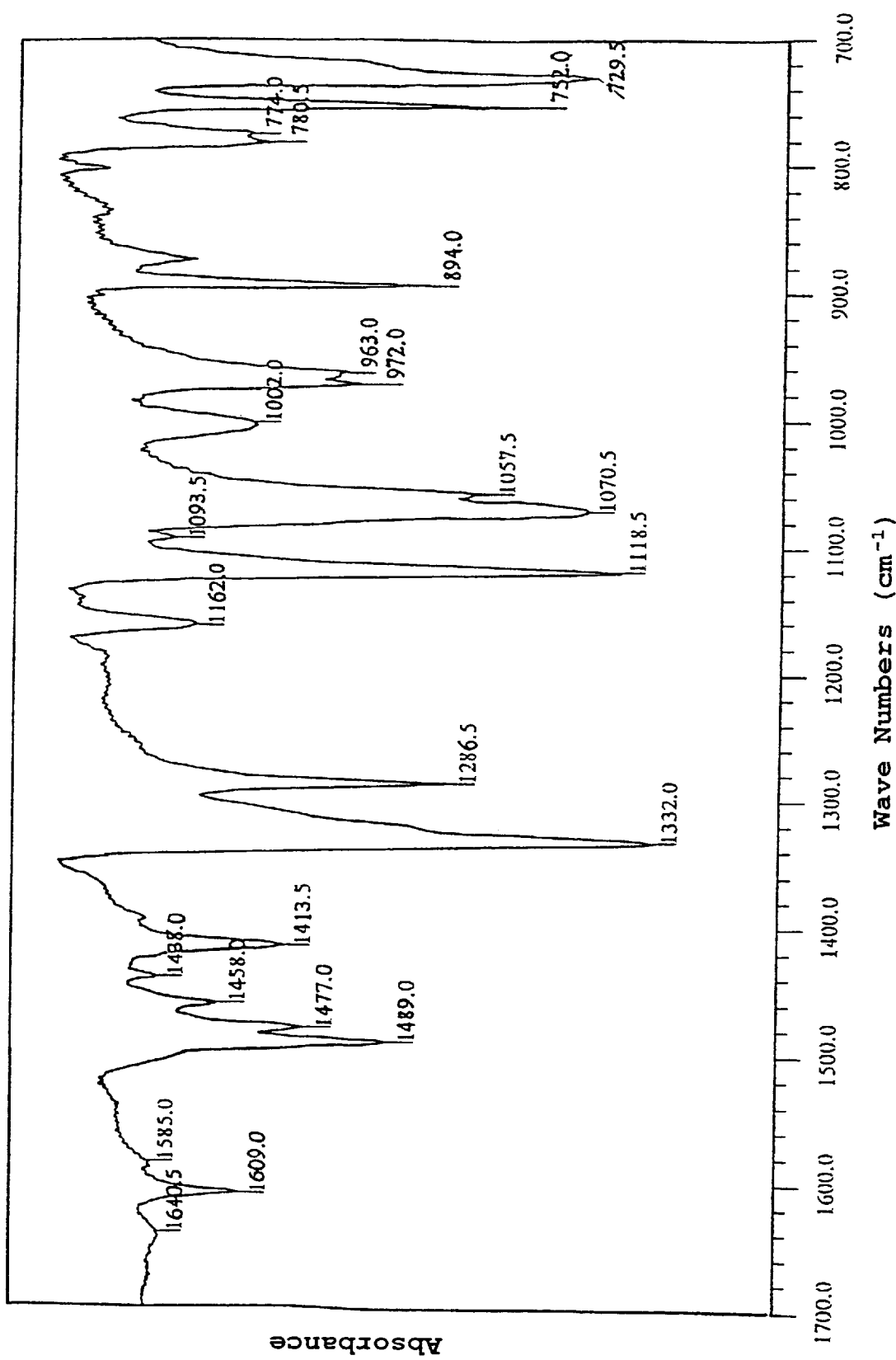

A crystal transformation was conducted in the same manner as in Preparation example 5 except for using 2.0 g of 1,2-dichloroethane in place of 2.0 g of naphthalene. As a result, 0.9 g of a crystal was obtained. An X-ray diffraction spectrum and an infrared absorption spectrum of the obtained crystal are shown in FIGS. 7 and 8, respectively. It is found from FIG. 7 that the crystal has diffraction peaks at 7.4° and 27.2° of Bragg angles (2θ±0.2°), but the intensities of peaks are low all over the spectrum. It is also found from FIG. 8 that the crystal has absorption peaks at 1332.0 $cm^{-1}$, 1118.5 $cm^{-1}$, 1070.5 $cm^{-1}$, 1002.0 $cm^{-1}$, 972.0 $cm^{-1}$, 963.0 $cm^{-1}$, 894.0 $cm^{-1}$, 752.0 $cm^{-1}$ and 729.5 $cm^{-1}$ of wave numbers (±2 $cm^{-1}$).

Comparative Preparation Example 2

Figure 9:
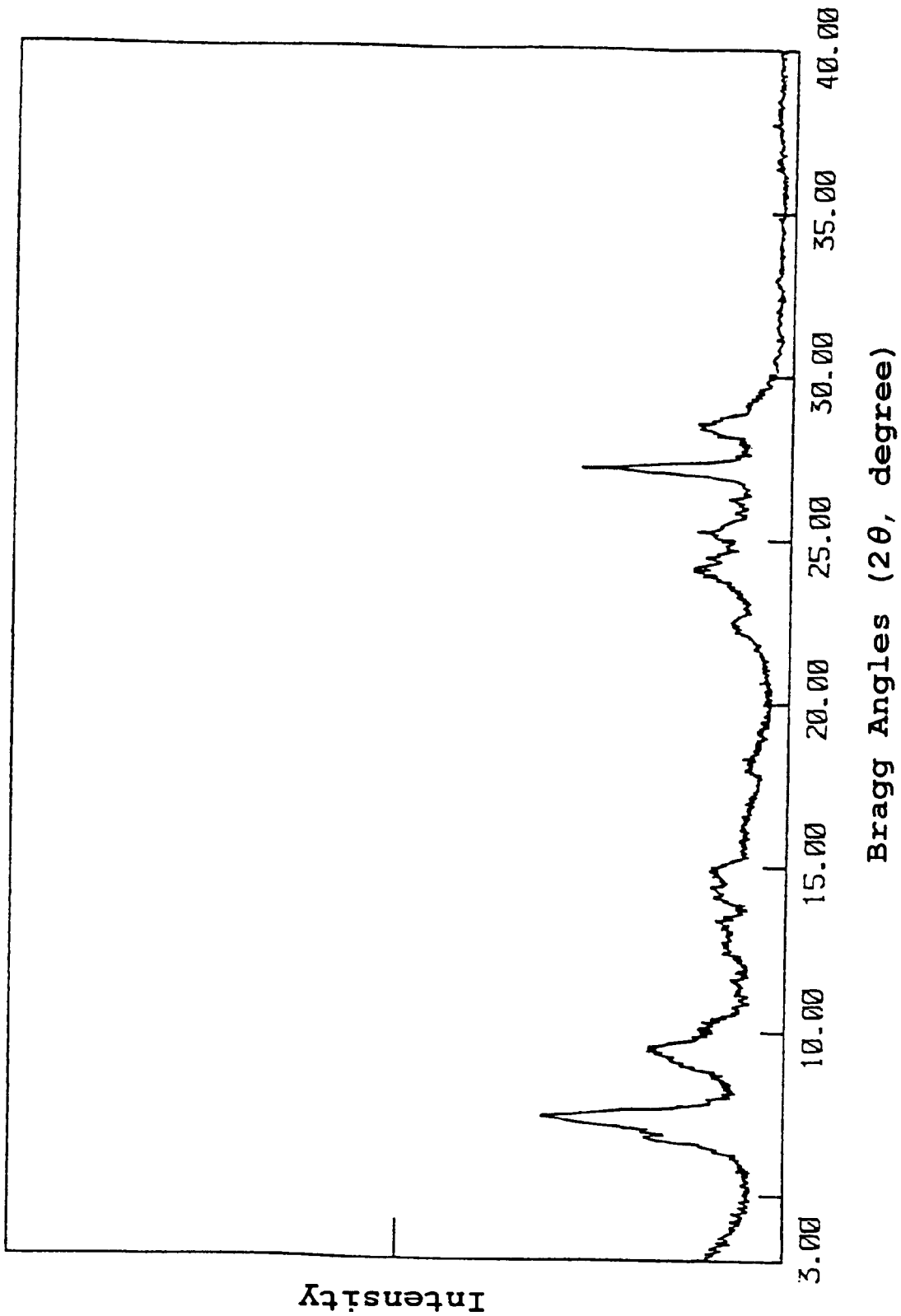
FIGS. 9 and 10 are an X-ray diffraction spectrum and an infrared absorption spectrum, respectively, of a crystal obtained in Comparative preparation example 2.
Figure 10:
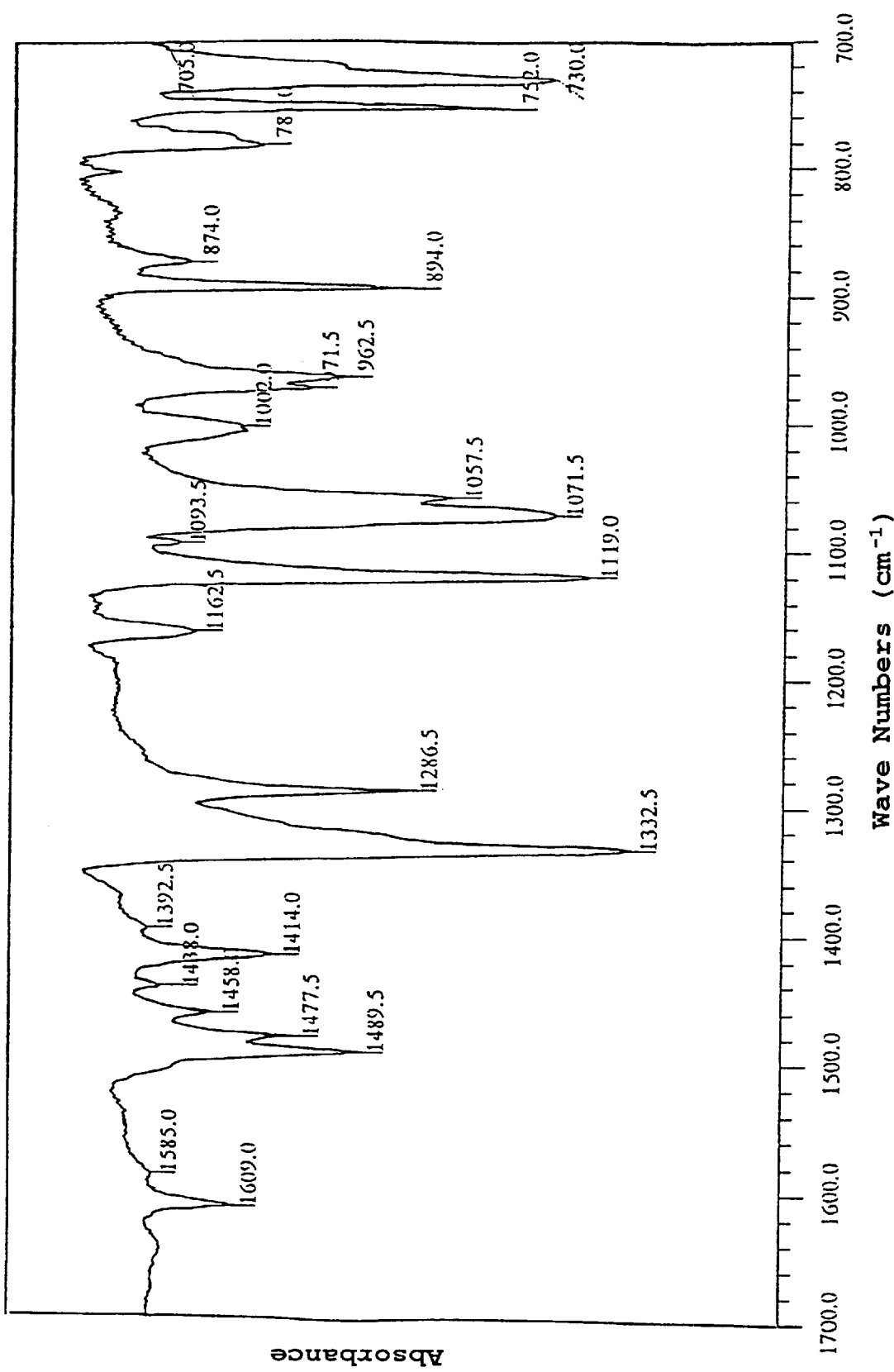

A crystal transformation was conducted in the same manner as in Preparation example 5 except for using 2.0 g of n-octane in place of 2.0 g of naphthalene. As a result, 0.9 g of a crystal was obtained. An X-ray diffraction spectrum and an infrared absorption spectrum of the obtained crystal are shown in FIGS. 9 and 10, respectively. It is found from FIG. 9 that the crystal has diffraction peaks at 7.4° and 27.2° of Bragg angles (2θ±0.2°), but the intensities of peaks are low all over the spectrum. It is also found from FIG. 10 that the crystal has absorption peaks at 1332.5 cm$^{-1}$, 1119.0 cm$^{-1}$, 1071.5 cm$^{-1}$, 1002.0 cm$^{-1}$, 971.5 cm$^{-1}$, 962.5 cm$^{-1}$, 894.0 cm$^{-1}$, 752.0 cm$^{-1}$ and 730.0 cm$^{-1}$ of wave numbers (±2 cm$^{-1}$).

Comparative Preparation Example 3

Figure 11:
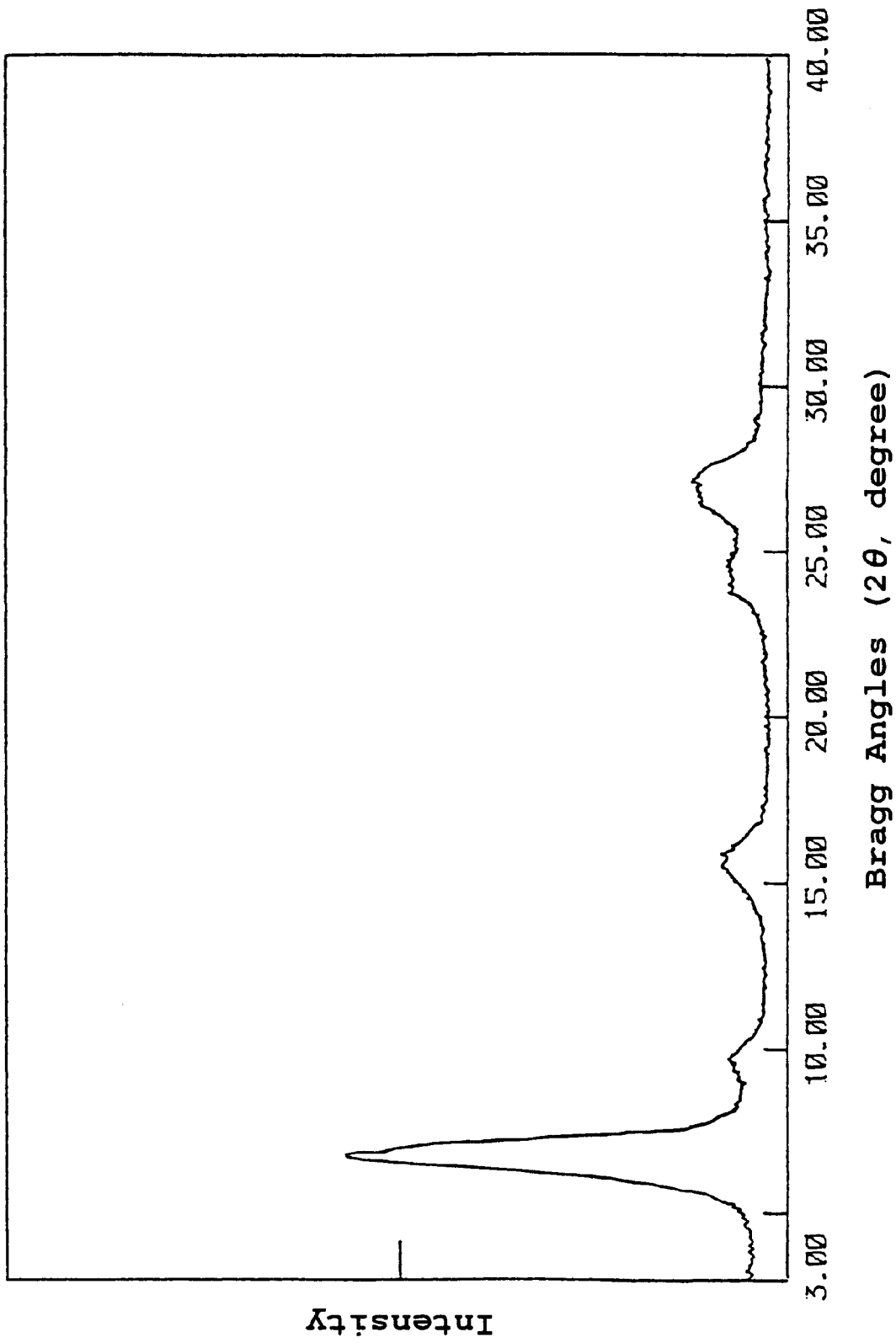
FIG. 11 is an X-ray diffraction spectrum of a crystal obtained in Comparative preparation example 3.

An acid pasting treatment was conducted in the same manner as in Preparation example 2 except for using 10.0 g of a copper phthalocyanine, P-1006 (trade name, produced by Tokyo Chemical Industry Co., LTD.) only in place of 7.0 g of the TiOPc obtained in Preparation example 1 and 3.0 g of a H$_2$Pc. As a result, 9.4 g of a crystal was obtained. An X-ray diffraction spectrum of the obtained crystal is shown in FIG. 11. It is found from FIG. 11 that the crystal is in an amorphous state with disordered crystal structure.

Comparative Preparation Example 4

Figure 12:
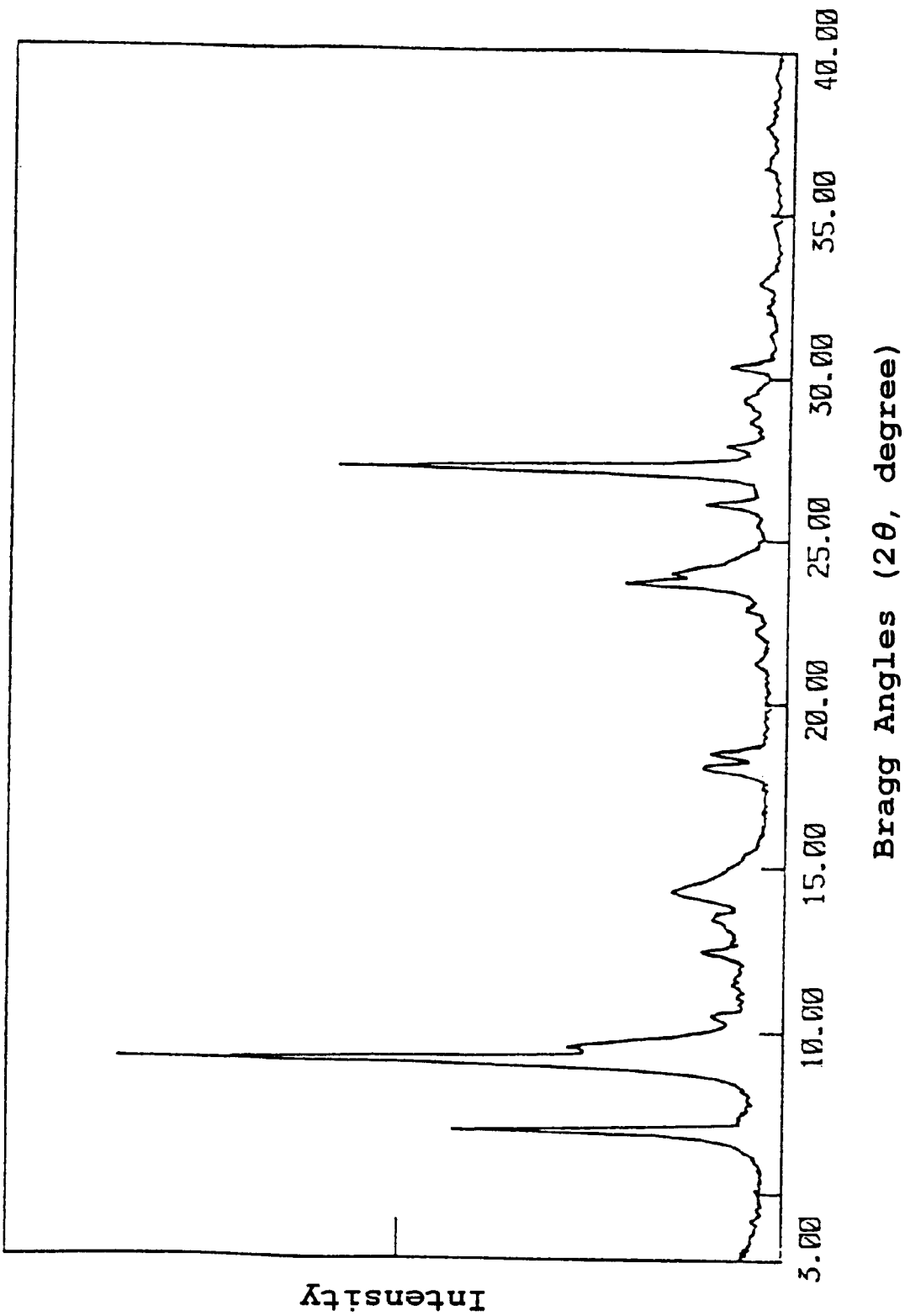
FIGS. 12 and 13 are an X-ray diffraction spectrum and an infrared absorption spectrum, respectively, of a crystal obtained in Comparative preparation example 4.
Figure 13:
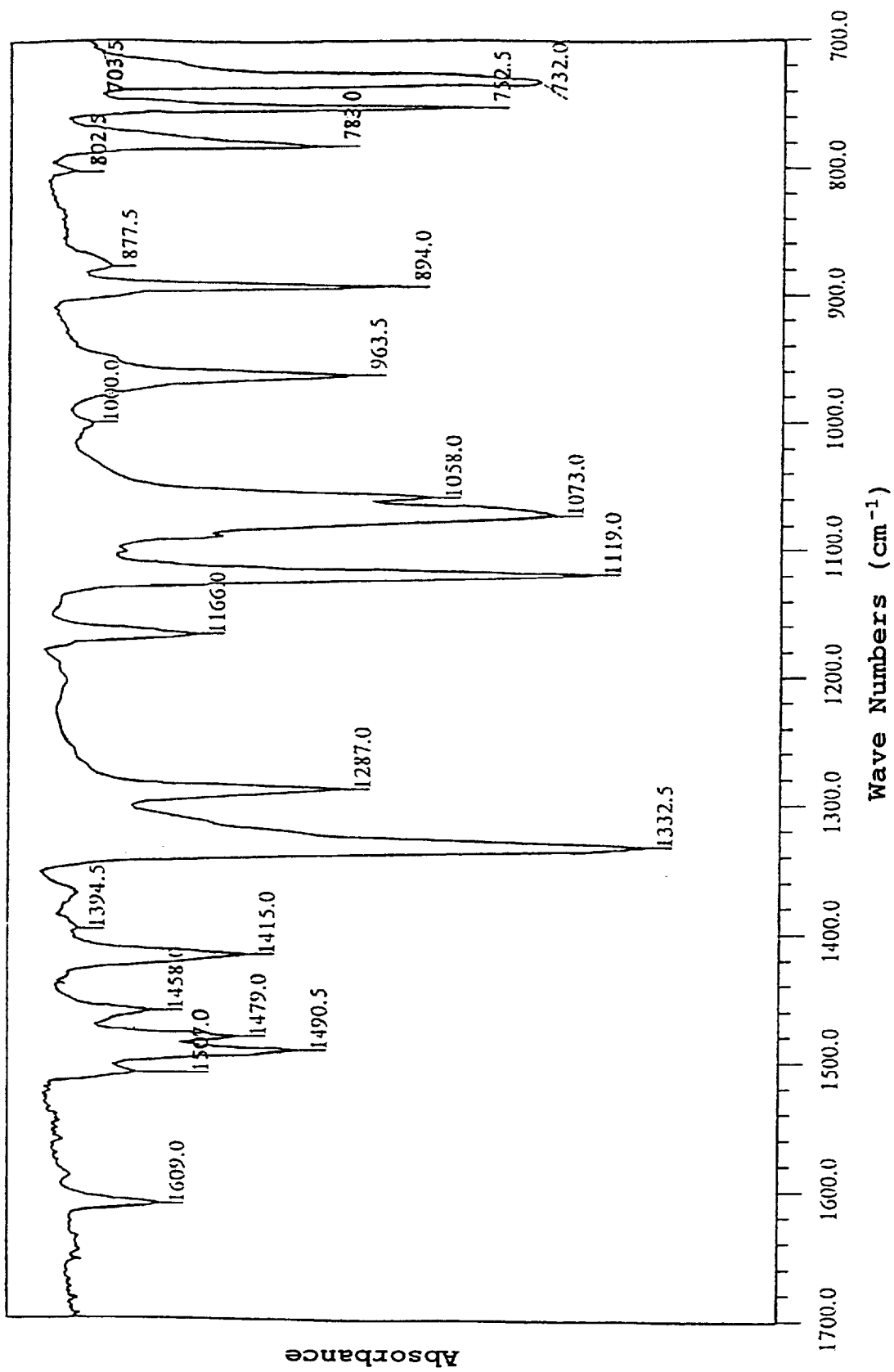

A crystal transformation was conducted in the same manner as in Preparation example 5 except for using a mixture comprising 0.7 g of the amorphous TiOPc obtained in Preparation example 3 and 0.3 g of the amorphous copper phthalocyanine obtained in Comparative preparation example 3 in place of 1.0 g of the amorphous phthalocyanine composition obtained in Preparation example 2. As a result, 0.9 g of a crystal was obtained. An X-ray diffraction spectrum and an infrared absorption spectrum of the obtained crystal are shown in FIGS. 12 and 13, respectively. The crystal had diffraction peaks at 7.0°, 9.2°, 14.3, 18.1°, 18.5°, 23.7°, 24.0° and 27.2° of Bragg angles (2θ±0.2°) as shown in FIG. 12. In addition, the crystal had absorption peaks at 1332.5 cm$^{-1}$, 1119.0 cm$^{-1}$, 1073.0 cm$^{-1}$, 963.5 cm$^{-1}$, 894.0 cm$^{-1}$, 752.5 cm$^{-1}$ and 732.0 cm$^{-1}$ of wave numbers (±2 cm$^{-1}$) as shown in FIG. 13.

Comparative Preparation Example 5

Figure 14:
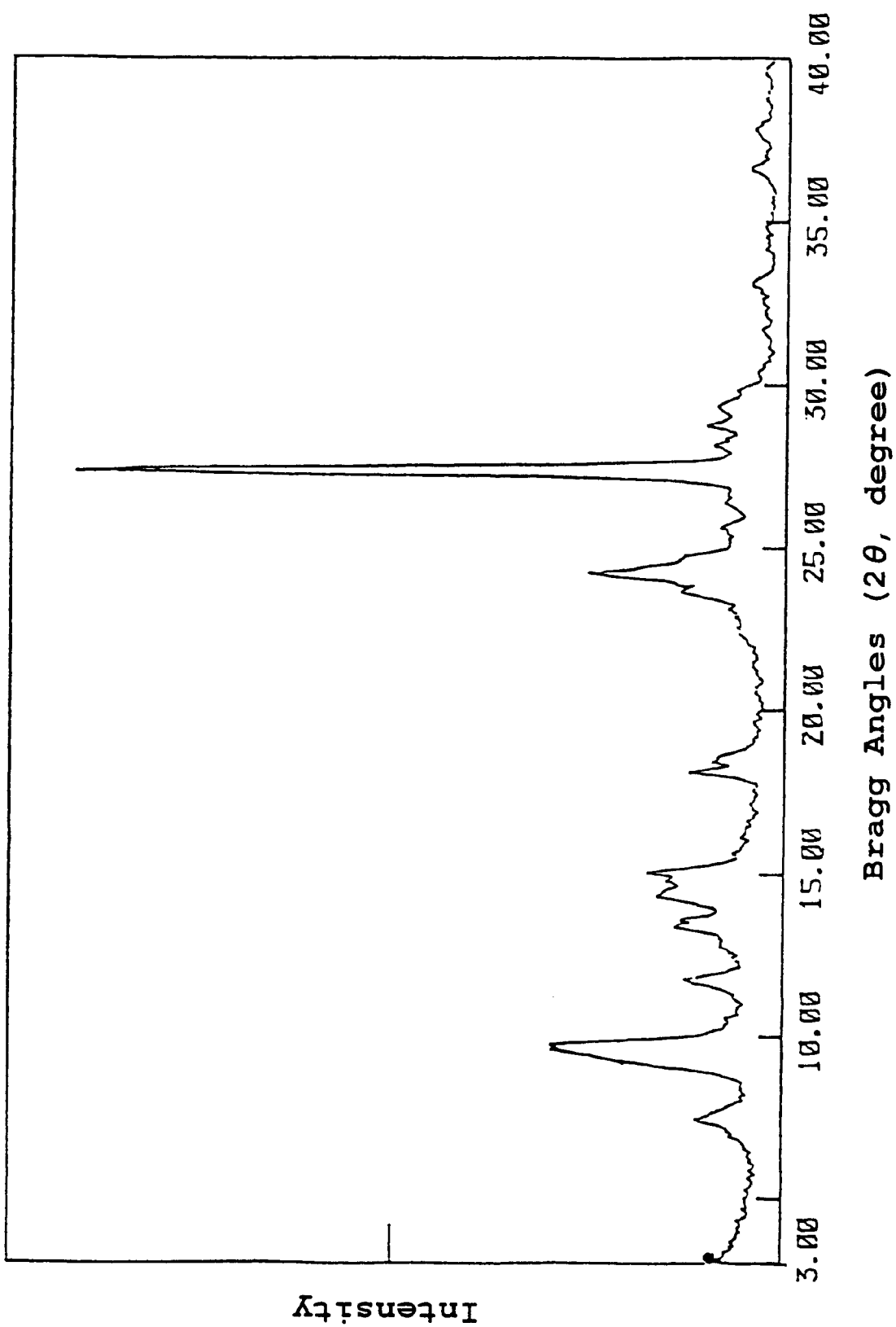
FIGS. 14 and 15 are an X-ray diffraction spectrum and an infrared absorption spectrum, respectively, of a crystal obtained in Comparative preparation example 5.
Figure 15:
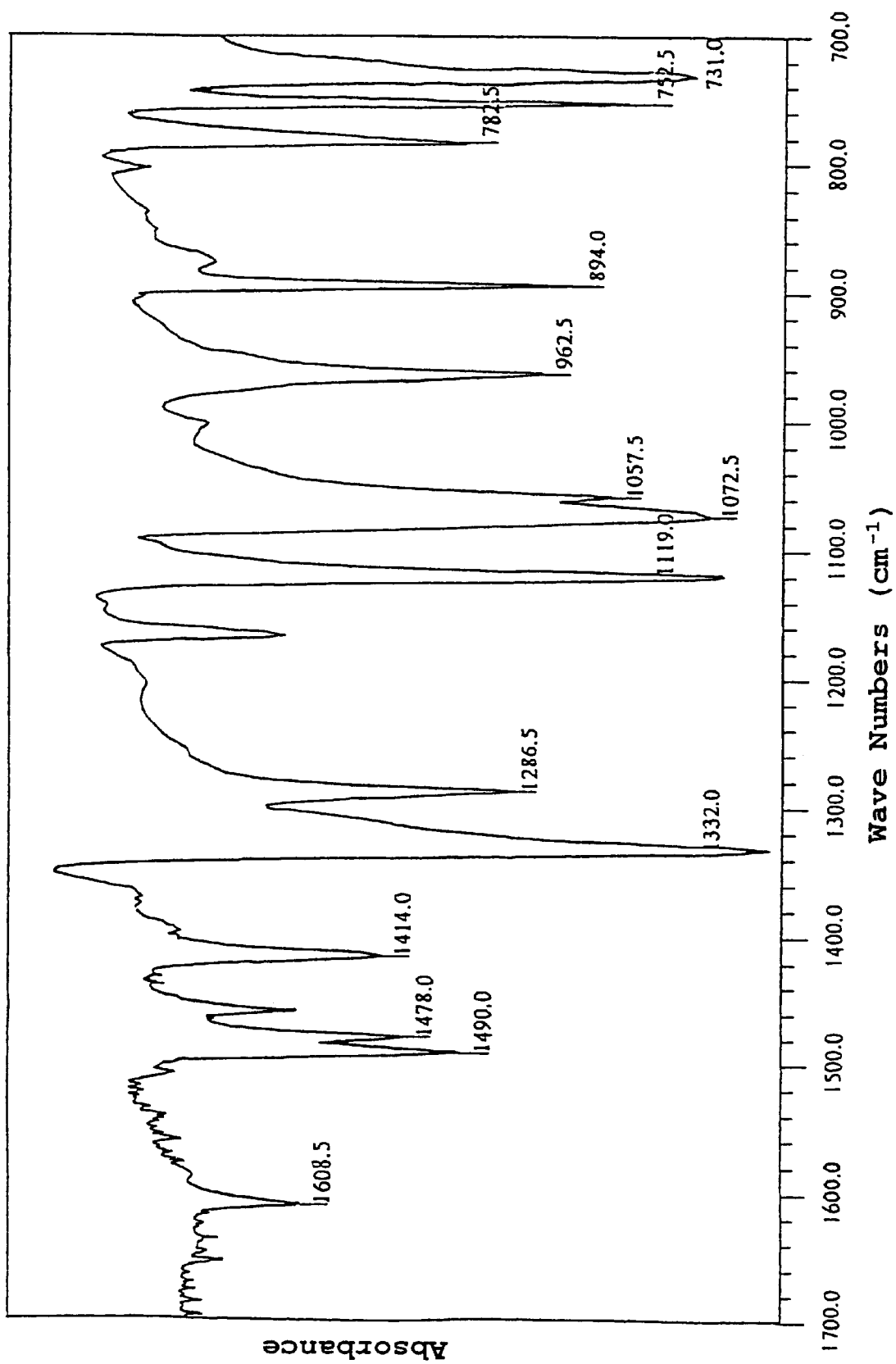

A crystal transformation was conducted in the same manner as in Preparation example 6 except for using 1.0 g of the amorphous TiOPc obtained in Preparation example 3 in place of 1.0 g of the amorphous phthalocyanine composition obtained in Preparation example 2. As a result, 0.9 g of a crystal was obtained. An X-ray diffraction spectrum and an infrared absorption spectrum of the obtained crystal are shown in FIGS. 14 and 15, respectively. The crystal had diffraction peaks at 9.5°, 9.7°, 11.7°, 15.0°, 23.5°, 24.1° and 27.3° of Bragg angles (2θ±0.2°) as shown in FIG. 14. In addition, the crystal had strong absorption peaks at 1332.0 cm$^{-1}$, 1119.0 cm$^{-1}$, 1072.5 cm$^{-1}$, 962.5 cm$^{-1}$, 894.0 cm$^{-1}$, 782.5 cm$^{-1}$, 752.5 cm$^{-1}$ and 731.0 cm$^{-1}$ of wave numbers (±2 cm$^{-1}$) as shown in FIG. 15.

Preparation Example 12

Figure 16:
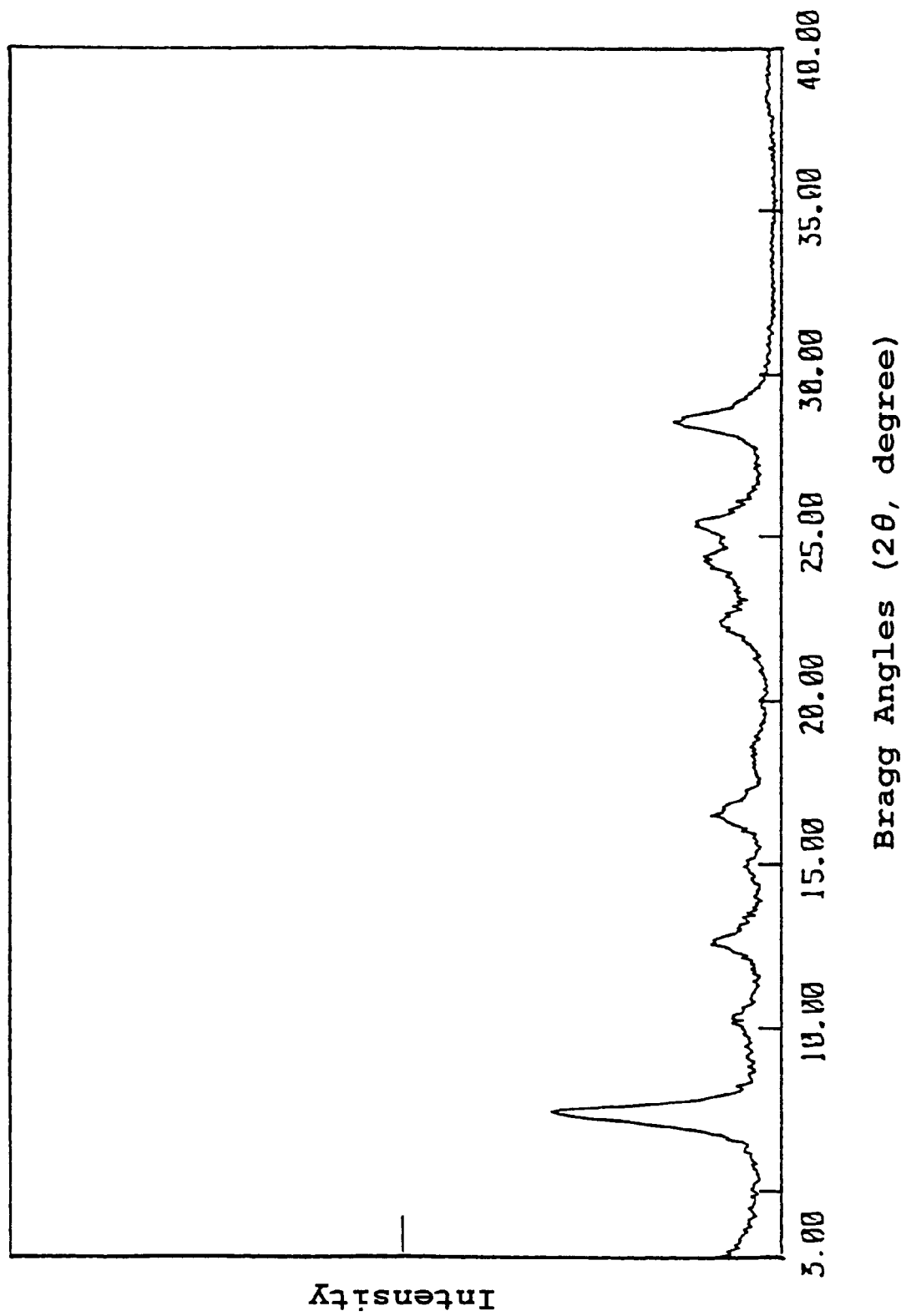
FIG. 16 is an X-ray diffraction spectrum of a crystal obtained in Preparation example 12.

10.0 g of the TiOPc obtained in Preparation example 1 was gradually added to and dissolved in 100 ml of concentrated sulfuric acid which was cooled to about 2° C. The resultant solution was slowly poured into 1,000 ml of ice water, to thereby precipitate a crystal. The precipitated crystal was collected by filtration and washed with water until the washing water became neutral, and then, subjected to suspension stirring washing in 500 ml of DMF for 30 minutes, to thereby obtain 9.3 g of a crystal. An X-ray diffraction spectrum of the obtained crystal is shown in FIG. 16. It is found from FIG. 16 that the crystal is in an amorphous state with disordered crystal structure.

Preparation Example 13

Figure 17:
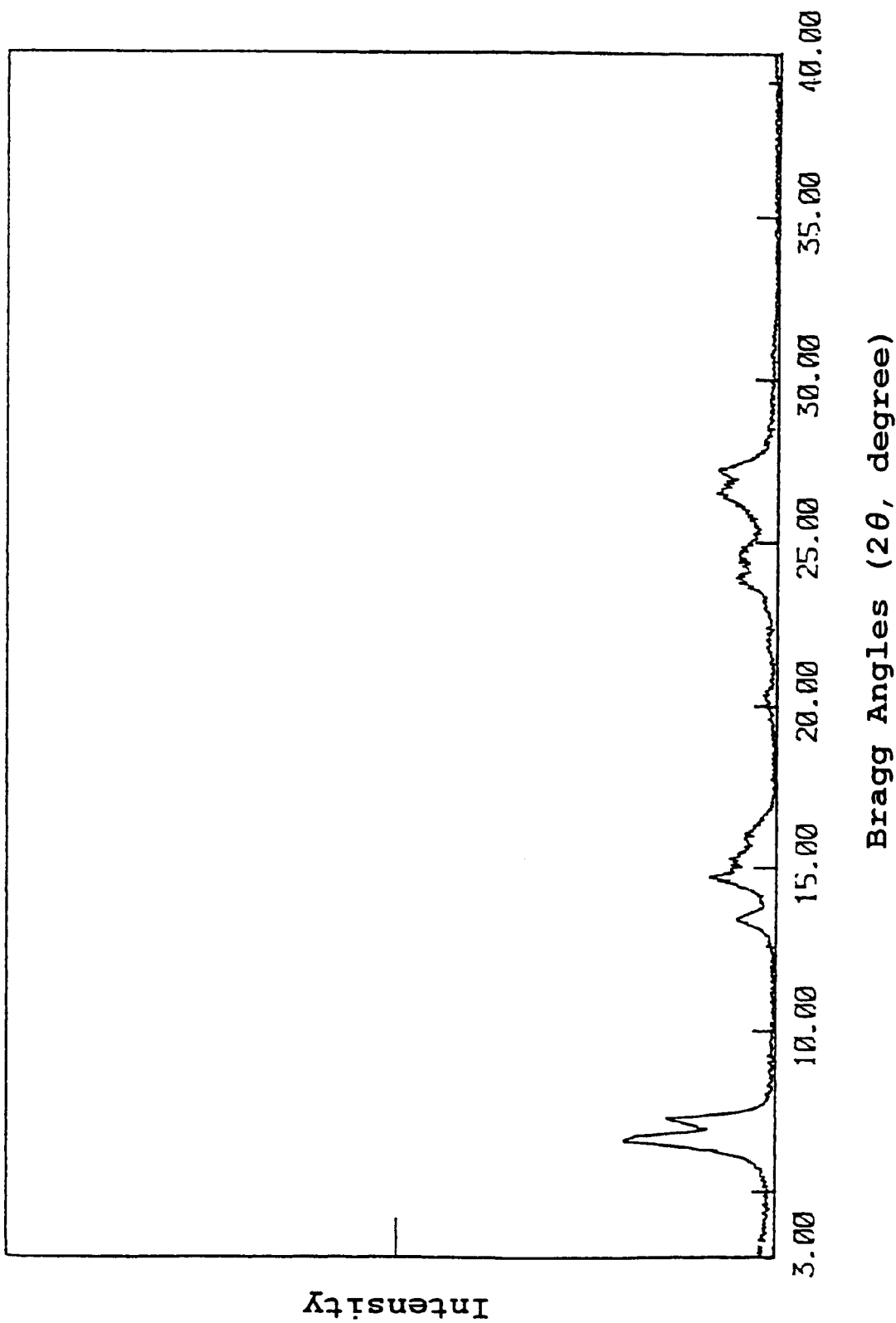
FIG. 17 is an X-ray diffraction spectrum of a crystal obtained in Preparation example 13.

An acid pasting treatment was conducted in the same manner as in Preparation example 12 except for using 10.0 g of a H$_2$Pc only in place of 10.0 g of the TiOPc obtained in Preparation examples 1, and suspension stirring washing in 500 ml of DMF was conducted for 30 minutes, to thereby obtain 9.4 g of a crystal. An X-ray diffraction spectrum of the obtained crystal is shown in FIG. 17. It is found from FIG. 17 that the crystal is in an amorphous state with disordered crystal structure.

Preparation Example 14

Figure 18:
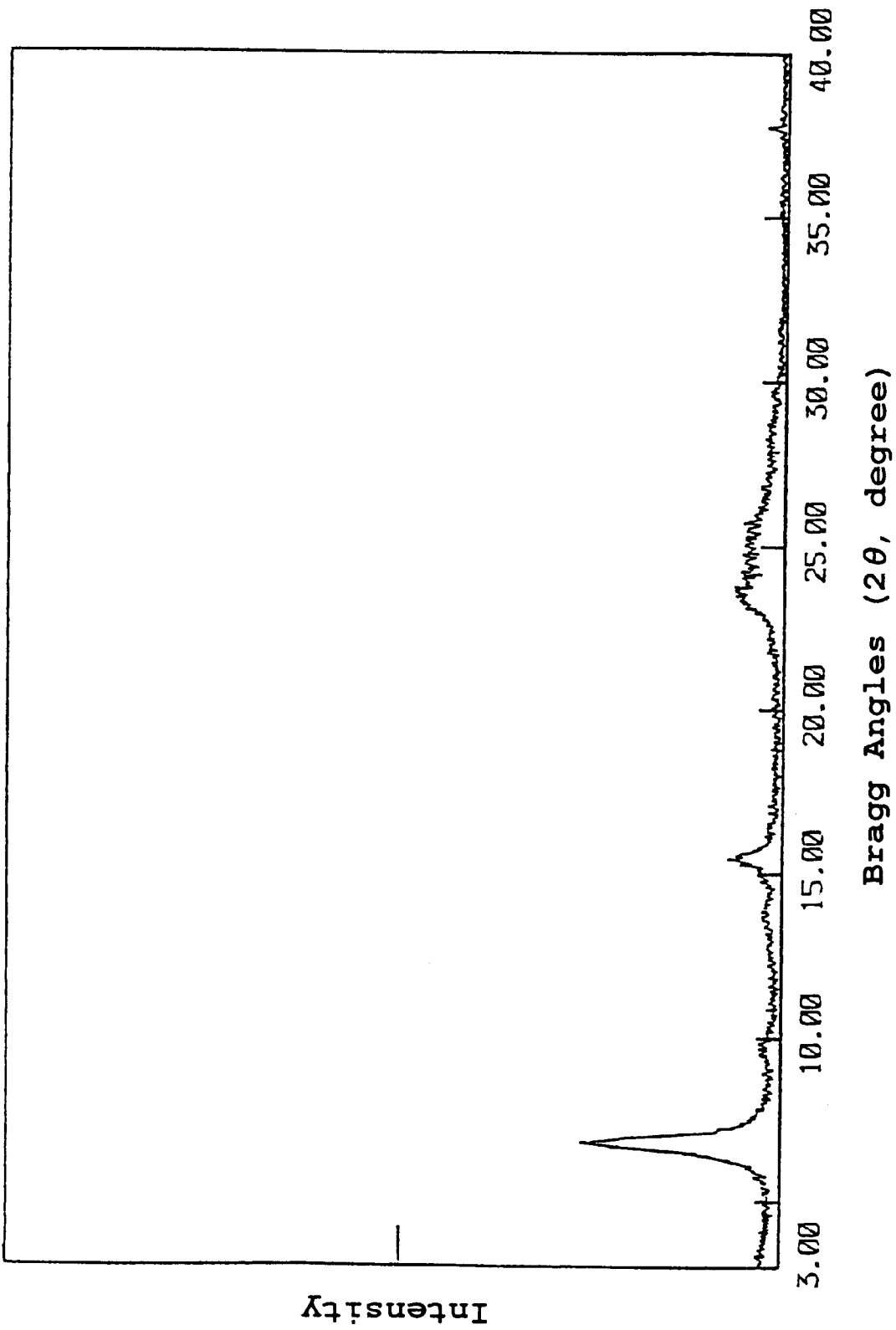
FIG. 18 is an X-ray diffraction spectrum of a crystal obtained in Preparation example 14.

An acid pasting treatment was conducted in the same manner as in Preparation examples 12 except for using the mixture comprising 7.0 g of the TiOPc obtained in Preparation example 1 and 3.0 g of a H$_2$Pc in place of 10.0 g of the TiOPc obtained in Preparation example 1, to thereby obtain 9.3 g of a crystal. An X-ray diffraction spectrum of the crystal is shown in FIG. 18. It is found from FIG. 18 that the crystal is in an amorphous state with disordered crystal structure.

Preparation Example 15

An acid pasting treatment was conducted in the same manner as in Preparation example 12 except for using DMA in place of DMF, to thereby obtain 9.4 g of a crystal. An X-ray diffraction spectrum of the obtained crystal was the same as that in FIG. 16.

Preparation Example 16

An acid pasting treatment was conducted in the same manner as in Preparation example 12 except for using NMP in place of DMF, to thereby obtain 9.3 g of a crystal. An X-ray diffraction spectrum of the obtained crystal was the same as that in FIG. 16.

Preparation Example 17

An acid pasting treatment was conducted in the same manner as in Preparation example 12 except for using DMSO in place of DMF, to thereby obtain 9.5 g of a crystal. An X-ray diffraction spectrum of the obtained crystal was the same as that in FIG. 16.

Preparation Example 18

Figure 19:
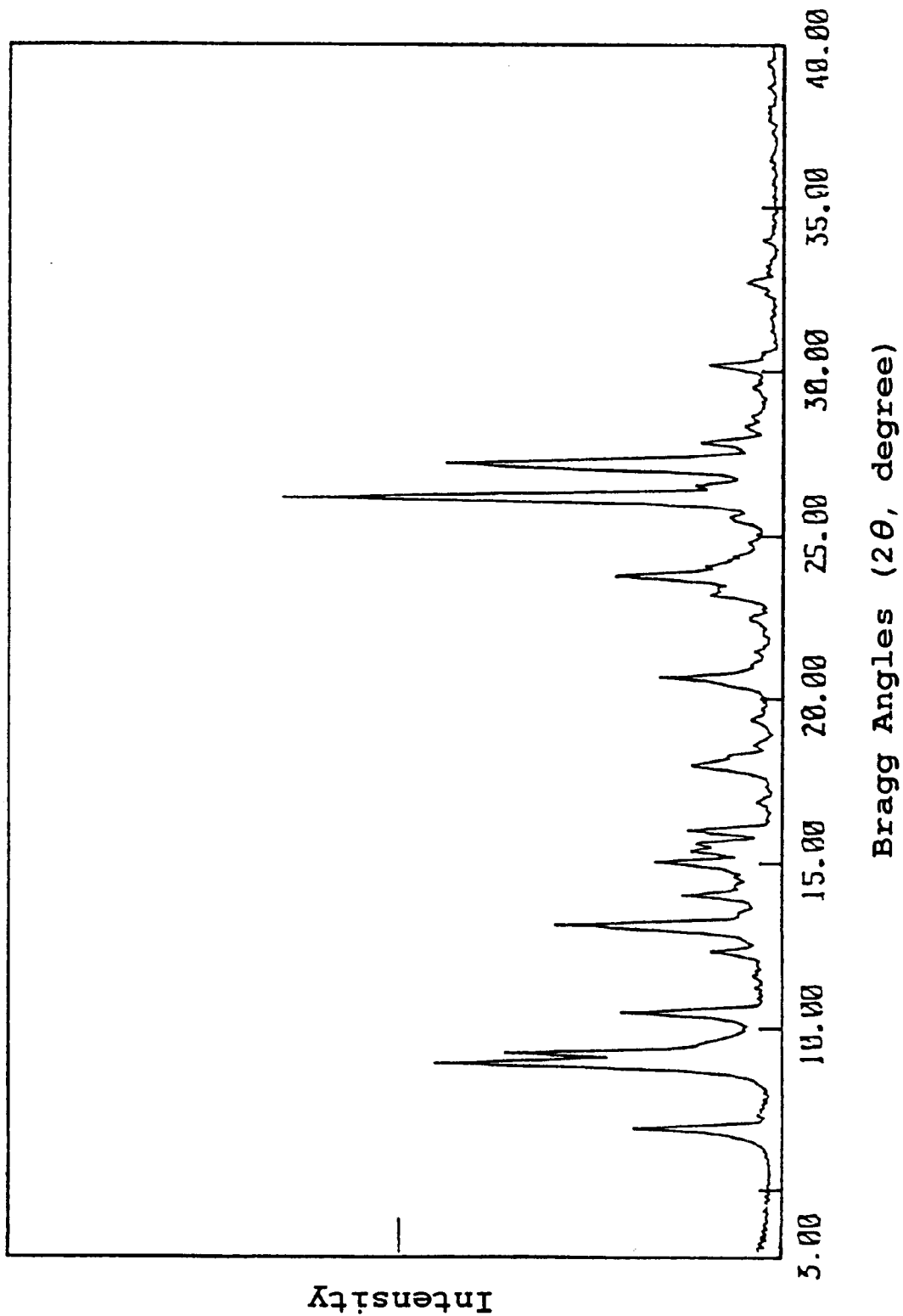
FIGS. 19 and 20 are an X-ray diffraction spectrum and an infrared absorption spectrum, respectively, of a crystal obtained in Preparation example 18.
Figure 20:
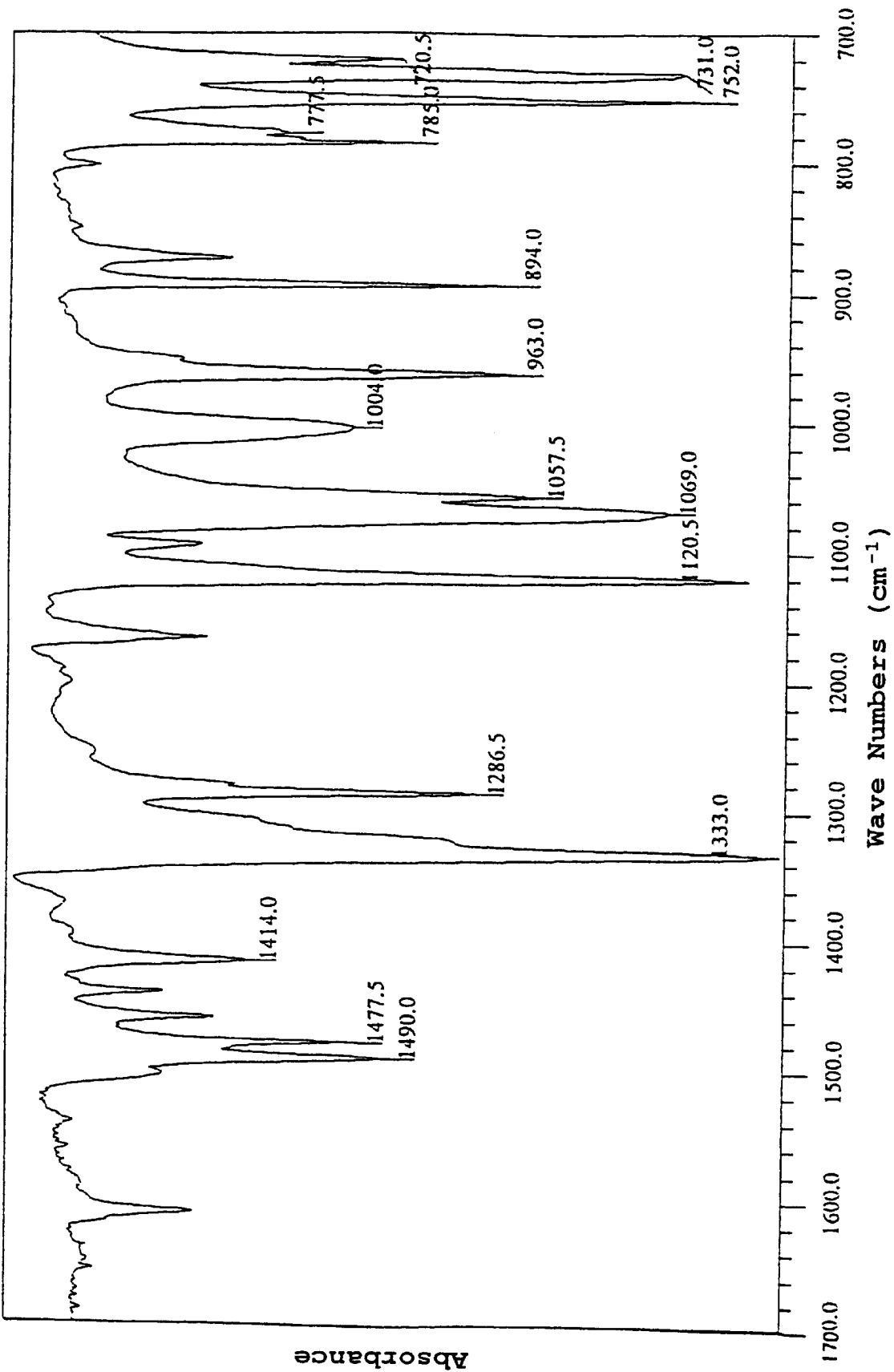

0.7 g of the amorphous TiOPc obtained in Preparation example 12, 0.3 g of the amorphous H$_2$Pc obtained in Preparation example 4 and 28.0 g of water were charged in a 100 ml flask and heated at 90° C. while stirring. After 10 minutes, 2.0 g of naphthalene was added to the resultant mixture, which was subsequently heated at the same temperature for 1 hour while stirring, and then, the reaction was terminated. The mixture was subsequently cooled down to room temperature and the resultant precipitated crystal was collected by filtration and washed with methanol. As a result, 0.9 g of a crystal was obtained. An X-ray diffraction spectrum and an infrared absorption spectrum of the obtained crystal are shown in FIGS. 19 and 20, respectively. It is found from FIG. 19 that the crystal has diffraction peaks at 7.0°, 9.3°, 10.5°, 13.1°, 20.7°, 23.8°, 26.2° and 27.2° of Bragg angles (2θ±0.2°). It is also found from FIG. 20 that the crystal has strong absorption peaks at 1333.0 cm$^{-1}$, 1120.5 cm$^{-1}$, 1069.0 cm$^{-1}$, 963.0 cm$^{-1}$, 894.0 cm$^{-1}$, 785.0 cm$^{-1}$, 752.0 cm$^{-1}$ and 731.0 cm$^{-1}$ of wave numbers (±2 cm$^{-1}$).

Preparation Example 19

A crystal transformation was conducted in the same manner as in Preparation example 18 except for using 1.0 g of the amorphous phthalocyanine composition obtained in Preparation example 14 in place of 0.7 g of the amorphous TiOPc obtained in Preparation example 12 and 0.3 g of the amorphous H$_2$Pc obtained in Preparation example 4. As a result, 0.9 g of a crystal was obtained. An X-ray diffraction spectrum of the obtained crystal was the same as that in FIG. 19.

Preparation Example 20

Figure 21:
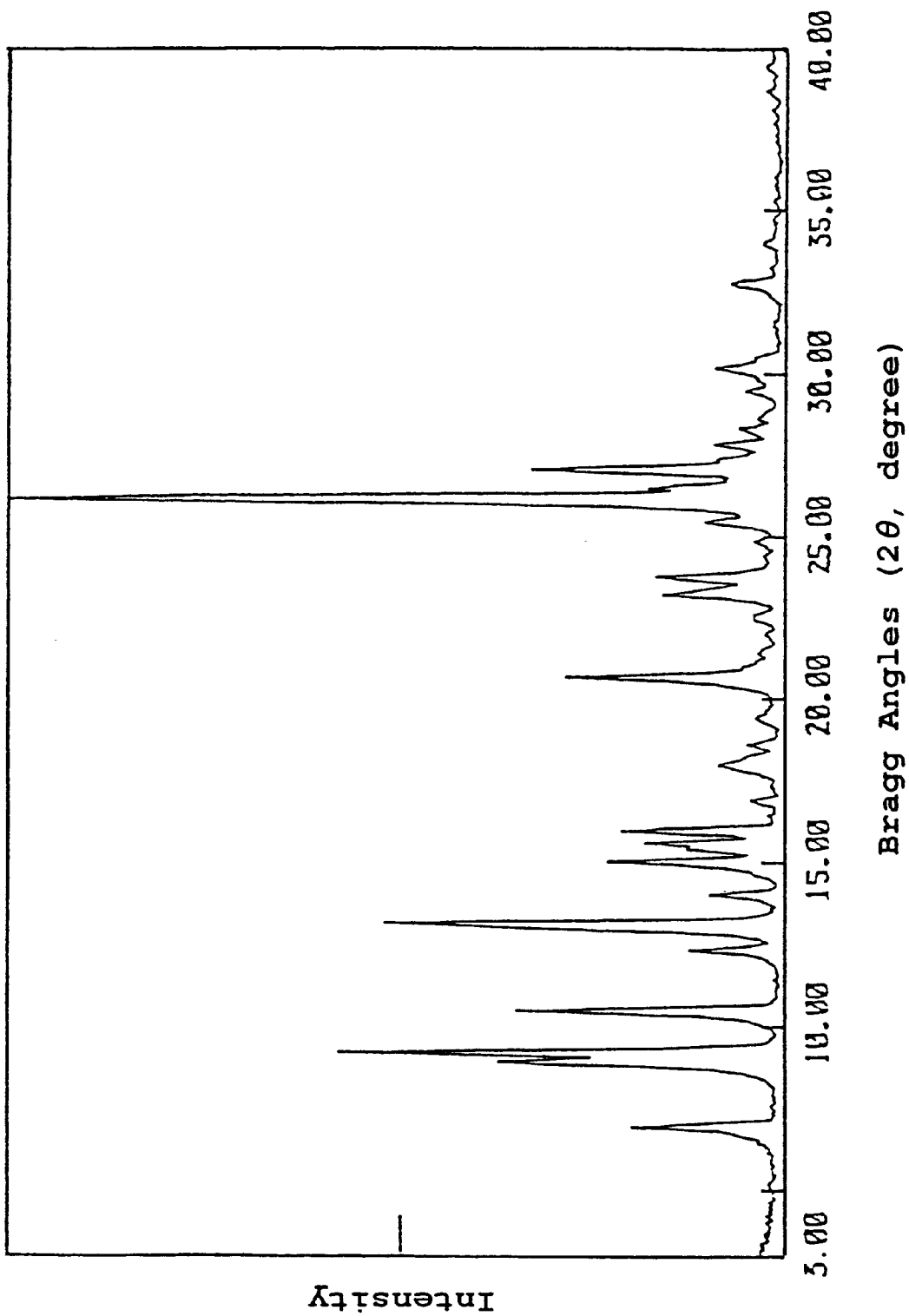
FIGS. 21 and 22 are an X-ray diffraction spectrum and an infrared absorption spectrum, respectively, of a crystal obtained in Preparation example 20.
Figure 22:
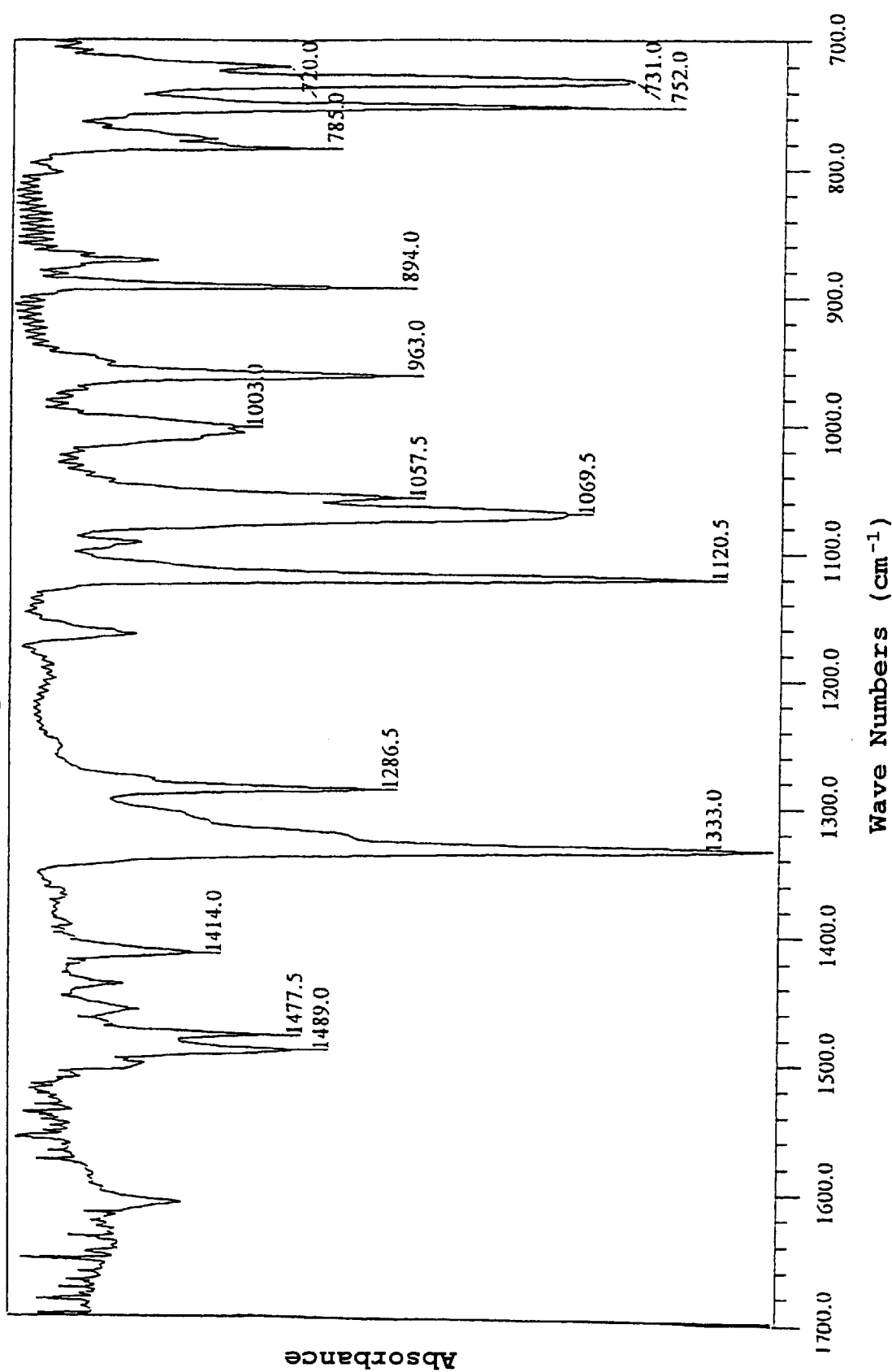

A crystal transformation was conducted in the same manner as in Preparation example 18 except for using 0.7 g of the amorphous TiOPc obtained in Preparation example 15 in place of 0.7 g of the amorphous TiOPc obtained in Preparation example 12. As a result, 0.9 g of a crystal was obtained. An X-ray diffraction spectrum and an infrared absorption spectrum of the obtained crystal are shown in FIGS. 21 and 22, respectively. It is found from FIG. 21 that the crystal has diffraction peaks at 7.0°, 9.3°, 10.5°, 13.2°, 20.7°, 23.8°, 26.2° and 27.1° of Bragg angles (2θ±0.2°).

It is also found from FIG. 22 that the crystal has strong absorption peaks at 1333.0 cm$^{-1}$, 1120.5 cm$^{-1}$, 1069.5 cm$^{-1}$, 963.0 cm$^{-1}$, 894.0 cm$^{-1}$, 785.0 cm$^{-1}$, 752.0 cm$^{-1}$ and 731.0 cm$^{-1}$ of wave numbers (±2 cm$^{-1}$).

Preparation Example 21

A crystal transformation was conducted in the same manner as in Preparation example 18 except for using 0.7 g of the amorphous TiOPc obtained in Preparation example 16 in place of 0.7 g of the amorphous TiOPc obtained in Preparation example 12. As a result, 0.9 g of a crystal was obtained. An X-ray diffraction spectrum and an infrared absorption spectrum of the obtained crystal were the same as those in FIGS. 21 and 22, respectively.

Preparation Example 22

A crystal transformation was conducted in the same manner as in Preparation example 18 except for using 0.7 g of the amorphous TiOPc obtained in Preparation example 17 in place of 0.7 g of the amorphous TiOPc obtained in Preparation example 12. As a result, 0.9 g of a crystal was obtained. An X-ray diffraction spectrum and an infrared absorption spectrum of the obtained crystal were the same as those in FIGS. 21 and 22, respectively.

Preparation Example 23

A crystal transformation was conducted in the same manner as in Preparation example 18 except for using 2.0 g of o-dichlorobenzene in place of 2.0 g of naphthalene. As a result, 0.9 g of a crystal was obtained. An X-ray diffraction spectrum and an infrared absorption spectrum of the obtained crystal were the same as those in FIGS. 19 and 20, respectively.

Preparation Example 24

A crystal transformation was conducted in the same manner as in Preparation example 18 except for using 1.0 g of naphthalene and 1.0 g of ethylcyclohexane in place of 2.0 g of naphthalene. As a result, 0.9 g of a crystal was obtained. An X-ray diffraction spectrum and an infrared absorption spectrum of the obtained crystal were the same as those in FIGS. 19 and 20, respectively.

Preparation Example 25

A crystal transformation was conducted in the same manner as in Preparation example 18 except for using 1.0 g of naphthalene and 1.0 g of cyclohexanone in place of 2.0 g of naphthalene. As a result, 0.9 g of a crystal was obtained. An X-ray diffraction spectrum and an infrared absorption spectrum of the obtained crystal were the same as those in FIGS. 19 and 20, respectively.

Preparation Example 26

A crystal transformation was conducted in the same manner as in Preparation example 18 except for using 1.0 g of naphthalene and 1.0 g of toluene in place of 2.0 g of naphthalene. As a result, 0.9 g of a crystal was obtained. An X-ray diffraction spectrum and an infrared absorption spectrum of the crystal obtained were the same as those in FIGS. 19 and 20, respectively.

Preparation Example 27

A crystal transformation was conducted in the same manner as in Preparation example 18 except for using 1.0 g of naphthalene and 1.0 g of n-octane in place of 2.0 g of naphthalene. As a result, 0.9 g of a crystal was obtained. An X-ray diffraction spectrum and an infrared absorption spectrum of the obtained crystal were the same as those in FIGS. 19 and 20, respectively.

Preparation Example 28

Figure 23:
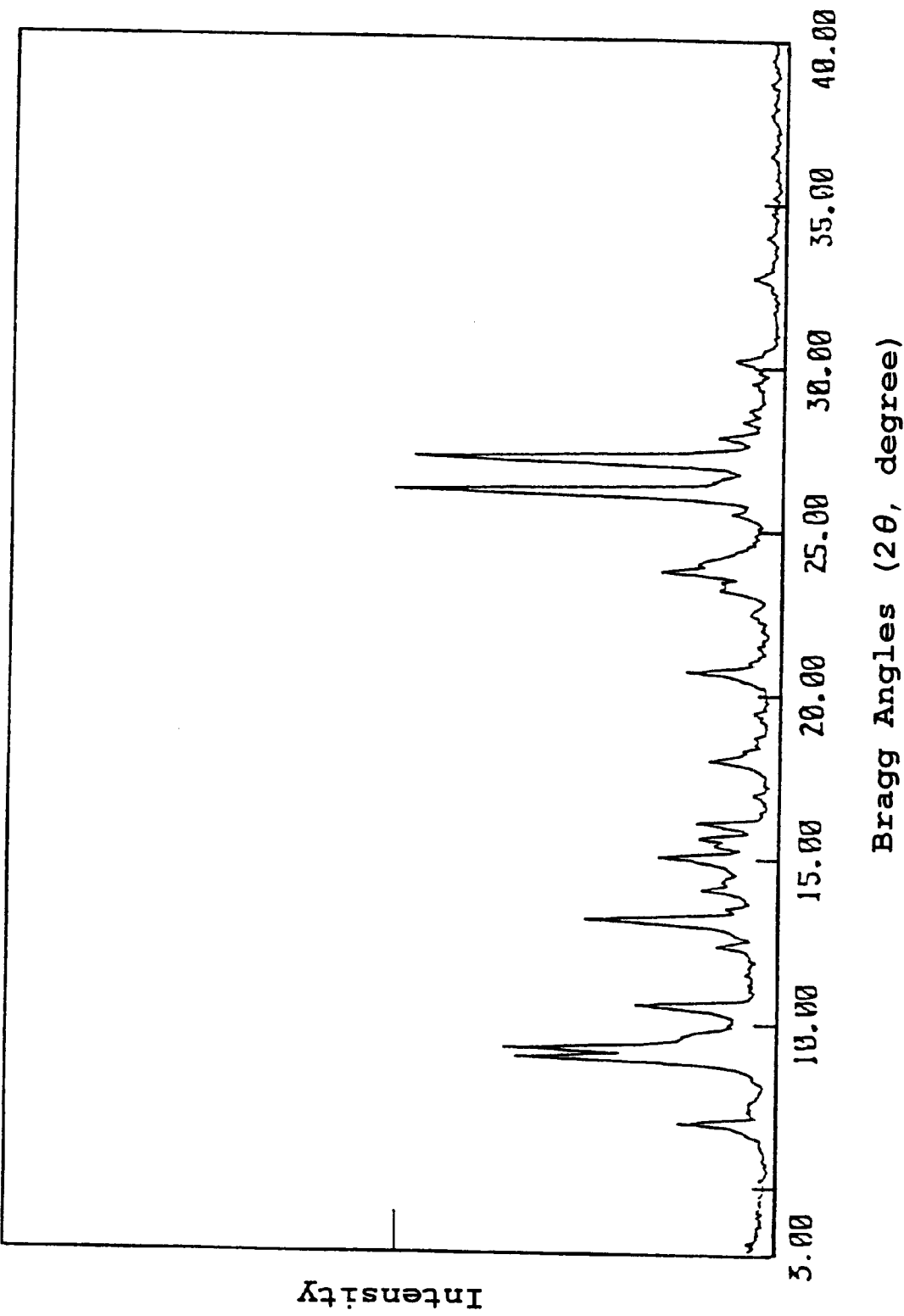
FIGS. 23 and 24 are an X-ray diffraction spectrum and an infrared absorption spectrum, respectively, of a crystal obtained in Preparation example 28.
Figure 24:
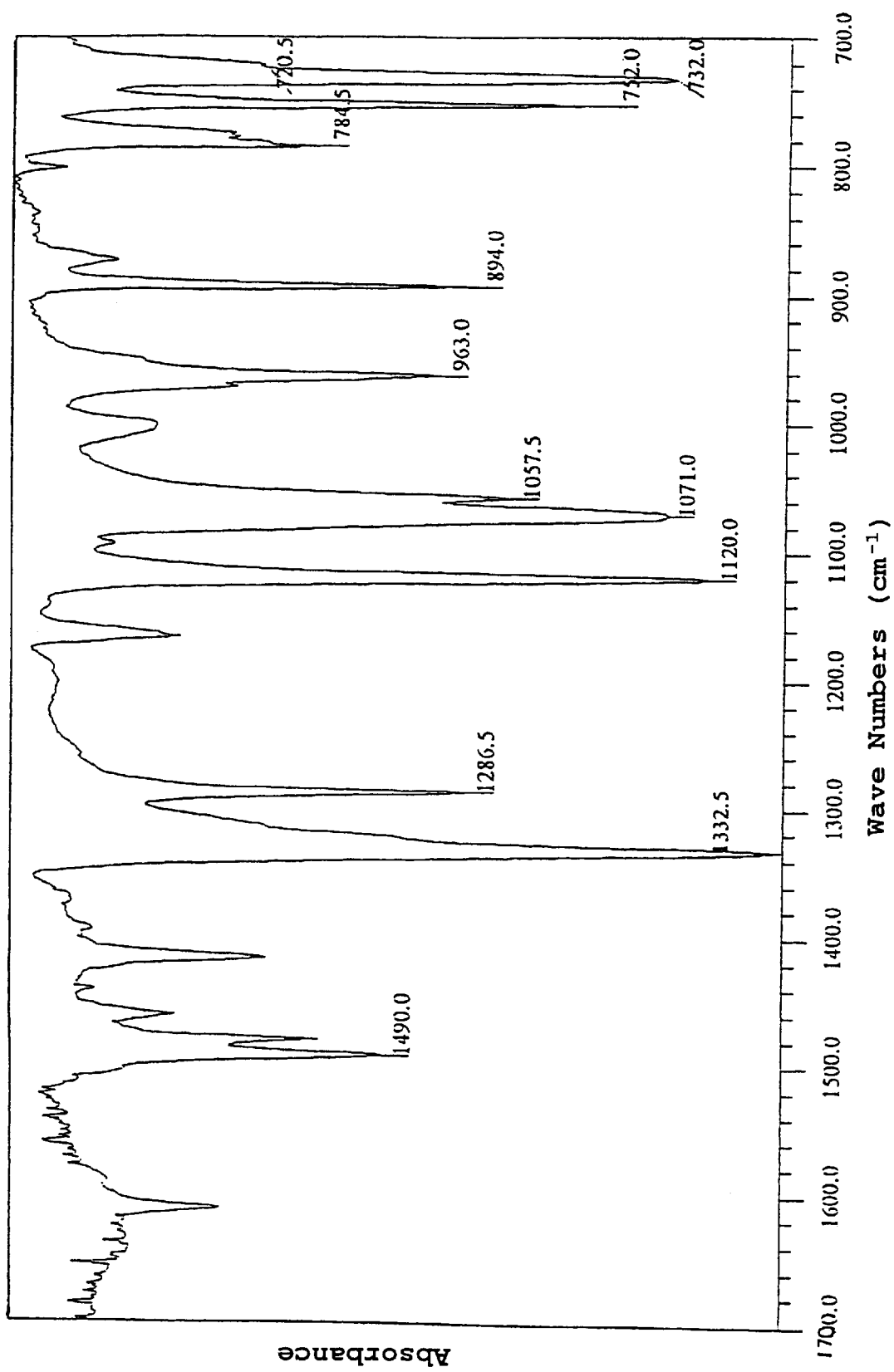

A crystal transformation was conducted in the same manner as in Preparation example 18 except for using 0.9 g of the amorphous TiOPc obtained in Preparation example 12 and 0.1 g of the amorphous H$_2$Pc obtained in Preparation example 4 in place of 0.7 g and 0.3 g of each. As a result, 0.9 g of a crystal was obtained. An X-ray diffraction spectrum and an infrared absorption spectrum of the obtained crystal are shown in FIGS. 23 and 24, respectively. It is found from FIG. 23 that the crystal has diffraction peaks at 7.0°, 9.3°, 10.5°, 13.2°, 20.7°, 23.8°, 26.2° and 27.2° of Bragg angles (2θ±0.2°). It is also found from FIG. 24 that the crystal has strong absorption peaks at 1332.5 cm$^{-1}$, 1120.0 cm$^{-1}$, 1071.0 cm$^{-1}$, 963.0 cm$^{-1}$, 894.0 cm$^{-1}$, 784.5 cm$^{-1}$, 752.0 cm$^{-1}$ and 732.0 cm$^{-1}$ of wave numbers (±2 cm$^{-1}$).

Preparation Example 29

Figure 25:
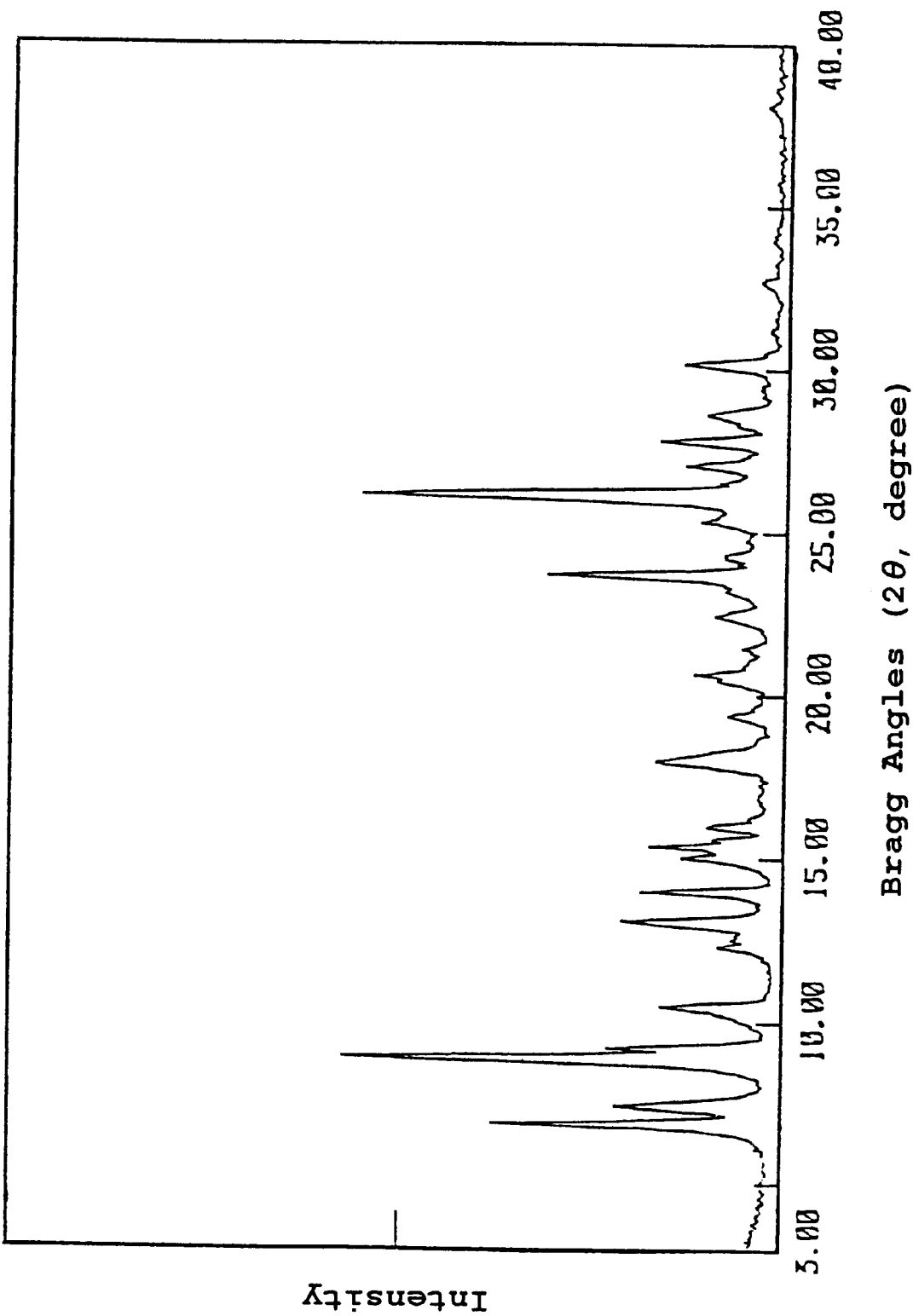
FIGS. 25 and 26 are an X-ray diffraction spectrum and an infrared absorption spectrum, respectively, of a crystal obtained in Preparation example 29.
Figure 26:
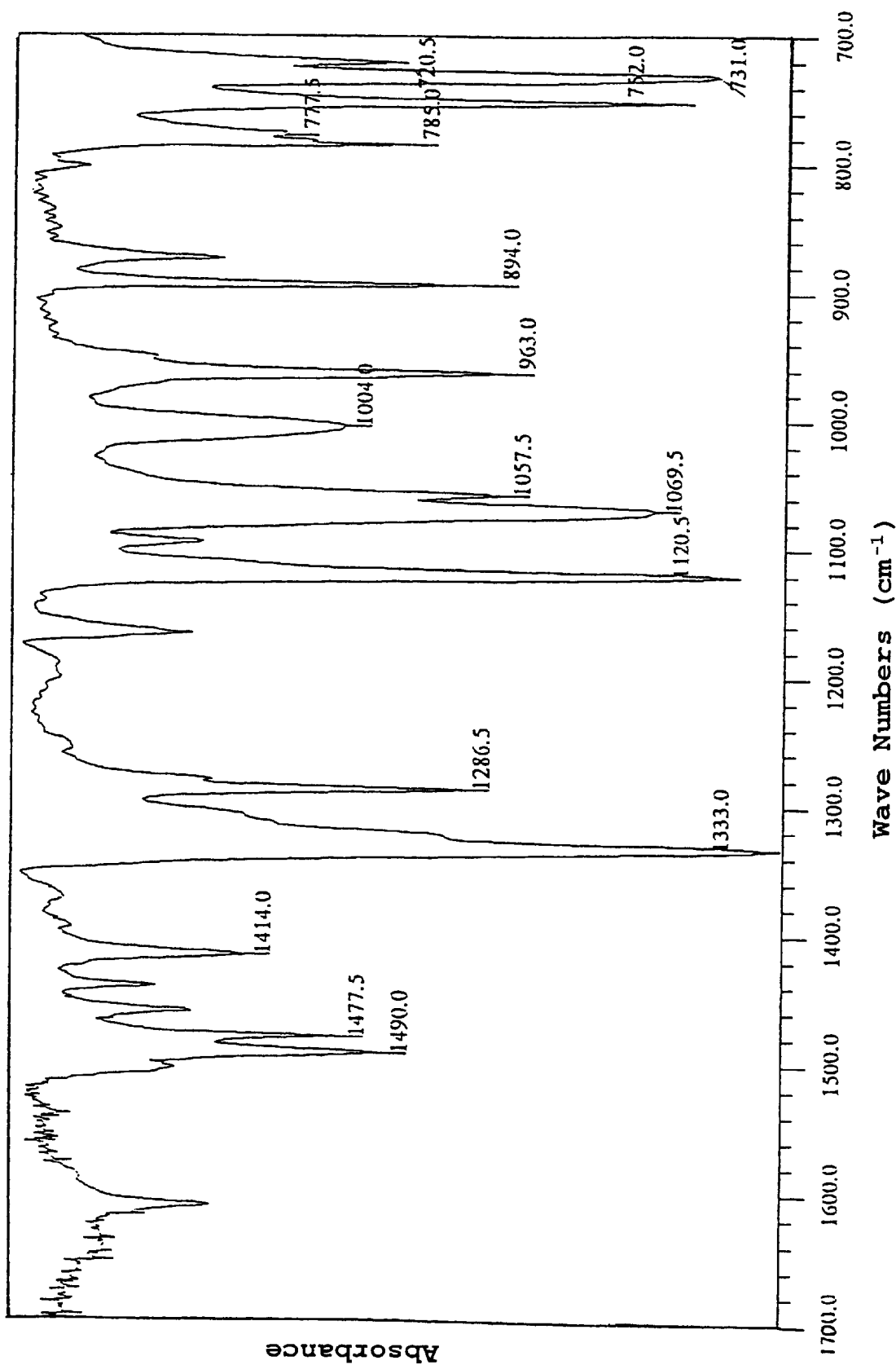

A crystal transformation was conducted in the same manner as in Preparation example 18 except for using 0.5 g of the amorphous TiOPc obtained in Preparation example 12 and 0.5 g of the amorphous H$_2$Pc obtained in Preparation example 4 in place of 0.7 g and 0.3 g of each. As a result, 0.9 g of a crystal was obtained. An X-ray diffraction spectrum and an infrared absorption spectrum of the obtained crystal are shown in FIGS. 25 and 26, respectively. It is found from FIG. 25 that the crystal has diffraction peaks at 7.0°, 9.3°, 10.5°, 13.2°, 20.7°, 23.8°, 26.2° and 27.1° of Bragg angles (2θ±0.2°). It is also found from FIG. 26 that the crystal has strong absorption peaks at 1333.0 cm$^{-1}$, 1120.5 cm$^{-1}$, 1069.5 cm$^{-1}$, 963.0 cm$^{-1}$, 894.0 cm$^{-1}$, 785.0 cm$^{-1}$, 752.0 cm$^{-1}$ and 731.0 cm$^{-1}$ of wave numbers (±2 cm$^{-1}$).

Preparation Example 30

Figure 27:
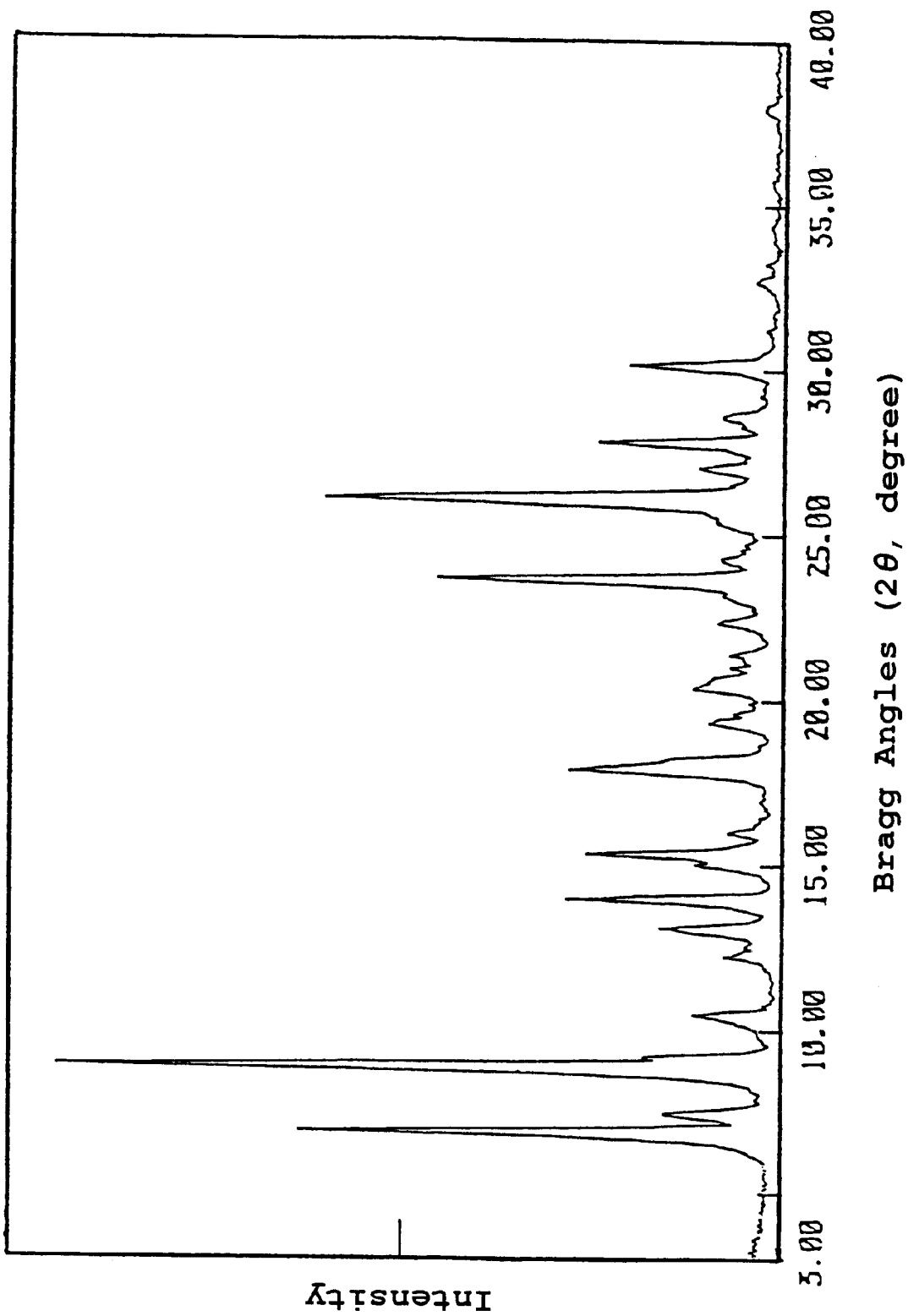
FIGS. 27 and 28 are an X-ray diffraction spectrum and an infrared absorption spectrum, respectively, of a crystal obtained in Preparation example 30.
Figure 28:
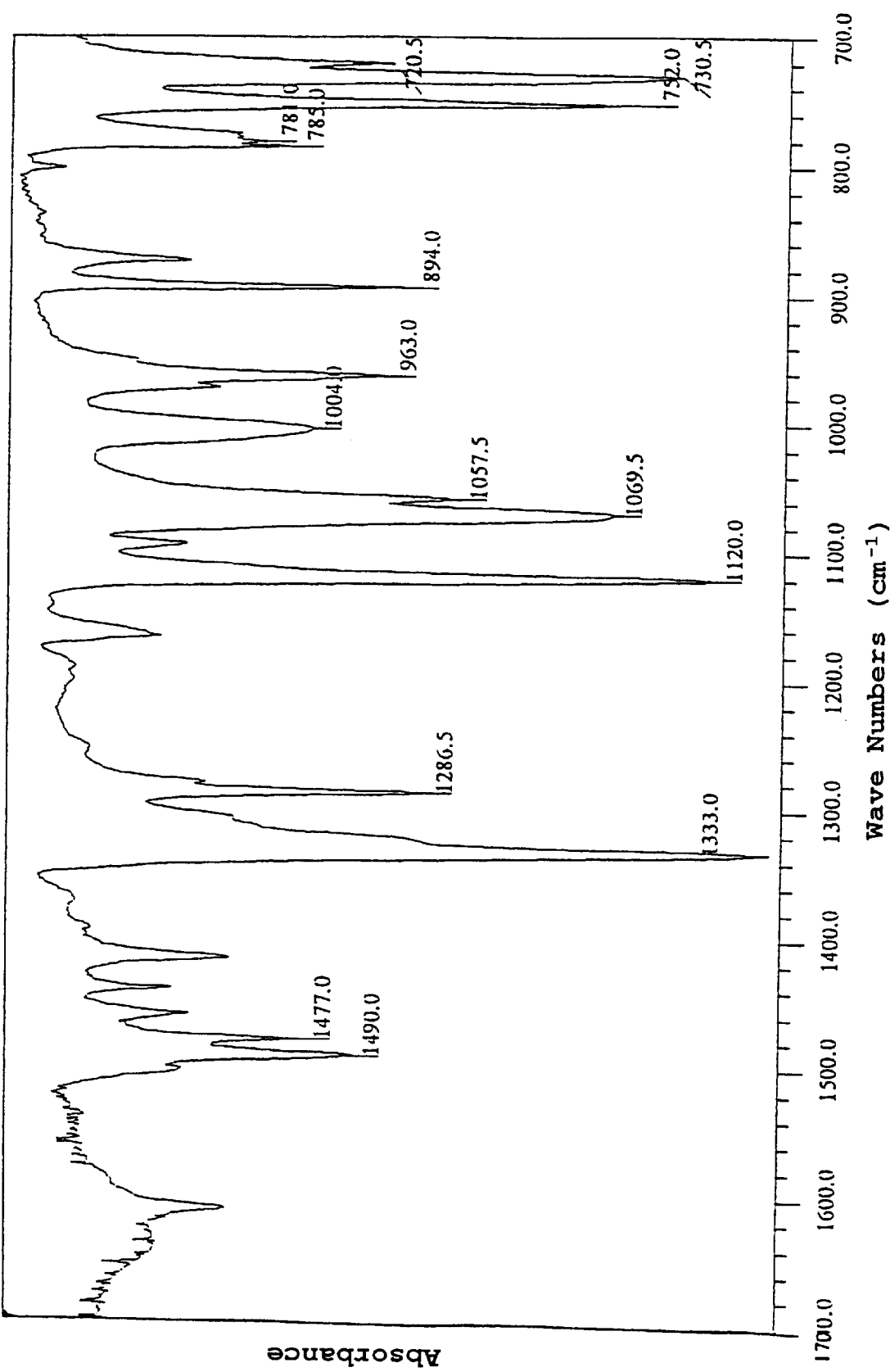

A crystal transformation was conducted in the same manner as in Preparation example 18 except for using 0.3 g of the amorphous TiOPc obtained in Preparation example 12 and 0.7 g of the amorphous H$_2$Pc obtained in Preparation example 4 in place of 0.7 g and 0.3 g of each. As a result, 0.9 g of a crystal was obtained. An X-ray diffraction spectrum and an infrared absorption spectrum of the obtained crystal are shown in FIGS. 27 and 28, respectively. It is found from FIG. 27 that the crystal has diffraction peaks at 7.0°, 9.3°, 10.5°, 13.2°, 20.5°, 23.7°, 26.1° and 27.1° of Bragg angles (2θ±0.2°). It is also found from FIG. 28 that the crystal has strong absorption peaks at 1333.0 cm$^{-1}$, 1120.0 cm$^{-1}$, 1069.5 cm$^{-1}$, 963.0 cm$^{-1}$, 894.0 cm$^{-1}$, 785.0 cm$^{-1}$, 752.0 cm$^{-1}$ and 730.5 cm$^{-1}$ of wave numbers (±2 cm$^{-1}$).

Preparation Example 31

Figure 29:
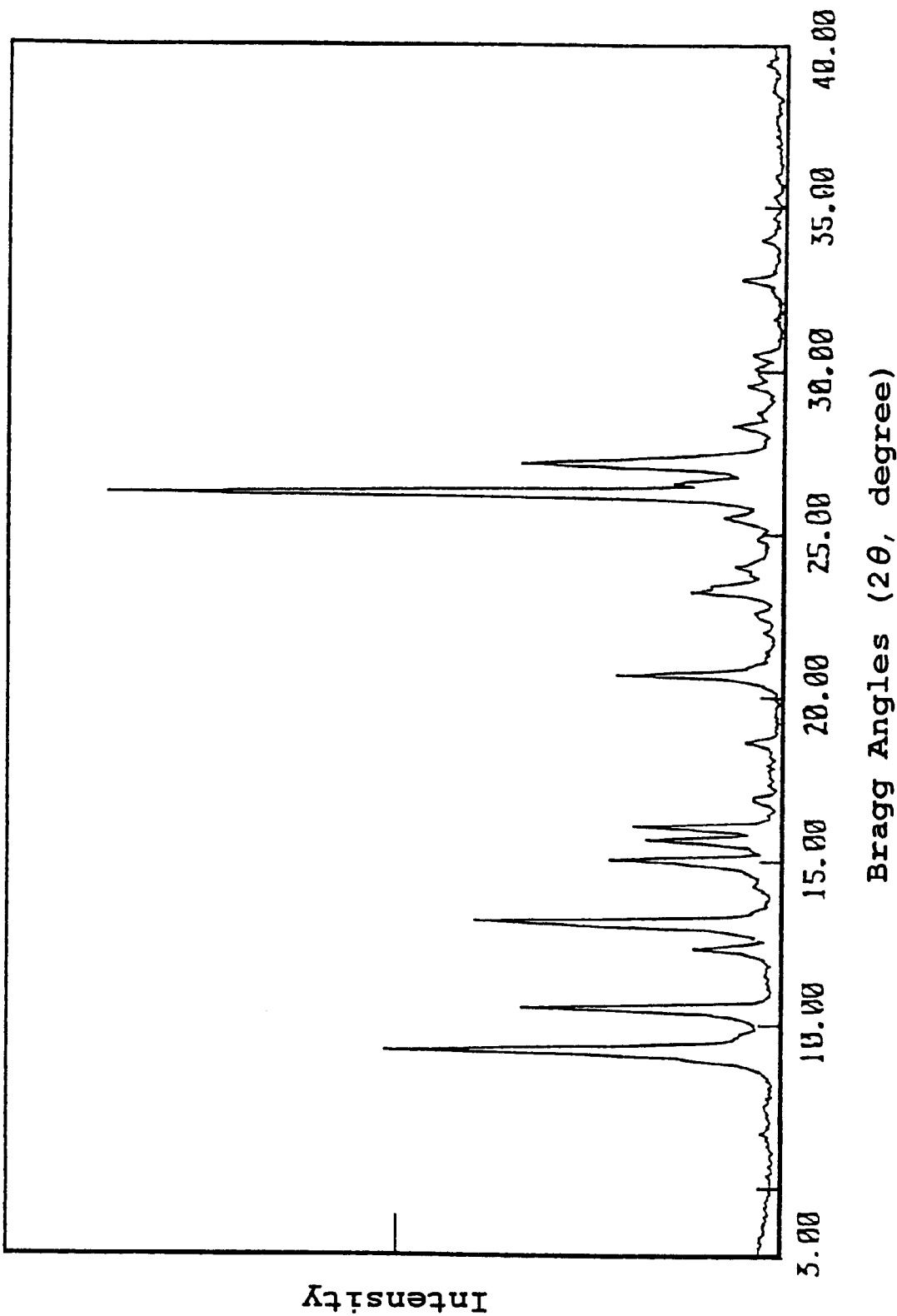
FIGS. 29 and 30 are an X-ray diffraction spectrum and an infrared absorption spectrum, respectively, of a crystal obtained in Preparation example 31.
Figure 30:
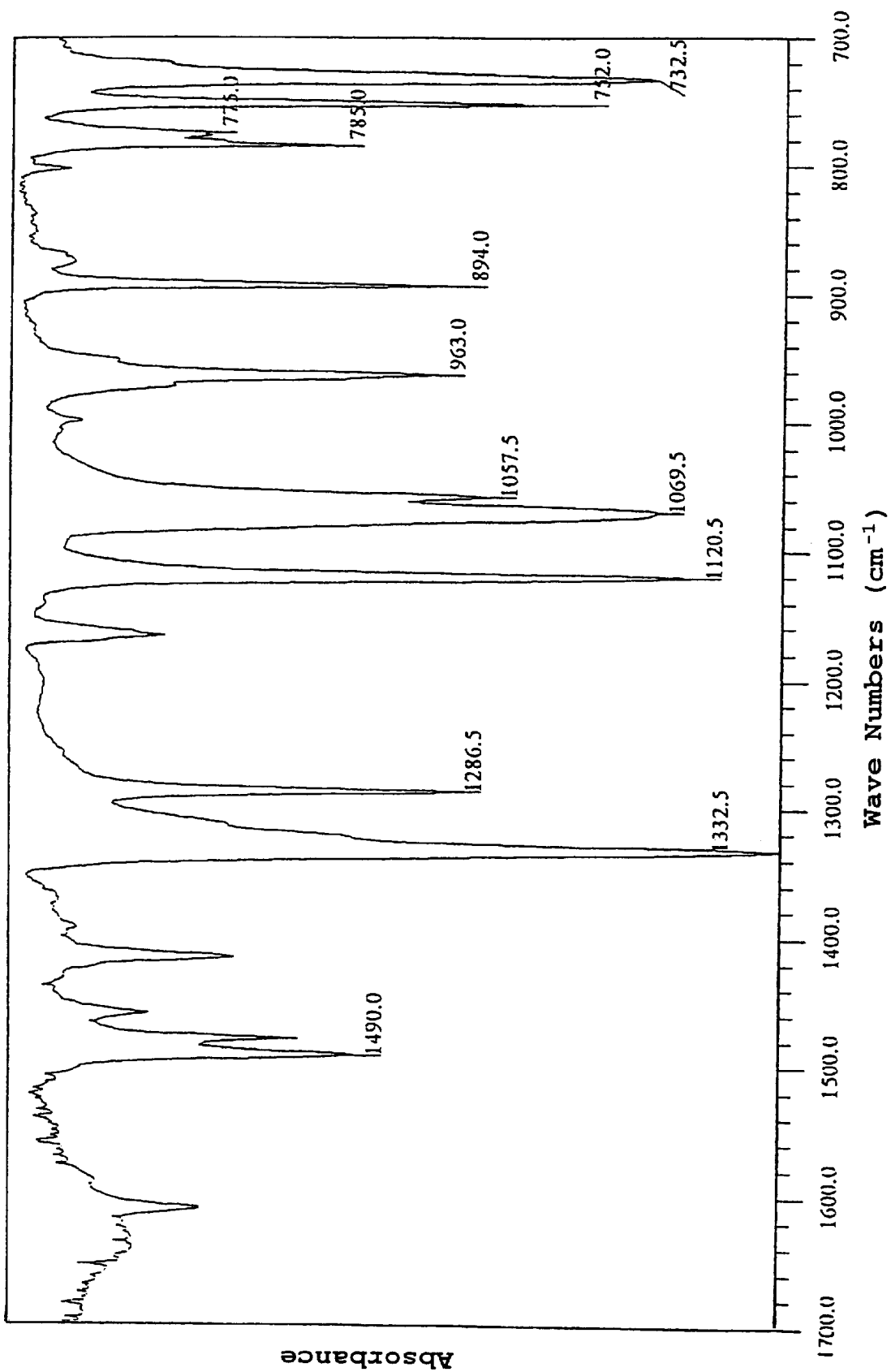

A crystal transformation was conducted in the same manner as in Preparation example 18 except for using 1.0 g of the amorphous TiOPc obtained in Preparation example 12 only in place of 0.7 g of the amorphous TiOPc obtained in Preparation example 12 and 0.3 g of the amorphous H$_2$Pc obtained in Preparation example 4. As a result, 0.9 g of a crystal was obtained. An X-ray diffraction spectrum and an infrared absorption spectrum of the obtained crystal are shown in FIGS. 29 and 30, respectively. It is found from FIG. 29 that the crystal has no diffraction peaks at 7.0° of Bragg angles.

Comparative Preparation Example 6

Figure 31:
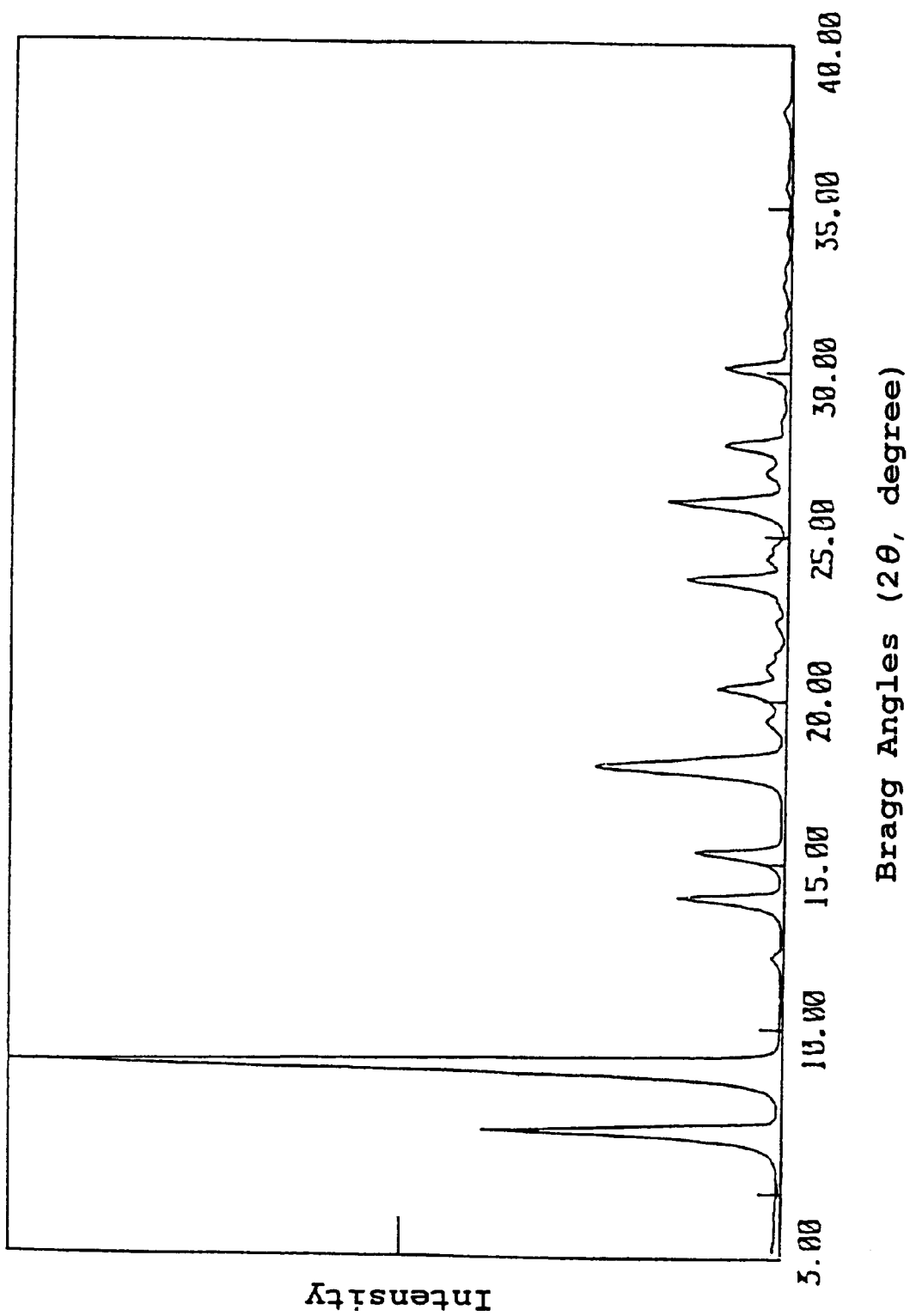
FIGS. 31 and 32 are an X-ray diffraction spectrum and an infrared absorption spectrum, respectively, of a crystal obtained in Comparative preparation example 6.
Figure 32:
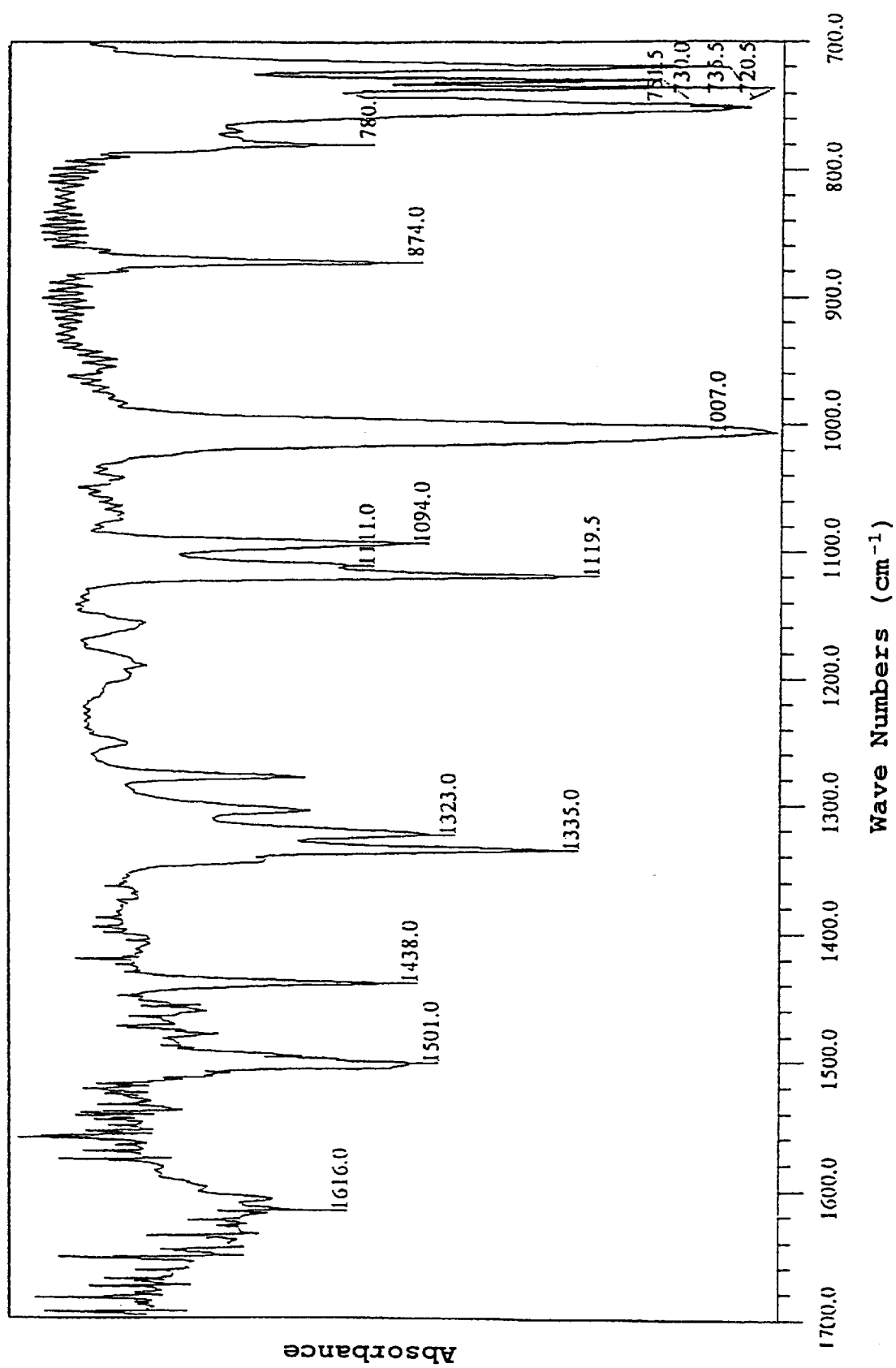

A crystal transformation was conducted in the same manner as in Preparation example 18 except for using 1.0 g of the amorphous H$_2$Pc obtained in Preparation example 4 only in place of 0.7 g of the amorphous TiOPc obtained in Preparation example 12 and 0.3 g of the amorphous H$_2$Pc obtained in Preparation example 4. As a result, 0.9 g of a crystal was obtained. An X-ray diffraction spectrum and an infrared absorption spectrum of the obtained crystal are shown in FIGS. 31 and 32, respectively. It is found from FIG. 31 that the crystal has no diffraction peaks at 9.3°, 10.5°, 13.1° and 27.2° of Bragg angles (2θ±0.2°). It is also found from FIG. 32 that the crystal has no absorption peaks at 1069 cm$^{-1}$, 963 cm$^{-1}$, 894 cm$^{-1}$ and 785 cm$^{-1}$ of wave numbers (±2 cm$^{-1}$).

Comparative Preparation Example 7

Figure 33:
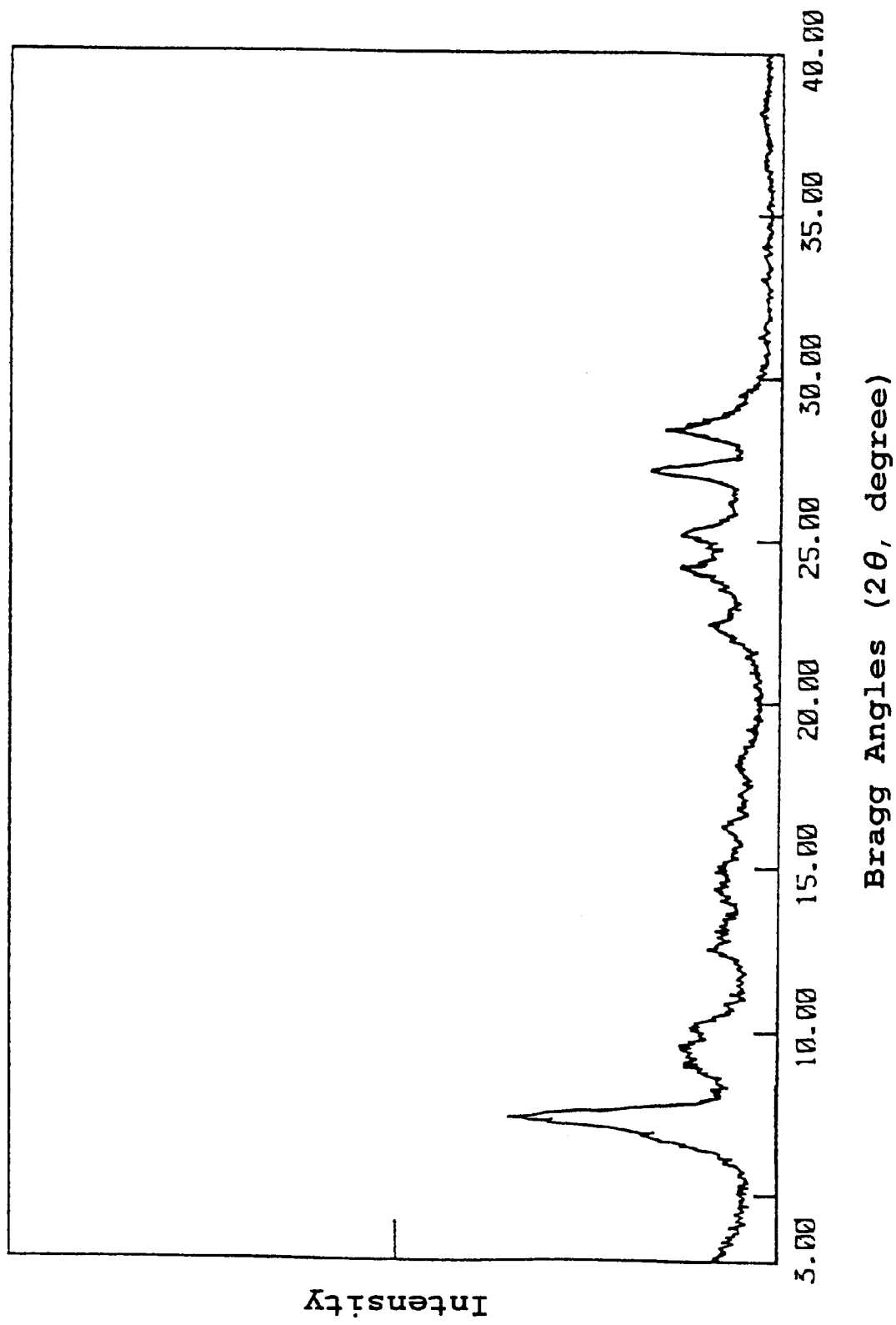
FIGS. 33 and 34 are an X-ray diffraction spectrum and an infrared absorption spectrum, respectively, of a crystal obtained in Comparative preparation example 7.
Figure 34:
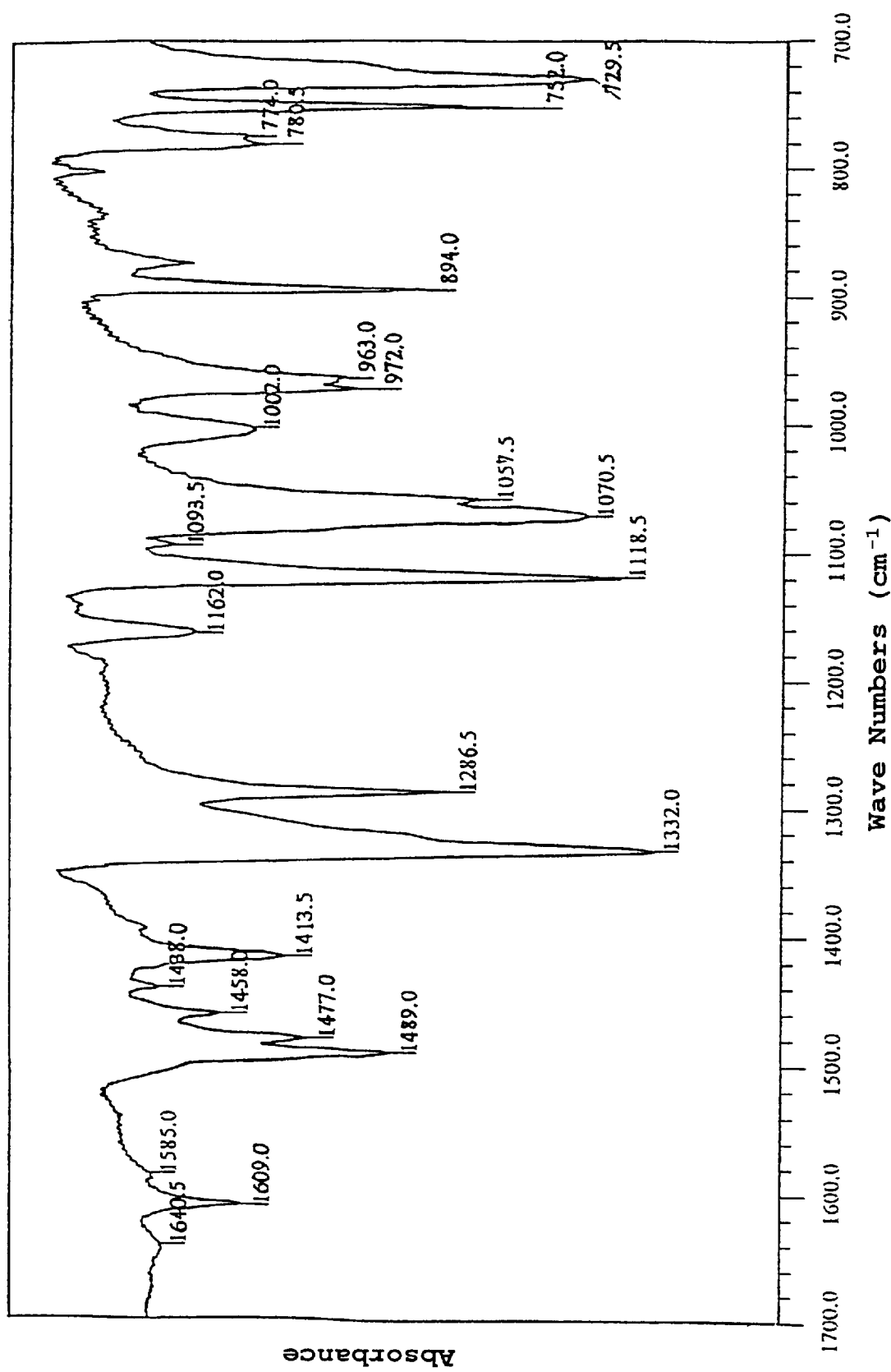

A crystal transformation was conducted in the same manner as in Preparation example 18 except for using 2.0 g of 1,2-dichloroethane in place of 2.0 g of naphthalene. As a result, 0.9 g of a crystal was obtained. An X-ray diffraction spectrum and an infrared absorption spectrum of the obtained crystal are shown in FIGS. 33 and 34, respectively. It is found from FIG. 33 that the crystal has no diffraction peaks at 7.0°, 9.3°, 10.5°, 13.1°, 20.6°, 23.7° and 26.2° of Bragg angles (2θ±0.2°). It is also found from FIG. 34 that the crystal has no absorption peaks at 785 cm$^{-1}$ of wave numbers (±2 cm$^{-1}$).

Comparative Preparation Example 8

Figure 35:
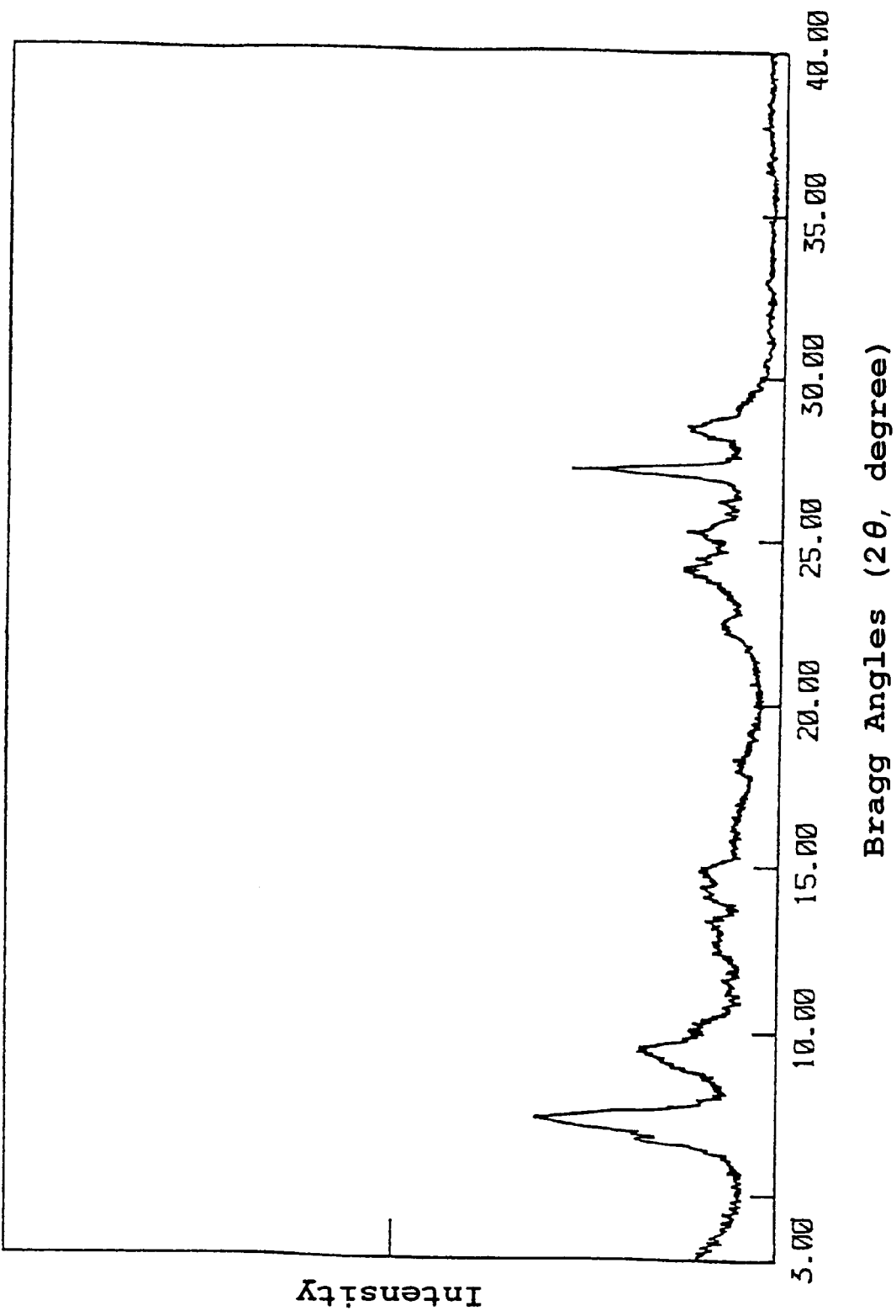
FIGS. 35 and 36 are an X-ray diffraction spectrum and an infrared absorption spectrum, respectively, of a crystal obtained in Comparative preparation example 8.
Figure 36:
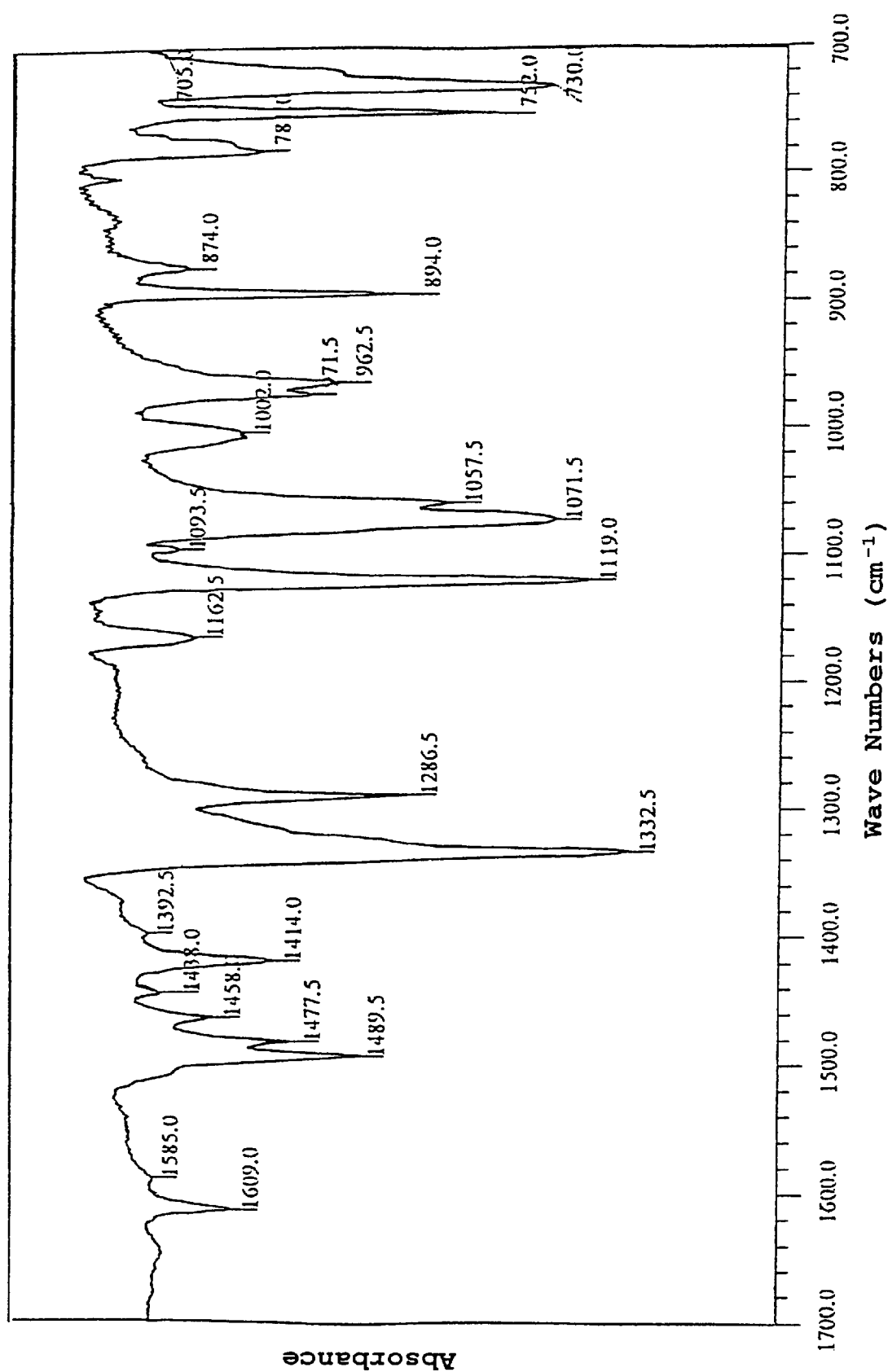

A crystal transformation was conducted in the same manner as in Preparation example 18 except for using 2.0 g of n-octane in place of 2.0 g of naphthalene. As a result, 0.9 g of a crystal was obtained. An X-ray diffraction spectrum and an infrared absorption spectrum of the obtained crystal are shown in FIGS. 35 and 36, respectively. It is found from FIG. 35 that the crystal has no diffraction peaks at 10.5°, 13.1°, 20.6°, 23.7° and 26.2° of Bragg angles (2θ±0.2°) and the intensities of peaks are low all over the spectrum. It is also found from FIG. 36 that the crystal has no absorption peaks at 785 cm$^{-1}$ of wave numbers (±2 cm$^{-1}$).

Preparation Example 32

Figure 37:
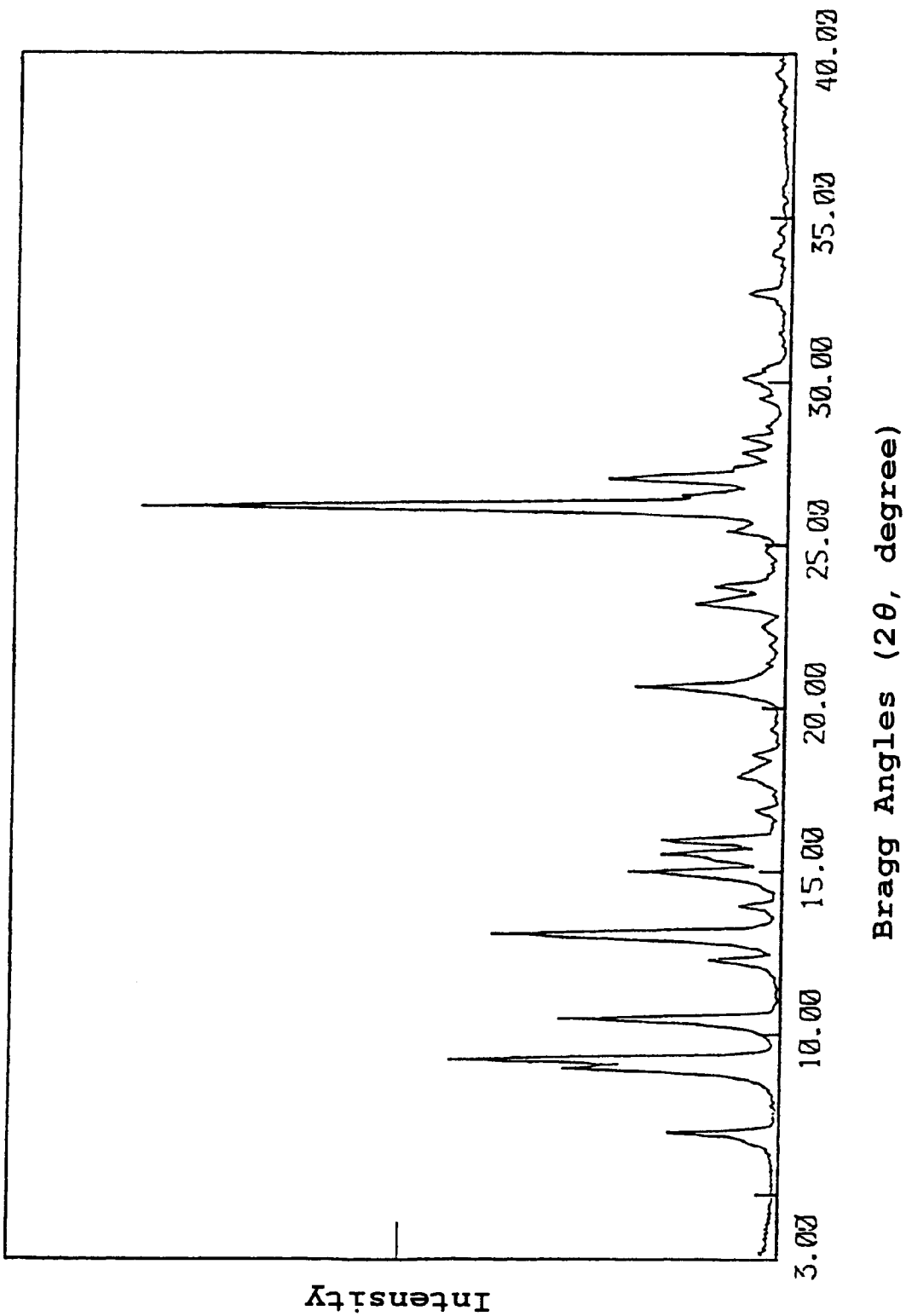
FIGS. 37 and 38 are an X-ray diffraction spectrum and an infrared absorption spectrum, respectively, of a crystal obtained in Preparation example 32.
Figure 38:
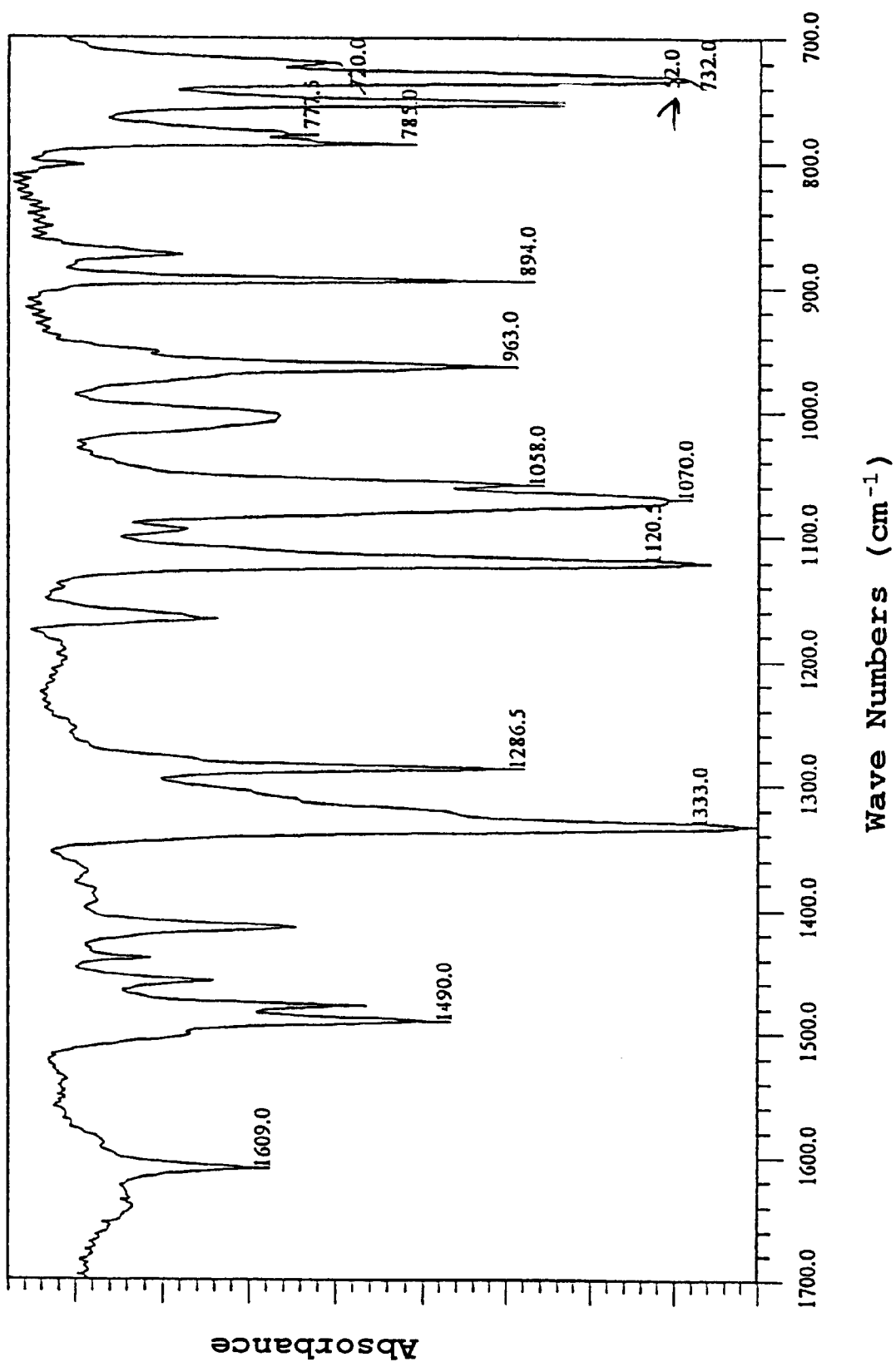

0.2 g of the amorphous H$_2$Pc obtained in Preparation example 4, 0.8 g of the β-TiOPc obtained in Preparation example 31 and 28.0 g of DMF were charged in a 100 ml flask and heated at 100° C. while stirring. After 2 hours, the stirring was stopped, followed by cooling to room temperature. The resultant crystal was collected by filtration and washed with methanol. As a result, 0.9 g of a crystal was obtained. An X-ray diffraction spectrum and an infrared absorption spectrum of the obtained crystal are shown in FIGS. 37 and 38, respectively. It is found from FIG. 37 that the crystal has diffraction peaks at 7.0°, 9.0°, 9.3°, 10.5°, 13.1°, 20.7°, 26.2° and 27.2° of Bragg angles (2θ±0.2°). It is also found from FIG. 38 that the crystal has absorption peaks at 1333.0 cm$^{-1}$, 1120.5 cm$^{-1}$, 1070.0 cm$^{-1}$, 963.0 cm$^{-1}$, 894.0 cm$^{-1}$, 785.0 cm$^{-1}$, 752.0 cm$^{-1}$ and 732.0 cm$^{-1}$ of wave numbers (±2 cm$^{-1}$).

Preparation Example 33

A crystal transformation was conducted in the same manner as in Preparation example 32 except for using 0.7 g of the amorphous TiOPc obtained in Preparation example 3 and 0.1 g of the β-TiOPc obtained in Preparation example 31 in place of 0.8 g of the β-TiOPc obtained in Preparation example 31. As a result, 0.9 g of a crystal was obtained. An X-ray diffraction spectrum and an infrared absorption spectrum of the obtained crystal were the same as those in FIGS. 37 and 38, respectively.

Preparation Example 34

A crystal transformation was conducted in the same manner as in Preparation example 32 except for using 28.0 g of NMP in place of 28.0 g of DMF. As a result, 0.9 g of a crystal was obtained. An X-ray diffraction spectrum and an infrared absorption spectrum of the obtained crystal were the same as those in FIGS. 37 and 38, respectively.

Preparation Example 35

0.2 g of the amorphous H$_2$Pc obtained in Preparation example 4, 0.7 g of the amorphous TiOPc obtained in Preparation example 3 and 0.1 g of the β-TiOPc obtained in Preparation example 31 were charged in a 100 ml flask together with 28.0 g of water and heated at 100° C. while stirring. After 10 minutes, 2.0 g of naphthalene was added to the resultant mixture, which was subsequently heated at the same temperature while stirring. After 2 hours, the stirring was stopped, followed by cooling to room temperature. The resultant precipitated crystal was collected by filtration and washed with methanol. As a result, 0.9 g of a crystal was obtained. An X-ray diffraction spectrum and an infrared absorption spectrum of the obtained crystal were the same as those in FIGS. 37 and 38, respectively.

Preparation Example 36

Figure 39:
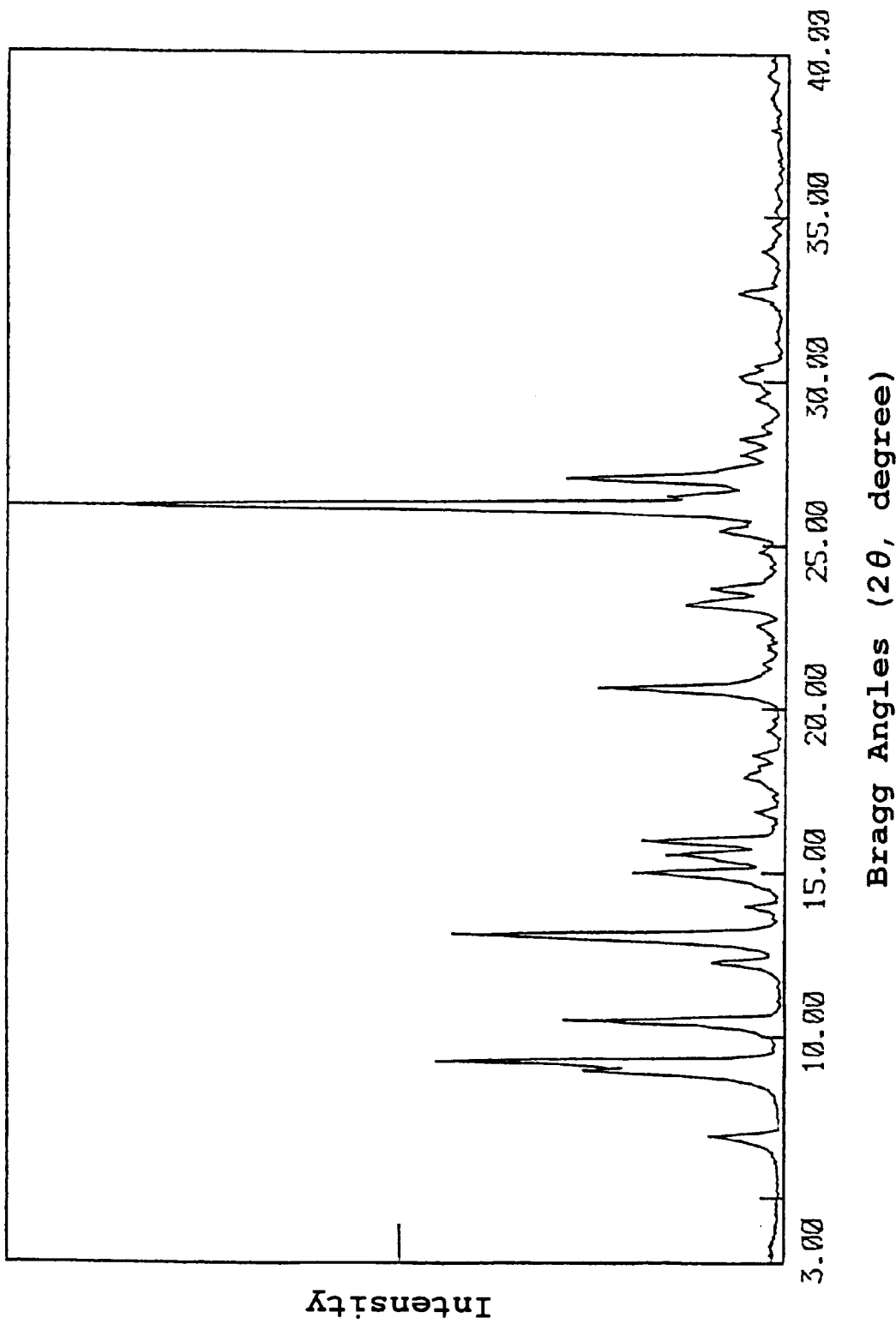
FIGS. 39 and 40 are an X-ray diffraction spectrum and an infrared absorption spectrum, respectively, of a crystal obtained in Preparation example 36.
Figure 40:
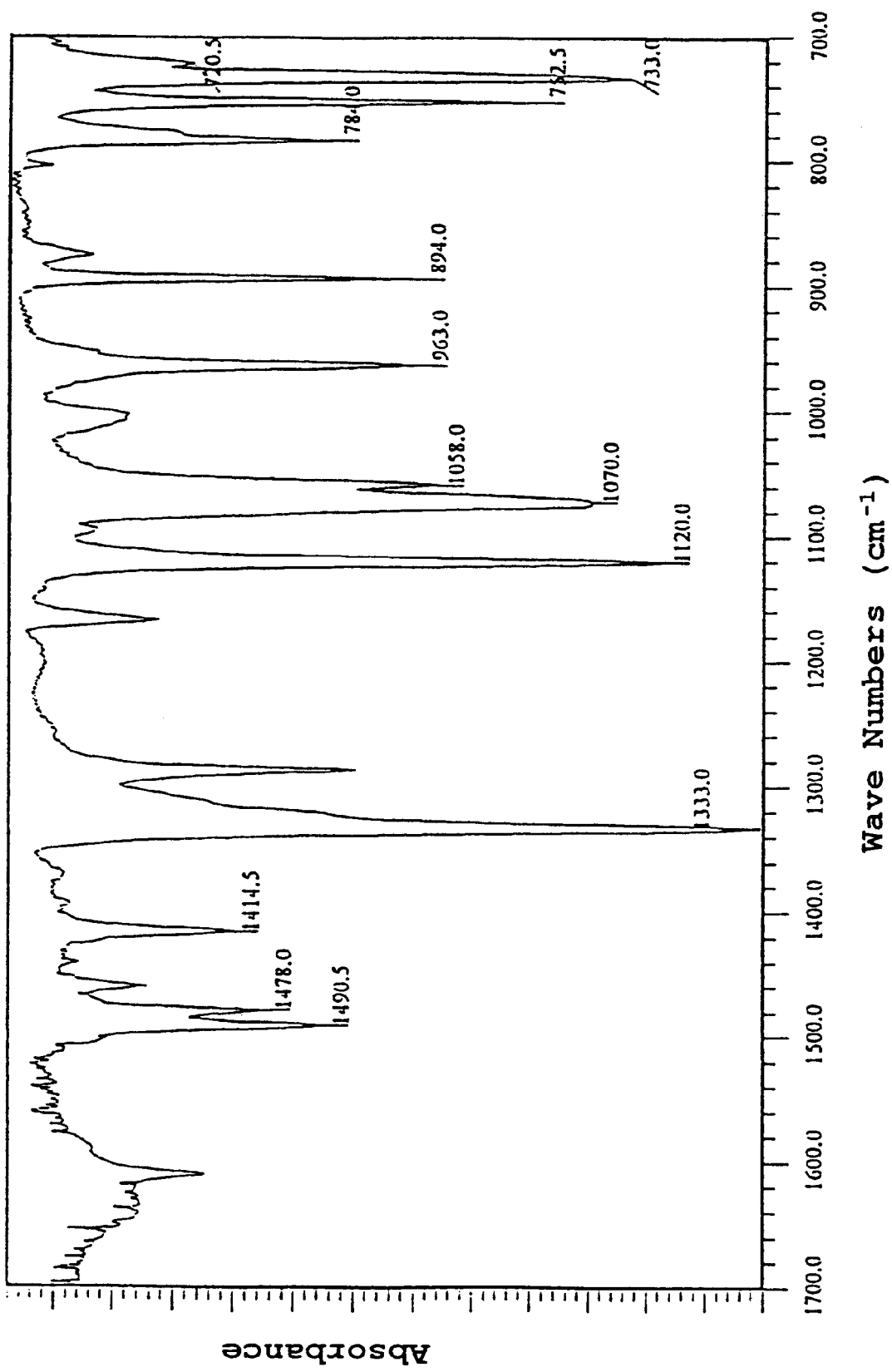

A crystal transformation was conducted in the same manner as in Preparation example 35 except for using 0.1 g of the amorphous H$_2$Pc obtained in Preparation example 4 and 0.8 g of the amorphous TiOPc obtained in Preparation example 3 in place of 0.2 g and 0.7 g of each. As a result, 0.9 g of a crystal was obtained. An X-ray diffraction spectrum and an infrared absorption spectrum of the obtained crystal are shown in FIGS. 39 and 40, respectively. It is found from FIG. 39 that the crystal has diffraction peaks at 7.0°, 9.0°, 9.3°, 10.5°, 13.1°, 20.7°, 26.2° and 27.2° of Bragg angles (2θ±0.2°). It is also found from FIG. 40 that the crystal has absorption peaks at 1333.0 cm$^{-1}$, 1120.0 cm$^{-1}$, 1070.0 cm$^{-1}$, 963.0 cm$^{-1}$, 894.0 cm$^{-1}$, 784.0 cm$^{-1}$, 752.5 cm$^{-1}$ and 733.0 cm$^{-1}$ of wave numbers (±2 cm$^{-1}$).

Preparation Example 37

Figure 41:
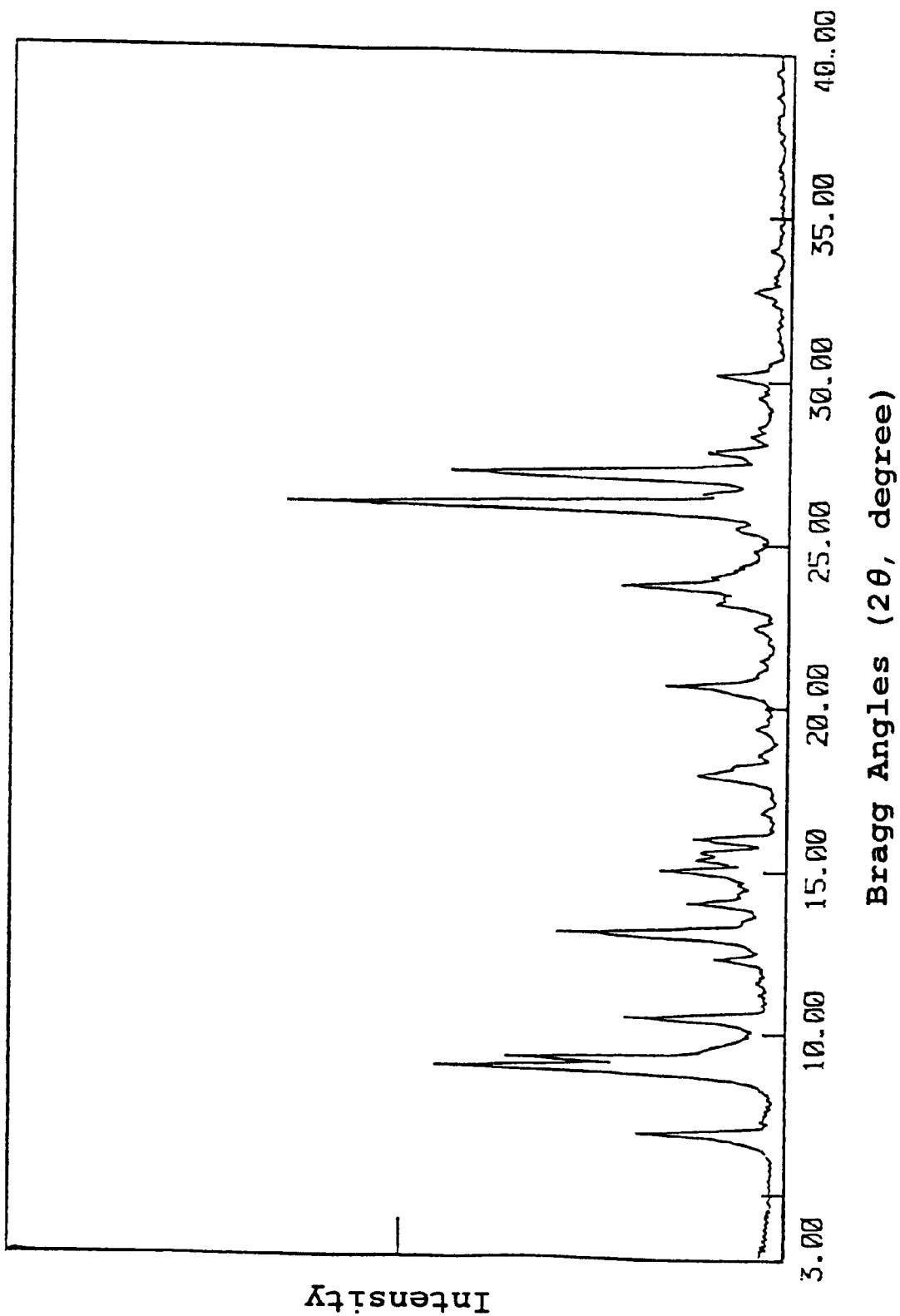
FIGS. 41 and 42 are an X-ray diffraction spectrum and an infrared absorption spectrum, respectively, of a crystal obtained in Preparation example 37.
Figure 42:
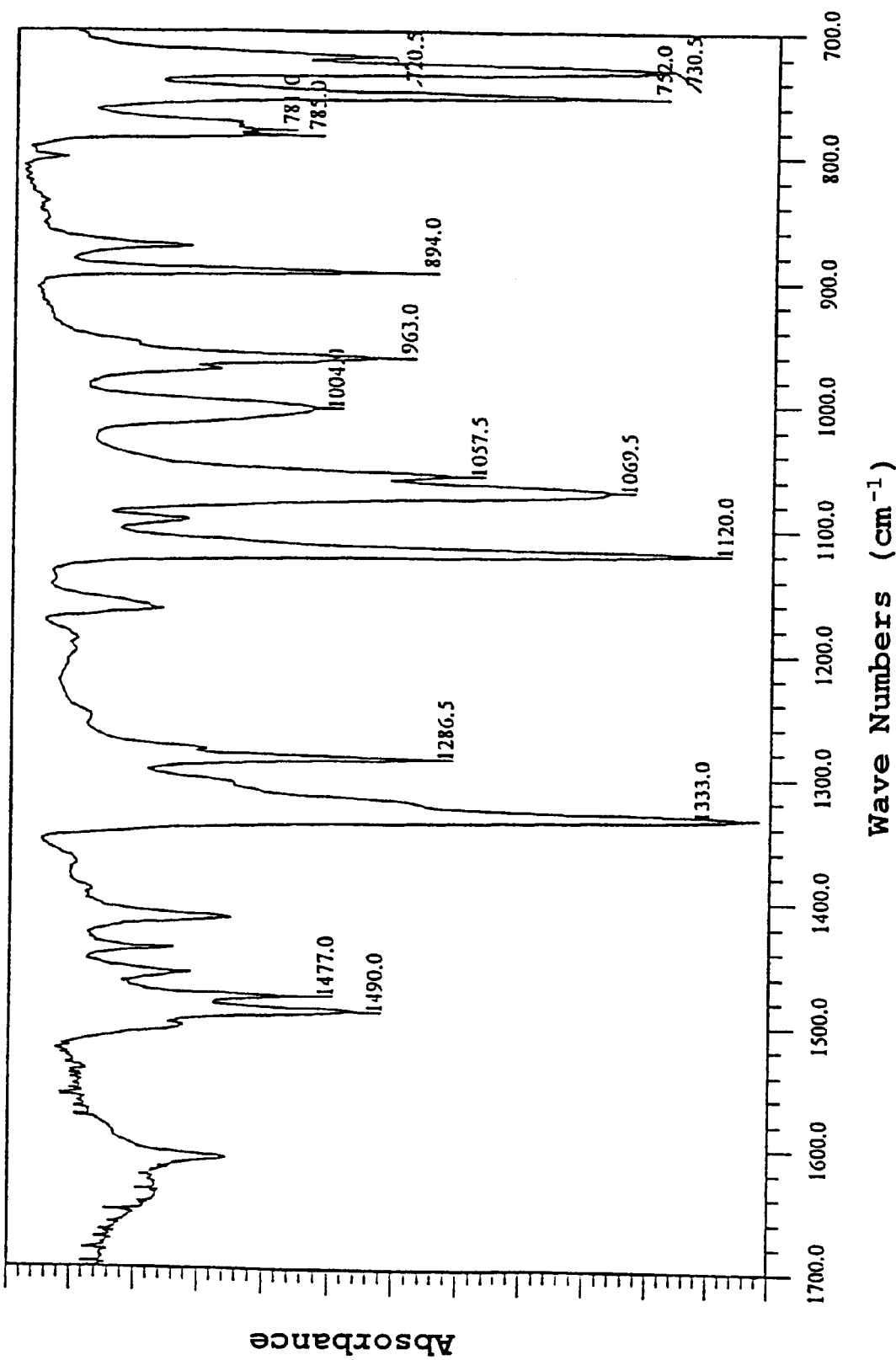

A crystal transformation was conducted in the same manner as in Preparation example 35 except for using 0.3 g of the amorphous H$_2$Pc obtained in Preparation example 4 and 0.6 g of the amorphous TiOPc obtained in Preparation example 3 in place of 0.2 g and 0.7 g of each. As a result, 0.9 g of a crystal was obtained. An X-ray diffraction spectrum and an infrared absorption spectrum of the obtained crystal are shown in FIGS. 41 and 42, respectively. It is found from FIG. 41 that the crystal has diffraction peaks at 7.0°, 9.0°, 9.3°, 10.5°, 13.1°, 20.7°, 26.2° and 27.2° of Bragg angles (2θ±0.2°). It is also found from FIG. 42 that the crystal has absorption peaks at 1333.0 cm$^{-1}$, 1120.0 cm$^{-1}$, 1069.5 cm$^{-1}$, 963.0 cm$^{-1}$, 894.0 cm$^{-1}$, 785.0 cm$^{-1}$, 752.0 cm$^{-1}$ and 730.5 cm$^{-1}$ of wave numbers (±2 cm$^{-1}$).

Preparation Example 38

Figure 43:
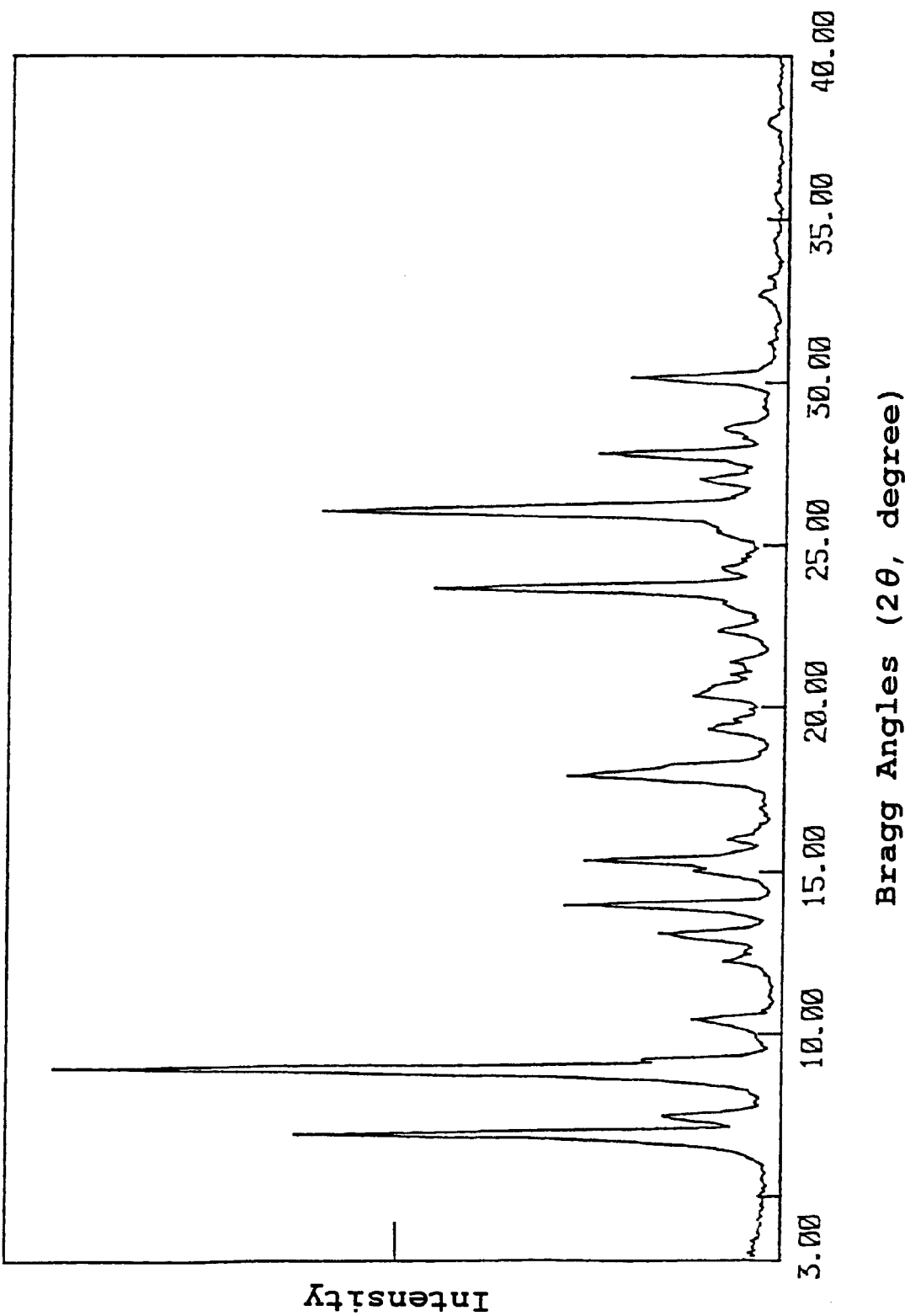
FIGS. 43 and 44 are an X-ray diffraction spectrum and an infrared absorption spectrum, respectively, of a crystal obtained in Preparation example 38.
Figure 44:
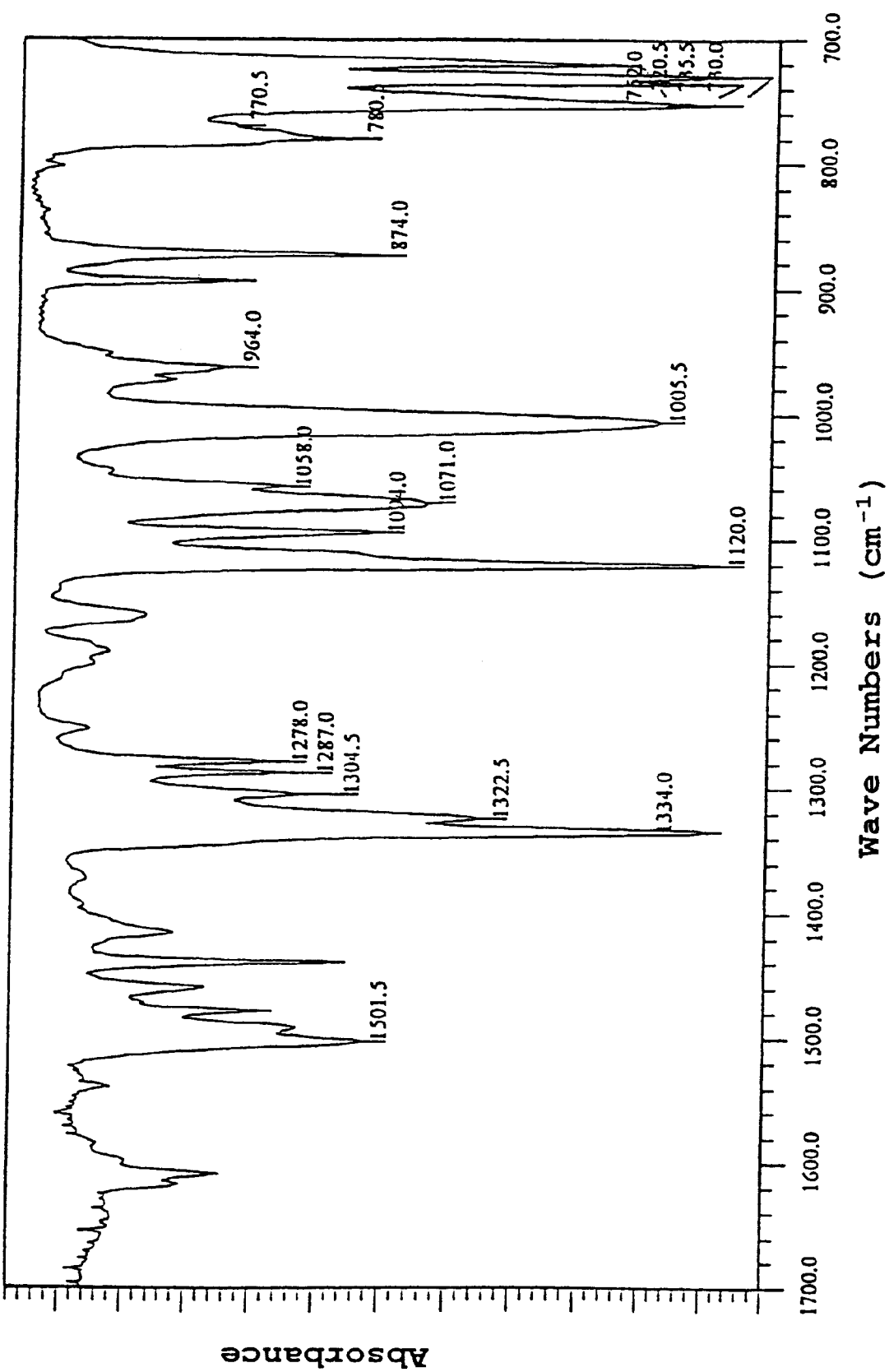

A crystal transformation was conducted in the same manner as in Preparation example 35 except for using 0.7 g of the amorphous H$_2$Pc obtained in Preparation example 4 and 0.2 g of the amorphous TiOPc obtained in Preparation example 3 in place of 0.2 g and 0.7 g of each. As a result, 0.9 g of a crystal was obtained. An X-ray diffraction spectrum and an infrared absorption spectrum of the obtained crystal are shown in FIGS. 43 and 44, respectively. It is found from FIG. 43 that the crystal has diffraction peaks at 7.0°, 9.0°, 9.3°, 10.5°, 13.1°, 20.7°, 26.2° and 27.2° of Bragg angles (2θ±0.2°). It is also found from FIG. 44 that the crystal has absorption peaks at 1334.0 cm$^{-1}$, 1120.0 cm$^{-1}$, 1071.0 cm$^{-1}$, 964.0 cm$^{-1}$, 874.0 cm$^{-1}$, 780.5 cm$^{-1}$, 752.0 cm$^{-1}$ and 730.0 cm$^{-1}$ of wave numbers (±2 cm$^{-1}$).

Preparation Example 39

A crystal transformation was conducted in the same manner as in Preparation example 35 except for using 2.0 g of o-dichlorobenzene in place of 2.0 g of naphthalene. As a result, 0.9 g of a crystal was obtained. An X-ray diffraction spectrum and an infrared absorption spectrum of the obtained crystal were the same as those in FIGS. 37 and 38, respectively.

Preparation Example 40

A crystal transformation was conducted in the same manner as in Preparation example 35 except for using 1.0 g of naphthalene and 1.0 g of ethylcyclohexane in place of 2.0 g of naphthalene. As a result, 0.9 g of a crystal was obtained. An X-ray diffraction spectrum and an infrared absorption spectrum of the obtained crystal were the same as those in FIGS. 37 and 38, respectively.

Preparation Example 41

10.0 g of the amorphous TiOPc obtained in Preparation example 3 was added to 500 ml of DMF and the resultant mixture was heated at 100° C. for 2 hours while stirring using a stirrer. The resultant suspension was then cooled and to the suspension was added 500 ml of acetone, further followed by stirring for 1 hour. The resultant precipitated crystal was collected by filtration and suspension-washed with 500 ml of acetone, to thereby obtain 9.1 g of a crystal. An X-ray diffraction spectrum of the obtained crystal was the same as that in FIG. 1.

Preparation Example 42

Figure 45:
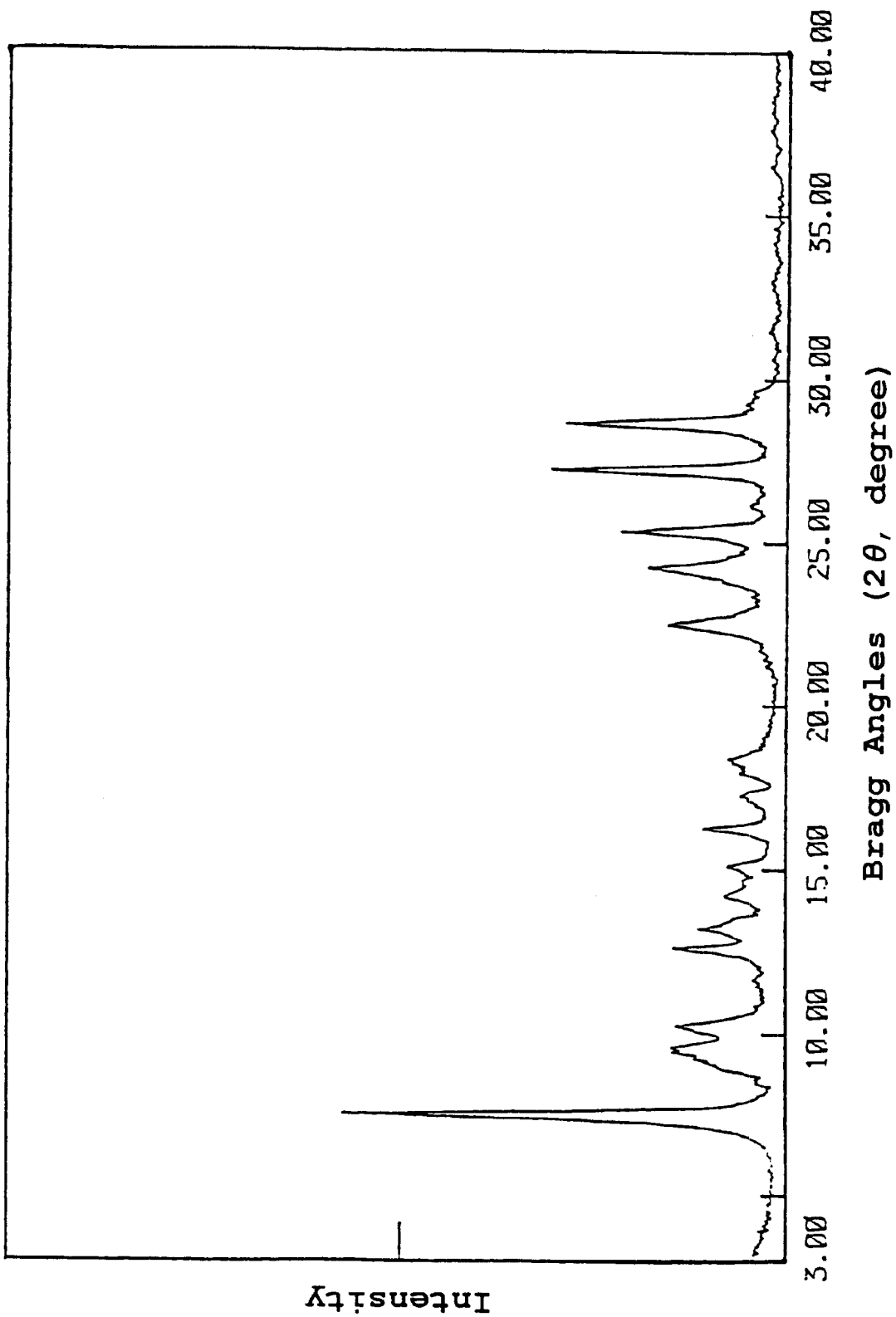
FIGS. 45 and 46 are an X-ray diffraction spectrum and an infrared absorption spectrum, respectively, of a crystal obtained in Preparation example 42.
Figure 46:
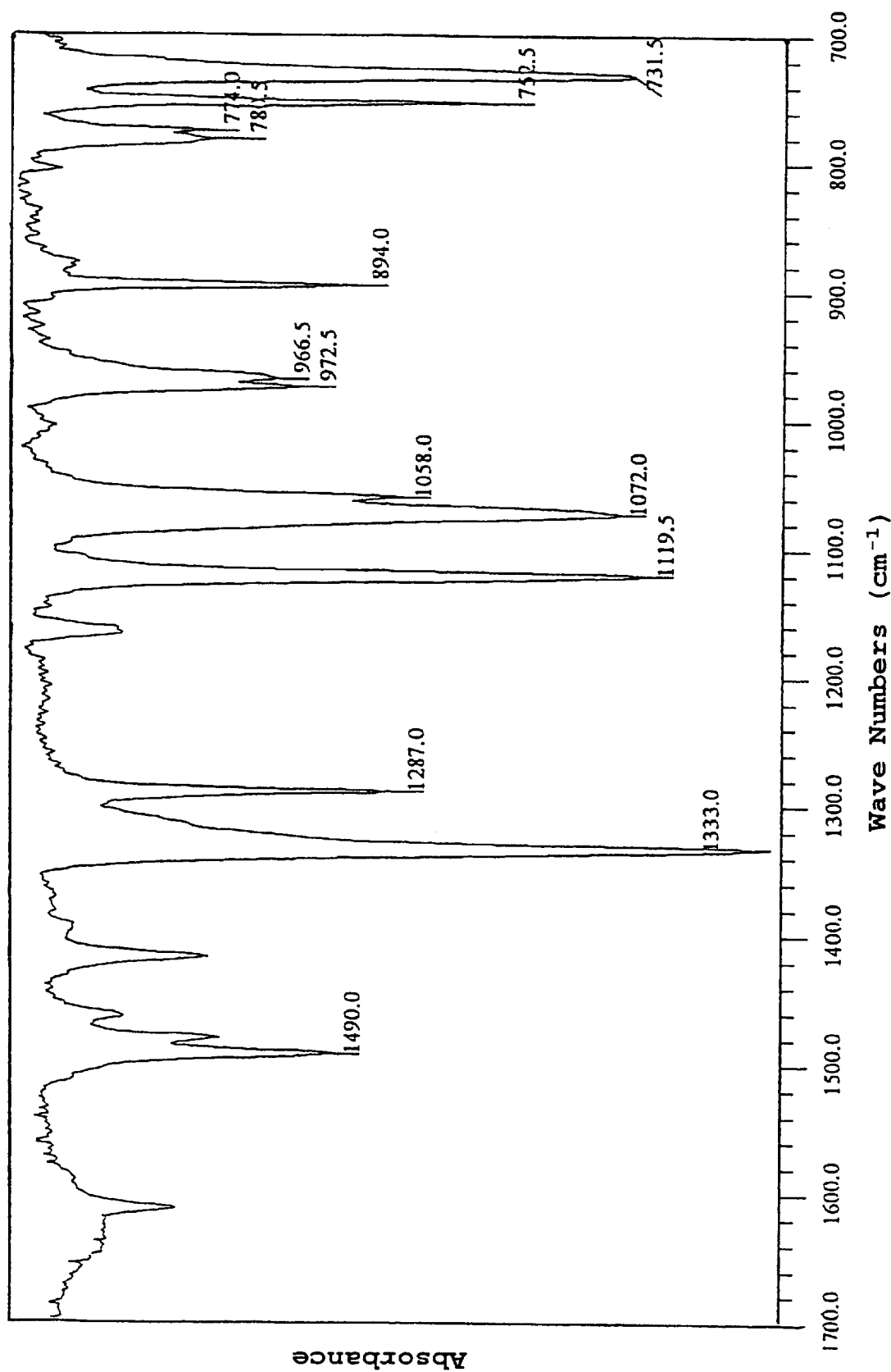

0.5 g of the α-TiOPc obtained in Preparation example 41, 0.5 g of the amorphous TiOPc obtained in Preparation example 3 and 28.0 g of water were charged in a 100 ml flask and heated at 90° C. while stirring. After 10 minutes, 2.0 g of naphthalene was added to the resultant mixture, which was subsequently heated at the same temperature while stirring. After 1 hour, the reaction was terminated, followed by cooling to room temperature. The resultant precipitated crystal was collected by filtration and washed with methanol. As a result, 0.9 g of a crystal was obtained. An X-ray diffraction spectrum of the obtained crystal is shown in FIG. 45. It is found from FIG. 45 that the crystal has diffraction peaks at 7.5°, 10.2°, 16.3°, 22.5°, 24.2°, 25.4°, 27.2° and 28.7° of Bragg angles (2θ±0.2°) and has the crystal structure of TiOPc, wherein the intensity of peak at 7.5° of a Bragg angle is the strongest among the above peaks. An infrared absorption spectrum of the obtained crystal is shown in FIG. 46. It is found from FIG. 46 that the crystal has absorption peaks at 1490.0 cm$^{-1}$, 1333.0 cm$^{-1}$, 1287.0 cm$^{-1}$, 1119.5 cm$^{-1}$, 1072.0 cm$^{-1}$, 1058.0 cm$^{-1}$, 972.5 cm$^{-1}$, 966.5 cm$^{-1}$, 894.0 cm$^{-1}$, 780.5 cm$^{-1}$, 774.0 cm$^{-1}$, 752.5 cm$^{-1}$ and 731.5 cm$^{-1}$ of wave numbers (±2 cm$^{-1}$).

Preparation Example 43

Figure 47:
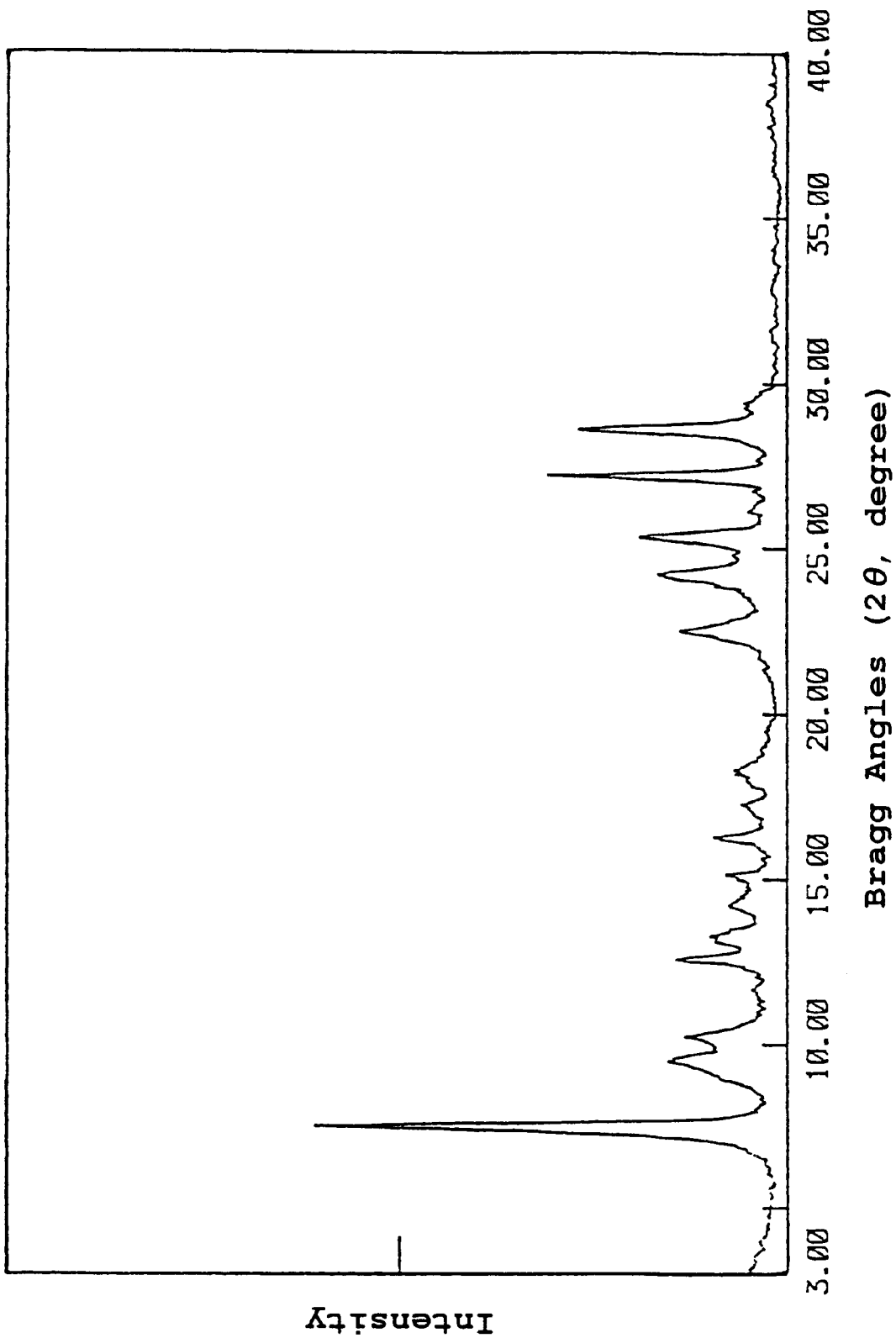
FIG. 47 is an X-ray diffraction spectrum of a crystal obtained in Preparation example 43.

0.5 g of the amorphous TiOPc obtained in Preparation example 3 and 10.0 g of DMF were charged in a 100 ml flask and heated at 90° C. while stirring. After 2 hours, to the resultant mixture was added 28.0 g of water, and subsequently 0.5 g of the amorphous TiOPc obtained in Preparation example 3 and heated at the same temperature while stirring. After 10 minutes, 2.0 g of naphthalene was added to the resultant mixture, which was subsequently heated at the same temperature while stirring. After 1 hour, the reaction was terminated, followed by cooling to room temperature. The resultant precipitated crystal was collected by filtration and washed with methanol. As a result, 0.9 g of a crystal was obtained. An X-ray diffraction spectrum of the obtained crystal is shown in FIG. 47. It is found from FIG. 47 that the crystal has diffraction peaks at 7.5°, 10.2°, 16.3°, 22.5°, 24.2°, 25.4°, 27.2° and 28.7° of Bragg angles (2θ±0.2°) and has the crystal structure of TiOPc, wherein the intensity of peak at 7.5° of a Bragg angle is the strongest among the above peaks.

Preparation Example 44

A crystal transformation was conducted in the same manner as in Preparation example 43 except for using 2.0 g of o-dichlorobenzene in place of 2.0 g of naphthalene. As a result, 0.9 g of a crystal was obtained. An X-ray diffraction spectrum of the obtained crystal was the same as that in FIG. 47.

Preparation Example 45

Figure 48:
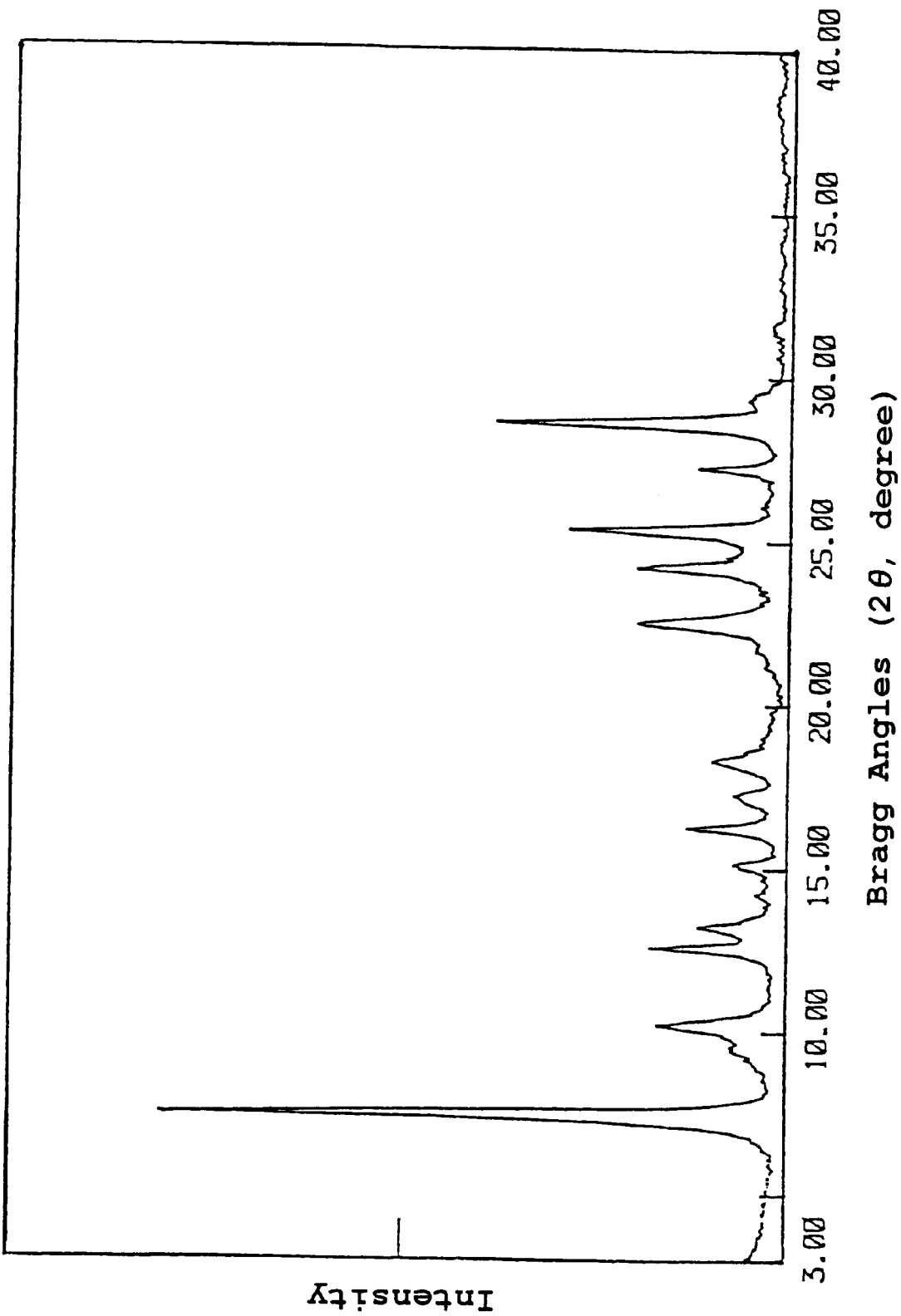
FIG. 48 is an X-ray diffraction spectrum of a crystal obtained in Preparation example 45.

A crystal transformation was conducted in the same manner as in Preparation example 42 except for using 0.8 g of the α-TiOPc obtained in Preparation example 41 and 0.2 g of the amorphous TiOPc obtained in Preparation example 3 in place of 0.5 g and 0.5 g of each. As a result, 0.9 g of a crystal was obtained. An X-ray diffraction spectrum of the obtained crystal is shown FIG. 48.

Preparation Example 46

A crystal transformation was conducted in the same manner as in Preparation example 43 except for using 0.8 g of the amorphous TiOPc charged in a flask in advance and 0.2 g of the amorphous TiOPc added later in place of 0.5 g and 0.5 g of each. As a result, 0.9 g of a crystal was obtained. An X-ray diffraction spectrum of the obtained crystal was the same as that in FIG. 48.

Preparation Example 47

A crystal transformation was conducted in the same manner as in Preparation example 43 except for using 10.0 g of DMSO in place of 10.0 g of DMF. As a result, 0.9 g of a crystal was obtained. An X-ray diffraction spectrum of the obtained crystal was the same as that in FIG. 47.

Comparative Preparation Example 9

Figure 49:
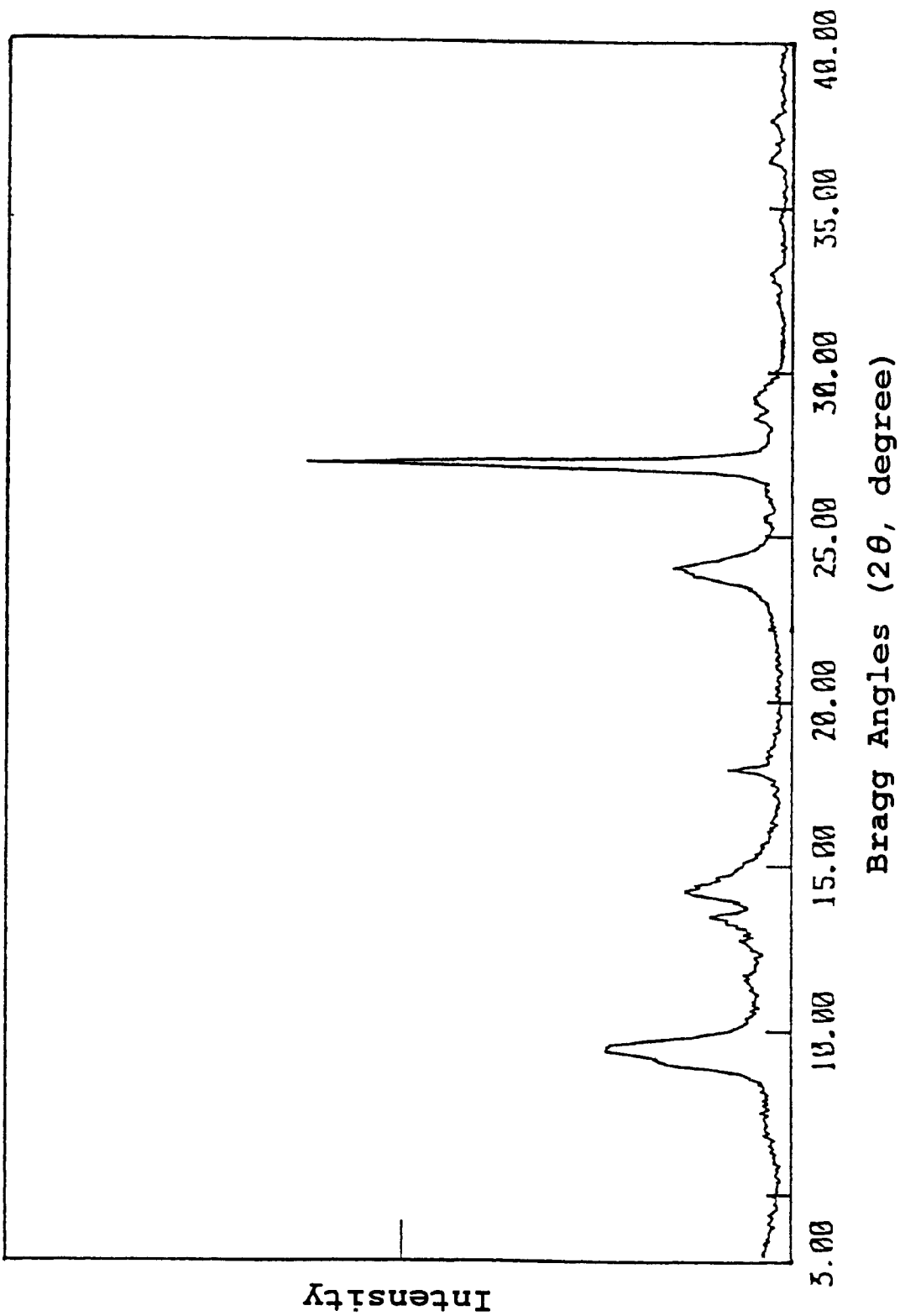
FIG. 49 is an X-ray diffraction spectrum of a crystal obtained in Comparative preparation example 9.

1.0 g of the amorphous TiOPc obtained in Preparation example 3 and 28.0 g of water were charged in a 100 ml flask and heated at 90° C. while stirring. After 10 minutes, 2.0 g of naphthalene was added to the resultant mixture, which was subsequently heated at the same temperature while stirring. After 3 hours, the reaction was terminated, followed by cooling to room temperature. The resultant precipitated crystal was collected by filtration and washed with methanol. As a result, 0.9 g of a crystal was obtained. An X-ray diffraction spectrum is shown in FIG. 49.

Comparative Preparation Example 10

Figure 50:
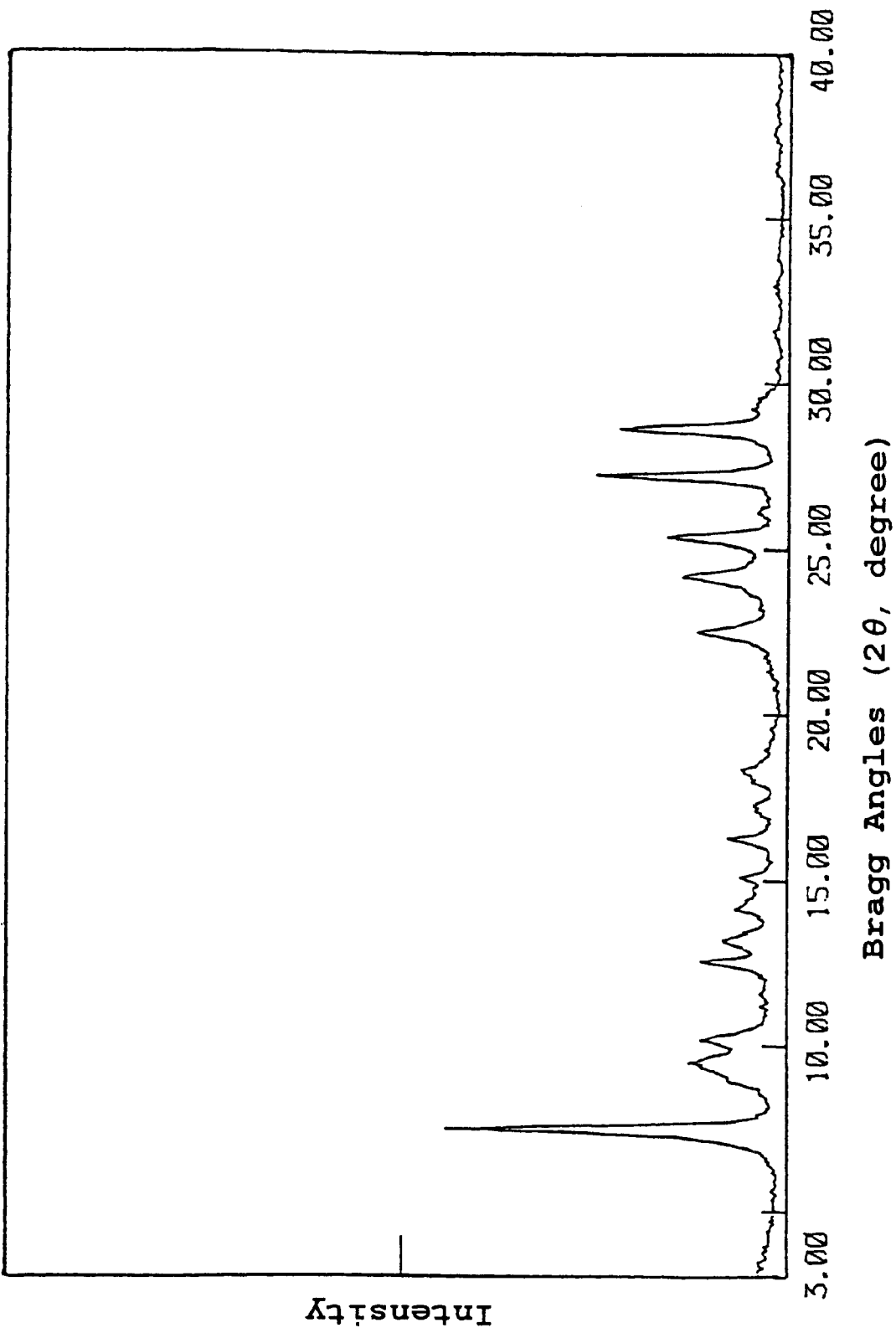
FIG. 50 is an X-ray diffraction spectrum of a crystal obtained in Comparative preparation example 10.

A crystal transformation was conducted in the same manner as in Preparation example 42 except for using 0.5 g of the α-TiOPc obtained in Preparation example 1 in place of 0.5 g of the α-TiOPc obtained in Preparation example 41. As a result, 0.9 g of a crystal was obtained. An X-ray diffraction spectrum of the obtained crystal is shown in FIG. 50.

Example 1

1 part by weight of the phthalocyanine composition obtained in Preparation example 5, 1 part by weight of a polyester resin, Vylon 220 (trade name, produced by Toyobo Co., Ltd.) and 100 parts by weight of methyl ethyl ketone were dispersed by means of a paint conditioner (manufactured by Red Devil Inc.) for 1 hour, together with glass beads. The resultant dispersion was applied onto an aluminum vapor-deposited polyester by means of an automatic film applicator, Model 542AB (manufactured by Yasuda Seiki Seisakusho CO., LTD.) and then dried, to thereby form a charge generating layer having a thickness of about 0.2 μm. Next, Example compound represented by the formula (I) was mixed with a polyarylate resin, U-Polymer (trade name, produced by Unitika, Ltd.) in a weight ratio of 1:1, and the resultant mixture was dissolved in a solvent of dichloroethane, to thereby prepare a 10% by weight solution. The prepared solution was applied onto the above-formed charge generating layer by means of the applicator, to thereby form a charge transporting layer having a thickness of 20 μm.

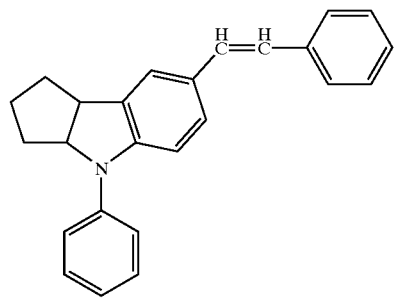

(I)

With respect to the thus prepared double layer photoreceptor, electrophotographic characteristics were evaluated using an electrostatic paper analyzer, Model EPA-8200 (trade name, manufactured by Kawaguchi Electric Mfg. Co., Ltd.).

| Measurement conditions: | |
|---|---|
| Applied voltage | −4.7 kV |
| Static | No. 3 |
| (Rotary speed mode of turntable | 10 m/min) |

As a result, the photoreceptor exhibited an extremely high sensitivity such that a charge potential (V0) was −740 V and a half decay exposure (E1/2) was 0.51 lx·s.

Further, using the same apparatus, a cycle of charging-erasing (erase lamp: irradiation of 400 lux white light for 1 second) was repeated and cycle characteristics were evaluated. A change in the charge potential due to the repetition of 1,000 cycles was determined. As a result, a charge potential (V0) after the 1st cycle was −740 V, whereas, a charge potential (V0) after the 1,000th cycle was −720 V, which exhibited stable characteristics with almost no potential decrease caused by the repetition. Further, a half decay exposure (E1/2) after the 1st cycle was 0.51 lx·s, whereas a half decay exposure (E1/2) after the 1,000th cycle was 0.51 lx·s, which exhibited excellent characteristics without any changing.

Examples 2 to 7 and Comparative Examples 1 to 4

Photoreceptors were individually prepared in the same manner as in Example 1 except for using the phthalocyanine composition obtained in Preparation examples, the phthalocyanine composition obtained in Comparative preparation examples and their mixture, as shown in Table 1, in place of the phthalocyanine composition obtained in Preparation example 5. Electrophotographic characteristics are shown in Table 1.

TABLE 1

| | | 1st Cycle | | 1000th Cycle | |
|---|---|---|---|---|---|
| Example | Preparation example | V0 (V) | E1/2 (lx · s) | V0 (V) | E1/2 (lx · s) |
| Example 2 | Preparation example 6 | −715 | 0.53 | −695 | 0.53 |
| Example 3 | Preparation example 7 | −725 | 0.50 | −700 | 0.50 |

TABLE 1-continued

| Example | Preparation example | 1st Cycle | | 1000th Cycle | |
|---|---|---|---|---|---|
| | | V0 (V) | E1/2 (lx · s) | V0 (V) | E1/2 (lx · s) |
| Example 4 | Preparation example 8 | −740 | 0.51 | −720 | 0.51 |
| Example 5 | Preparation example 9 | −730 | 0.51 | −710 | 0.51 |
| Example 6 | Preparation example 10 | −725 | 0.50 | −705 | 0.50 |
| Example 7 | Preparation example 11 | −730 | 0.51 | −710 | 0.50 |
| Comparative example 1 | Comparative p.e.* 1 | −650 | 1.03 | −435 | 1.36 |
| Comparative example 2 | Comparative p.e. 2 | −580 | 0.90 | −445 | 1.60 |
| Comparative example 3 | Comparative p.e. 3 | −125 | 2.33 | −75 | 3.28 |
| Comparative example 4 | Comparative p.e. 4 | −680 | 0.60 | −565 | 0.91 |

*preparation example

From Comparative examples 1 and 2, it was found that, when a crystal transformation was conducted in which 1,2-dichloroethane or n-octane was used in place of naphthalene, a crystal having an intended crystal structure was not obtained, and electrophotographic characteristics were also poor. From Comparative example 3, it was found that, when copper phthalocyanine was used in place of $H_2Pc$, not only was the charge potential extremely low, but also the sensitivity was extremely low. Further, from Comparative example 4, it was found that, although the TiOPc obtained by the crystal transformation using o-dichlorobenzene has the relatively good sensitivity, it has the deteriorated properties due to the repetition of 1,000 cycles.

Example 8

5 parts by weight of the phthalocyanine composition obtained in Preparation example 5 and 100 parts by weight of tetrahydrofuran were dispersed by means of a ball mill, together with zirconia beads. After 48 hours, to the resultant dispersion were added 50 parts by weight of the compound of formula (I), 100 parts by weight of a polycarbonate resin, Z-200 (trade name, produced by Mitsubishi Gas Chemical Co., Inc.) and 700 parts by weight of tetrahydrofuran, and further dispersion treatment was conducted by means of a ball mill for 30 minutes. Then, the resultant dispersion was applied onto an aluminum vapor-deposited polyester by means of an automatic film applicator, Model 542AB (manufactured by Yasuda Seiki Seisakusho CO., LTD.) and then dried, to thereby form a photosensitive layer having a thickness of about 15 μm. With respect to the thus prepared single layer type photoreceptor, electrophotographic characteristics were evaluated in the same manner as in Example 1 except that the applied voltage was changed to +5 kV. As a result, a charge potential (V0) and a half decay exposure (E1/2) after the 1st cycle were, respectively, +440 V and 0.65 lx·s, whereas a charge potential (V0) and a half decay exposure (E1/2) after the 1,000th cycle were, respectively, +410 V and 0. 65 lx·s, and thus, excellent characteristics were exhibited even after the repetition of 1,000 cycles.

Comparative Example 5

A photoreceptor was prepared in the same manner as in Example 8 except that 5 parts by weight of the phthalocyanine composition obtained in Preparation example 5 was changed to the phthalocyanine composition obtained in Comparative preparation example 1. The prepared photoreceptor was evaluated, and as a result, a charge potential (V0) was as relatively excellent as +350 V; however, a half decay exposure (E1/2) was 3.80 lx·s, and thus, the sensitivity was extremely low.

Example 9

1 part by weight of the phthalocyanine composition obtained in Preparation example 18 and I part by weight of styrene-butadiene copolymer resin, Pliolite S-5D (trade name, manufactured by GOOD YEAR Inc.) were mixed with 100 parts by weight of ethyl acetate, and dispersed by means of a paint conditioner (manufactured by Red Devil Inc.) for 1 hour, together with glass beads having a diameter of 1 mm. The resultant dispersion was applied onto an aluminum vapor-deposited polyester by means of an automatic film applicator, Model 542AB (manufactured by Yasuda Seiki Seisakusho CO., LTD.) and then dried, to thereby form a charge generating layer having a thickness of about 0.2 μm.

Next, 100 parts by weight of a stilbene compound as the above-mentioned compound of formula (I), 100 parts by weight of a polycarbonate resin, Z-400 (trade name, produced by Mitsubishi Gas Chemical Co., Inc.) and 1 part by weight of DL-α-tocopherol, E1000 (trade name, produced by Riken Vitamin Co., Ltd.) were dissolved in 2,000 parts by weight of tetrahydrofuran. The resultant solution was applied onto the above-formed charge generating layer by means of the applicator and then dried, to thereby form a charge transporting layer having a dry thickness of 25 μm.

With respect to the thus prepared double layer photoreceptor, electrophotographic characteristics were evaluated. As a result, the photoreceptor exhibited an extremely high sensitivity such that a charge potential (V0) was −743 V and a half decay exposure (E1/2) was 0.60 lx·s. Further, a change in the charge potential due to the repetition of 1,000 cycles was determined. As a result, a charge potential (V0) after the 1st cycle was −743 V, whereas a charge potential (V0) after the 1,000th cycle was −730 V, which exhibited stable characteristics with almost no potential decrease caused by the repetition. Further, a half decay exposure (E1/2) after the 1st cycle was 0.60 lx·s, whereas a half decay exposure (E1/2) after the 1,000th cycle was 0.60 lx·s, which exhibited excellent characteristics without any changing.

Examples 10 to 27 and Comparative Examples 6 to 9

Photoreceptors were individually prepared in the same manner as in Example 9 except for using the phthalocyanine compositions obtained in Preparation examples, or the TiOPc, $H_2Pc$ and phthalocyanine compositions obtained in Comparative preparation examples, as shown in Table 2, in place of the phthalocyanine composition obtained in Preparation example 18. Electrophotographic characteristics are shown in Table 2.

TABLE 2

| Example | Preparation example | 1st Cycle | | 1000th Cycle | |
|---|---|---|---|---|---|
| | | V0 (V) | E1/2 (lx · s) | V0 (V) | E1/2 (lx · s) |
| Example 10 | Preparation example 19 | −744 | 0.59 | −729 | 0.59 |

TABLE 2-continued

| Example | Preparation example | 1st Cycle V0 (V) | 1st Cycle E1/2 (1x · s) | 1000th Cycle V0 (V) | 1000th Cycle E1/2 (1x · s) |
|---|---|---|---|---|---|
| Example 11 | Preparation example 20 | −733 | 0.60 | −722 | 0.60 |
| Example 12 | Preparation example 21 | −729 | 0.60 | −714 | 0.60 |
| Example 13 | Preparation example 22 | −738 | 0.58 | −725 | 0.58 |
| Example 14 | Preparation example 23 | −715 | 0.60 | −700 | 0.60 |
| Example 15 | Preparation example 24 | −730 | 0.60 | −713 | 0.60 |
| Example 16 | Preparation example 28 | −751 | 0.55 | −746 | 0.55 |
| Example 17 | Preparation example 29 | −708 | 0.64 | −690 | 0.64 |
| Example 18 | Preparation example 30 | −700 | 0.85 | −680 | 0.85 |
| Example 19 | Preparation example 32 | −753 | 0.59 | −740 | 0.59 |
| Example 20 | Preparation example 33 | −735 | 0.59 | −720 | 0.59 |
| Example 21 | Preparation example 34 | −727 | 0.59 | −702 | 0.59 |
| Example 22 | Preparation example 35 | −749 | 0.58 | −741 | 0.58 |
| Example 23 | Preparation example 36 | −752 | 0.60 | −738 | 0.60 |
| Example 24 | Preparation example 37 | −734 | 0.60 | −721 | 0.60 |
| Example 25 | Preparation example 38 | −711 | 0.70 | −699 | 0.71 |
| Example 26 | Preparation example 39 | −754 | 0.57 | −739 | 0.57 |
| Example 27 | Preparation example 40 | −747 | 0.58 | −737 | 0.58 |
| Comparative example 6 | Preparation example 31 | −763 | 1.11 | −758 | 1.13 |
| Comparative example 7 | Comparative p.e.* 6 | −625 | 3.33 | −500 | 4.44 |
| Comparative example 8 | Comparative p.e. 7 | −701 | 1.05 | −489 | 1.44 |
| Comparative example 9 | Mixture** | −555 | 0.98 | −505 | 1.05 |

*preparation example
**Mixture of Preparation example 31 and Comparative preparation example 6 with the ratio of 8:2

From Comparative examples 6 and 7, it was found that, when TiOPc or $H_2Pc$ was solely used, a crystal having an intended crystal structure was not obtained, and electrophotographic characteristics were poor. In Comparative example 9 wherein a mixture obtained simply by mixing together TiOPc and $H_2Pc$ was used, the sensitivity was slightly increased, as compared to the sensitivity in the case using TiOPc or $H_2Pc$ solely, and thus, sensitization was achieved; however, the level of this sensitivity was low. Further, from Comparative example 8, it was found that, when 1,2-dichloroethane was used in place of naphthalene, the crystal obtained by the crystal transformation does not have an intended crystal structure, and electrophotographic characteristics were poor.

Example 28

A photoreceptor was prepared in the same manner as in Example 8 except that 5 parts by weight of the phthalocyanine composition obtained in Preparation example 5 was changed to the phthalocyanine composition obtained in Preparation example 24. The prepared photoreceptor was evaluated. As a result, a charge potential (V0) and a half decay exposure (E1/2) after the 1st cycle were, respectively, +434 V and 0.71 lx·s, whereas a charge potential (V0) and a half decay exposure (E1/2) after the 1,000th cycle were, respectively, +410 V and 0.72 lx·s, and thus, excellent characteristics were exhibited.

Comparative Example 10

A photoreceptor was prepared in the same manner as in Example 8 except that 5 parts by weight of the phthalocyanine composition obtained in Preparation example 5 was changed to 5 parts by weight of the phthalocyanine composition obtained in Comparative preparation example 8. The prepared photoreceptor was evaluated. As a result, a charge potential (V0) was as relatively excellent as +369 V; however, a half decay exposure (E1/2) was as extremely low as 3.96 lx·s.

Example 29

A photoreceptor was prepared in the same manner as in Example 8 except that 5 parts by weight of the phthalocyanine composition obtained in Preparation example 5 was changed to the phthalocyanine composition obtained in Preparation example 39. The prepared photoreceptor was evaluated. As a result, a charge potential (V0) and a half decay exposure (E1/2) after the 1st cycle were, respectively, +444 V and 0.70 lx·s, whereas a charge potential (V0) and a half decay exposure (E1/2) after the 1,000th. cycle were, respectively, +421 V and 0.71 lx·s, and thus, excellent characteristics were exhibited.

Comparative Example 11

A photoreceptor was prepared in the same manner as in Example 8 except that 5 parts by weight of the phthalocyanine composition obtained in Preparation example 5 was changed to 4 parts by weight of the TiOPc obtained in Preparation example 31 and 1 part by weight of the $H_2Pc$ obtained in Comparative preparation example 6. The prepared photoreceptor was evaluated. As a result, a charge potential (V0) was as low as +333 V, and a half decay exposure (E1/2) was as extremely low as 1.06 lx·s.

Examples 30 to 35 and Comparative Examples 12 and 13

Photoreceptors were individually prepared in the same manner as in Example 1 except that the phthalocyanine composition obtained in Preparation example 5 was individually changed to the TiOPc's obtained in Preparation examples shown in Table 3, the TiOPc obtained in Comparative preparation example 10 and the α-TiOPc obtained in Preparation example 41. Electrophotographic characteristics are shown in Table 3.

TABLE 3

| Example | Preparation example | 1st Cycle V0 (V) | 1st Cycle E1/2 (1x · s) | 1000th Cycle V0 (V) | 1000th Cycle E1/2 (1x · s) |
|---|---|---|---|---|---|
| Example 30 | Preparation example 42 | −744 | 0.49 | −728 | 0.49 |
| Example 31 | Preparation example 43 | −748 | 0.48 | −735 | 0.48 |
| Example 32 | Preparation example 44 | −740 | 0.48 | −723 | 0.48 |
| Example 33 | Preparation example 45 | −741 | 0.51 | −728 | 0.51 |
| Example 34 | Preparation | −745 | 0.50 | −730 | 0.50 |

TABLE 3-continued

| Example | Preparation example | 1st Cycle V0 (V) | 1st Cycle E1/2 (1x · s) | 1000th Cycle V0 (V) | 1000th Cycle E1/2 (1x · s) |
|---|---|---|---|---|---|
| | example 46 | | | | |
| Example 35 | Preparation example 47 | −741 | 0.48 | −725 | 0.48 |
| Comparative example 12 | Preparation example 41 | −696 | 0.60 | −633 | 0.61 |
| Comparative example 13 | Comparative p.e.* 10 | −666 | 0.69 | −610 | 0.67 |

*preparation example

As seen from Table 3, it was found that all of the photoreceptors exhibited a small dark decay, a high sensitivity and no changing in the sensitivity due to each of the repetition of charging-erasing cycle. On the other hand, the α-TiOPc obtained in Preparation example 41 had a poor electrostatic chargeability and sensitivity. Further, the TiOPc obtained in Comparative preparation example 10 had also a poor chargeability and sensitivity.

Example 36

1 part by weight of the TiOPc obtained in Preparation example 42, 1 part by weight of a polyester resin, Vylon 220 (trade name, produced by Toyobo Co., Ltd.) and 100 parts by weight of methyl ethyl ketone were dispersed for 1 hour, together with glass beads. The resultant dispersion was sealed in a container and allowed to stand under dark and cool conditions for 1 week (hereinafter, referred to as "1-week potting"), and then, applied onto an aluminum vapor-deposited polyester by means of an automatic film applicator, Model 542AB (manufactured by Yasuda Seiki Seisakusho CO., LTD.) and then dried in the same manner as mentioned above, to thereby form a charge generating layer having a thickness of about 0.2 μm. Next, the compound represented by the above formula (I) was mixed with a polyacrylate resin, U-Polymer (trade name, manufactured by Unitika, Ltd.) in a weight ratio of 1:1, and the resultant mixture was dissolved in a solvent of dichloroethane, to thereby prepare a 10% by weight solution. The prepared solution was applied onto the above-formed charge generating layer by means of the applicator, to thereby form a carrier transporting layer having a thickness of 20 μm. With respect to the thus prepared double layer photoreceptor, electrophotographic characteristics were also evaluated in the same manner as mentioned above. As a result, with respect to the double layer photoreceptor which was prepared immediately after the dispersion preparation, a charge potential (V0) and a half decay exposure (E1/2) were, respectively, −744 V and 0.49 lx·s, whereas with respect to the double layer photoreceptor which was prepared after the 1-week potting, a charge potential (V0) and a half decay exposure (E1/2) were, respectively, −735 V and 0.49 lx·s, and thus, it was found that almost no changing occurred.

Examples 37 to 41 and Comparative Examples 14 to 16

Photoreceptors were individually prepared in the same manner as in Example 36 except that the TiOPc obtained in Preparation example 42 was individually changed to the TiOPc's obtained in Preparation examples shown in Table 4, the TiOPc obtained in Comparative preparation example 9 and mixtures of two different TiOPc's. Electrophotographic characteristics are shown in Table 4.

TABLE 4

| Example | Preparation example | 1st Cycle V0 (V) | 1st Cycle E1/2 (1x · s) | 1-week potting V0 (V) | 1-week potting E1/2 (1x · s) |
|---|---|---|---|---|---|
| Example 37 | Preparation example 43 | −748 | 0.48 | −743 | 0.48 |
| Example 38 | Preparation example 44 | −740 | 0.48 | −740 | 0.48 |
| Example 39 | Preparation example 45 | −741 | 0.51 | −738 | 0.51 |
| Example 40 | Preparation example 46 | −745 | 0.50 | −743 | 0.50 |
| Example 41 | Preparation example 47 | −741 | 0.48 | −741 | 0.48 |
| Comparative example 14 | Comparative p.e. 9 | −739 | 0.48 | −738 | 0.50 |
| Comparative example 15 | Mixture* | −747 | 0.54 | −727 | 0.60 |
| Comparative example 16 | Mixture** | −718 | 0.57 | −703 | 0.58 |

*Mixture of Comparative preparation example 9 and Preparation example 41 with the ratio of 1:1
**Mixture of Comparative preparation example 9 and Preparation example 41 with the ratio of 1:4

As seen from Table 4, it was found that the TiOPc obtained in Comparative example 14 exhibited an excellent sensitivity, but the sensitivity after the 1-week potting was slightly lowered. Further, from Comparative examples 15 and 16, it was found that the mixtures had a low sensitivity and a poor sensitivity after the 1-week potting, as compared to the TiOPc of the present invention.

Example 42

A photoreceptor was prepared in the same manner as in Example 8 except that 5 parts by weight of the phthalocyanine composition obtained in Preparation example 5 was changed to the phthalocyanine composition obtained in Preparation example 43. The prepared photoreceptor was evaluated. As a result, a charge potential (V0) and a half decay exposure (E1/2) after the 1st cycle were, respectively, +414 V and 0.66 lx·s, whereas a charge potential (V0) and a half decay exposure (E1/2) after the 1,000th cycle were, respectively, +388 V and 0.66 lx·s, and thus, excellent characteristics were exhibited.

Further, 5 parts by weight of the TiOPc obtained in Preparation example 43 and 100 parts by weight of tetrahydrofuran were dispersed by means of a ball mill for 48 hours, together with zirconia beads. To the resultant dispersion were added 50 parts by weight of the compound represented by the above formula (I), 100 parts by weight of a polycarbonate resin, PCZ-200 (trade name, produced by Mitsubishi Gas Chemical Co., Inc.) and 700 parts by weight of tetrahydrofuran, and further dispersion treatment was conducted by means of a ball mill for 30 minutes. Then, the resultant dispersion was sealed in a container and allowed to stand under dark and cool conditions for 1 week (1-week potting), and then, applied onto an aluminum vapor-deposited polyester by means of an automatic film applicator, Model 542AB (manufactured by Yasuda Seiki Seisakusho CO., LTD.), to thereby form a photosensitive layer having a thickness of about 15 μm. With respect to the thus prepared single layer type photoreceptor, electrophotographic characteristics were evaluated in the same manner as mentioned above. As a result, for the photoreceptor which was prepared immediately after the dispersion preparation, a charge potential (V0) and a half decay exposure (E1/2) were, respectively, +414 V and 0.66 lx·s, whereas with respect to the photoreceptor which was prepared after the 1-week potting, a charge potential (V0) and a half decay exposure (E1/2) were, respectively, +411 V and 0.65 lx·s, and thus, it was found that a changing was small.

Comparative Example 17

A photoreceptor was prepared in the same manner as in Example 42 except that 5 parts by weight of the TiOPc used in Example 42 was changed to 2.5 parts by weight of the α-TiOPc obtained in Preparation example 41 and 2.5 parts by weight of the TiOPc obtained in Comparative preparation example 9. Electrophotographic characteristics were evaluated. As a result, for the photoreceptor which was prepared immediately after the dispersion preparation, a charge potential (V0) and a half decay exposure (E1/2) were, respectively, +409 V and 0.67 lx·s, and a charge potential (V0) and a half decay exposure (E1/2) after the 1,000th cycle were, respectively, +377 V and 0.67 lx·s, and thus, the sensitivity was relatively high. However, with respect to the photoreceptor which was prepared after the 1-week potting, a charge potential (V0) and a half decay exposure (E1/2) were, respectively, +399 V and 0.77 lx·s, and thus, the sensitivity was lowered.

As is apparent from the foregoing, by the use of the phthalocyanine composition of the present invention, an electrophotographic photoreceptor having excellent properties can be provided.

What is claimed is:

1. A phthalocyanine composition comprising an oxytitanium phthalocyanine and a metal-free phthalocyanine, wherein said composition has diffraction peaks at 7.0°, 9.0°, 14.1°, 18.0°, 23.7° and 27.3° of Bragg angles (2θ±0.2°) in an X-ray diffraction spectrum with a 1.541 Å X-ray of Cu Kα.

2. The phthalocyanine composition according to claim 1, which further has strong absorption peaks at 1333 $cm^{-1}$, 1119 $cm^{-1}$, 1073 $cm^{-1}$, 963 $cm^{-1}$, 894 $cm^{-1}$, 753 $cm^{-1}$ and 734 $cm^{-1}$ in an infrared absorption spectrum of wave numbers (±2 $cm^{-1}$).

3. A process for producing a phthalocyanine composition, which comprises: subjecting an amorphous phthalocyanine composition which comprises an oxytitanium phthalocyanine and a metal-free phthalocyanine to a treatment in a solvent containing water and an aromatic compound, to thereby effect the transformation to a crystal structure having diffraction peaks at 7.0°, 9.0°, 14.1°, 18.0°, 23.7° and 27.3° of Bragg angles (2θ±0.2°) in an X-ray diffraction spectrum with a 1.541 Å X-ray of Cu Kα.

4. A process for producing a phthalocyanine composition, which comprises: subjecting a mixture of an amorphous oxytitanium phthalocyanine and an amorphous metal-free phthalocyanine to a treatment in a solvent containing water and an aromatic compound, to thereby effect the transformation to a crystal structure having diffraction peaks at 7.0°, 9.0°, 14.1°, 18.0°, 23.7° and 27.3° of Bragg angles (2θ±0.2°) in an X-ray diffraction spectrum with a 1.541 Å X-ray of Cu Kα.

5. The process for producing a phthalocyanine composition according to claim 3 or 4, wherein said treatment in the solvent is conducted at 80° C. or higher.

* * * * *